US010684209B1

(12) United States Patent
Manautou

(10) Patent No.: US 10,684,209 B1
(45) Date of Patent: Jun. 16, 2020

(54) PARTICLE COLLECTION MEDIA CARTRIDGE WITH TENSIONING MECHANISM

(71) Applicant: Scanit Technologies, Inc., Milpitas, CA (US)

(72) Inventor: Pedro Manautou, Milpitas, CA (US)

(73) Assignee: Scanit Technologies, Inc., Fremont, CA (US)

( * ) Notice: Subject to any disclaimer, the term of this patent is extended or adjusted under 35 U.S.C. 154(b) by 11 days.

(21) Appl. No.: 15/895,431

(22) Filed: Feb. 13, 2018

Related U.S. Application Data

(63) Continuation-in-part of application No. 15/667,829, filed on Aug. 3, 2017, now Pat. No. 10,458,990, which is a continuation-in-part of application No. 15/178,170, filed on Jun. 9, 2016, now Pat. No. 9,933,351, which is a continuation-in-part of application No. 15/061,883, filed on Mar. 4, 2016.

(60) Provisional application No. 62/458,383, filed on Feb. 13, 2017, provisional application No. 62/370,604, filed on Aug. 3, 2016, provisional application No. 62/173,280, filed on Jun. 9, 2015, provisional (Continued)

(51) Int. Cl.
*G01N 15/06* (2006.01)
*G01N 15/14* (2006.01)

(52) U.S. Cl.
CPC ..... *G01N 15/0612* (2013.01); *G01N 15/1434* (2013.01)

(58) Field of Classification Search
CPC ......... G01N 15/0637; G01N 2021/845; G01N 2035/00019
See application file for complete search history.

(56) References Cited

U.S. PATENT DOCUMENTS 4,240,444 A    12/1980   Virguito et al.
4,841,145 A *   6/1989   Wada ..................... G01N 21/35
                                                           250/304

(Continued)

FOREIGN PATENT DOCUMENTS

JP         19970239205           3/1999
WO      WO2013182822 A1      12/2013

(Continued)

OTHER PUBLICATIONS

"Knowledge-driven Personalized Contextual mHealth Service for Asthma Management in Children", Pramod Anantharam et al., 2015 IEEE International Conference on Mobile Services, Jun. 2015, pp. 284-291.

(Continued)

*Primary Examiner* — Maurice C Smith
(74) *Attorney, Agent, or Firm* — Staniford Tomita LLP

(57) ABSTRACT

An apparatus for collection and detection of airborne particles includes an optical imaging system having an exposure time, a particle inspection zone, and a flexible substrate with an adhesive coating. The flexible substrate passes through the particle inspection zone. The flexible substrate alternates between an advancing state of moving through the particle inspection zone and an imaging state of not moving through the particle inspection zone. In the imaging state the flexible substrate is so tensioned so that a portion of the flexible substrate in the particle inspection zone moves at most a small distance during the exposure time.

24 Claims, 33 Drawing Sheets

Related U.S. Application Data application No. 62/210,253, filed on Aug. 26, 2015, provisional application No. 62/129,571, filed on Mar. 6, 2015, provisional application No. 62/188,606, filed on Jul. 3, 2015.

(56) References Cited

U.S. PATENT DOCUMENTS

| | | | |
|---|---|---|---|
| 5,139,743 A * | 8/1992 | Ishizaka | G01N 35/00009 422/63 |
| 5,866,430 A * | 2/1999 | Grow | G01N 21/65 436/172 |
| 5,955,376 A | 9/1999 | Tovey | |
| 5,972,714 A * | 10/1999 | Roland | G01N 33/0039 436/135 |
| 6,137,655 A * | 10/2000 | Hojo | G11B 23/049 360/128 |
| 6,359,681 B1 | 3/2002 | Housand | |
| 6,594,001 B1 | 7/2003 | Yabusaki | |
| 6,608,682 B2 | 8/2003 | Ortyn et al. | |
| 6,964,189 B2 | 11/2005 | Carlson et al. | |
| 7,006,923 B1 | 2/2006 | Rubin | |
| 7,207,948 B2 | 4/2007 | Coyle | |
| 7,384,792 B1 * | 6/2008 | Wang | G01J 3/44 428/343 |
| 7,532,314 B1 | 5/2009 | Black et al. | |
| 7,711,495 B2 | 5/2010 | Perner | |
| 8,031,968 B2 | 10/2011 | Ishiga | |
| 8,038,944 B1 | 10/2011 | Gordon et al. | |
| 8,222,061 B2 | 7/2012 | Xu et al. | |
| 8,404,198 B2 | 3/2013 | Amshey et al. | |
| 8,506,686 B2 | 8/2013 | Langle et al. | |
| 8,639,043 B2 | 1/2014 | Levenson et al. | |
| 8,806,915 B2 | 8/2014 | White et al. | |
| 8,906,673 B2 | 12/2014 | Vu et al. | |
| 8,930,341 B2 | 1/2015 | Amin et al. | |
| 9,052,293 B2 * | 6/2015 | Miltner | G01N 21/8483 |
| 9,597,681 B2 * | 3/2017 | Kurata | B01L 3/50 |
| 2004/0227938 A1 | 11/2004 | Craig | |
| 2005/0030534 A1 | 2/2005 | Oldham | |
| 2005/0142608 A1 | 6/2005 | Uchida et al. | |
| 2005/0261841 A1 | 11/2005 | Shepard et al. | |
| 2007/0217950 A1 * | 9/2007 | Kramer | A61B 5/14532 422/66 |
| 2007/0263217 A1 | 11/2007 | Otsuki | |
| 2010/0255560 A1 | 10/2010 | Call et al. | |
| 2013/0029408 A1 | 1/2013 | Gordon | |
| 2014/0135606 A1 * | 5/2014 | Yasui | A61B 5/14532 600/365 |
| 2014/0206034 A1 | 7/2014 | Gordon et al. | |
| 2014/0228657 A1 | 8/2014 | Palley et al. | |
| 2014/0252274 A1 | 9/2014 | Masson et al. | |
| 2014/0273184 A1 | 9/2014 | Gordon | |
| 2014/0288396 A1 | 9/2014 | LeBoeuf et al. | |
| 2014/0298890 A1 | 10/2014 | Pruett | |
| 2014/0353475 A1 | 12/2014 | Meyers | |
| 2015/0202619 A1 * | 7/2015 | Bransgrove | G01N 35/00009 422/401 |
| 2016/0116404 A1 * | 4/2016 | Bertaux | G06F 16/29 356/338 |
| 2018/0284003 A1 | 10/2018 | Lucas et al. | |

FOREIGN PATENT DOCUMENTS

| | | |
|---|---|---|
| WO | WO2014124133 A1 | 8/2014 |
| WO | WO2014207629 | 12/2014 |

OTHER PUBLICATIONS

"Local Production of IgG, IgA, and IgE Antibodies in Grass Pollen Hay Fever", Thomas A.E. Platts-Mills, J Immunology 1979, http://www.jimmunol.org/content/122/6/2218, pp. 2218-2225.

Wikipedia, "Palynology" available at <http://en.wikipedia.org/wiki/Palynology >, retrieved May 16, 2015, pp. 1-7.

International Federation of Palynologial Societies, "PALYNOS", available at <http://www.geo.arizona.edu/palynology/plns1406.pdf>, retrieved May 6, 2015, pp. 1-23.

13th International Palynological Congress & International Organization of Palaeobotany, Katherine Holt & Keith Bennett, IPC XIII .IOPC IX 2012 Conference session (SS18) organizers, "(SS18) Progress and future direction of automated palynology", previously available at http://www.psj3.org/ipc-%C2%AD-iopc2012/Download_files/SS18.pdf, retrieved Nov. 26, 2014, pp. 1-6.

Maureen E. Lacey and Jonathan S. West, "The Air Spora", book published by Springer in 2006, pp. 1-163.

Massey University (Computer-Aided Palynology), <http://www.classifynder.com/index.php?q=content/system_operation> retrieved Mar. 6, 2016, pp. 1-13.

Gildardo Lozano Vega et al., "Sketch of an automatic image based pollen detection system", available at <https://hal.archives-ouvertes.fr/hal-00824014/PDF/Lozano_et_al_DGPF_2012_Sketch_of_an_automatic_image_based_pollen_detection_system.pdf>, retrieved May 31, 2015, pp. 1-9.

Thomas Drugman et al., "Objective Study of Sensor Relevance for Automatic Cough Detection", Journal of LATEX Class Files, vol. 6., No. 1, Jan. 2007, pp. 1-8.

Mayo Clinic, "Hay Fever / Symptoms", available at <http://www.mayoclinic.org/diseases-conditions/hay-fever/basics/symptoms/con-20020827>, retrieved May 31, 2015, pp. 1-4.

John T. Connell, "Quantitative Intranasal Pollen Challenges" III. The priming effect in allergic rhinitis; Jan. 1969; pp. 1-12.

Phil Etheridge, "Discrimination of Pollen Taxa from Digital Image Feature Data"; Institute of Information Sciences and Technology Massey University; Oct. 18, 2005; pp. 1-20.

G.P. Allen et al., "Automatic Recognition of Light-Microscope Pollen Images"; available at <http://www.classifynder.com/sites/default/papers/ivenz06GApollenAutoRecognition.pdf>, retrieved Mar. 6, 2016, pp. 1-6.

Ping Li et al., "Pollen texture identification using neural networks"; 1999 Scandinavian University Press. ISSN 0017-3134; Grana 38; pp. 1-6.

P. Li et al., "Towards automation of palynology 2: the use of texture measures and neural network analysis for automated identification of optical images of pollen grains"; Journal of Quaternary Science (2004) 19(8); pp. 1-8.

E.C. Stillman et al.;"The Needs and Prospects for Automation in Palynology"; Quaternary Science Reviews, vol. 15, pp. 1-5, 1996.

W.J. Treloar et al., "Towards automation of palynology 1: analysis of pollen shape and ornamentation using simple geometric measures, derived from scanning electron microscope images"; Journal of Quaternary Science (2004) 19(8) 745-754; pp. 1-10.

Michael Wachs et al.; "Observations on the pathogenesis of nasal priming"; Department of Medicine (Division of Clinical Immunology) and Otolaryngology, The John Hopkins University School of Medicine, Baltimore, MD.,1989; pp. 1-12.

Y. Zhang et al., "Towards automation of palynology 3: pollen pattern recongnition using Gabor transforms and digital moments"; Journal of Quaternary Science (2004) 19(8) 763-768; pp. 1-6.

Craig Alexander Holdaway, "Automation of Pollen Analysis using a Computer Microscope," 2004, pp. 1-125.

(Levetin, E) Methods for Aeroallergen Sampling. Curr Allergy Asthma Rep. Sep. 2004; vol. 4 No. 5; pp. 376-383; table 1.

(Kirmaz, C et al.) Symptoms of the Olive Pollen Allergy; Do They Really Occur Only in the Pollination Season?. J Investig Allergol Clin Immunol; 2005; vol. 15, No. 2; pp. 140-145; abstract; p. 141, col. 1, paragraph 4; p. 142; col. 1, paragraph 1.

"International Search Report and the Written Opinion of the International Searching Authority" dated Jun. 2, 2016; International Application No. PCT/US16/21058; International Filing Date: Mar. 4, 2016; pp. 1-13.

Burkard, "Personal Volumetric Air Sampler" available at <http://www.burkard.co.uk/perssamp.htm>, retrieved Jul. 3, 2016, 1 page.

ACLIMA, available at <https://aclima.io/what>, retrieved Jul. 3, 2016, 5 pages.

INSPIROTEC, available at <http://inspirotec.com>, retrieved Jul. 3, 2016, 3 pages.

(56) References Cited

OTHER PUBLICATIONS

C. Pohlker, et. al., "Autofluorescence of atmospheric bioaerosols—fluorescent biomolecules and potential interferences," Atmos. Meas. Tech., 5, 37-71, 2012, Jan. 9, 2012, pp. 37-71, Copernicus Publications.

"International Search Report and the Written Opinion of the International Searching Authority, or Declaration" dated Sep. 27, 2016; PCT Application No. PCT/US2016/036713 filed Jun. 9, 2016; Applicant: Scanit Technologies, Inc.

Accuweather Allergy Forecast, available at <http://www.accuweather.com>, accessed Jun. 14, 2017.

Berger, Uwe, et al., "Personalized Pollen-Related Symptom-Forecast Information Services for Allergic Rhinitis Patients in Europe," Allergy, European Journal of Allergy and Clinical Immunology, Jul. 2013, pp. 1-4.

Pollen.com "Sign in to Personalize Your Pollen.com Experience," available at <http://www.pollen.com>, accessed Jun. 14, 2017.

Polleninfo.org "Welcome to the Pollen Diary," available at <http://www.polleninfo.org>, accessed Jun. 14, 2017.

"International Preliminary Report on Patentability" dated Jun. 30, 2017; PCT/US2016/021058, International Filing Date Mar. 4, 2016, Applicant: Scanit Technologies, Inc.

"International Preliminary Report on Patentability" dated Dec. 21, 2017; PCT/US2016/036713, International Filing Date Jun. 9, 2016, Applicant: Scanit Technologies, Inc.

U.S. Appl. No. 62/076,507, filed Nov. 7, 2014; Landon D. Bunderson et al.

Anatharam et al. "Knowledge-driven Personalized Contextual mHealth Service for Asthma Management in Children". Mobile Services (MS), 2015 IEEE International Conference on Mobile Services Jun. 2015, pp. 284-291 (2015).

Platts-Mills, "Local Production of IgG, IgA, and IgE Antibodies in Grass Pollen Hay Fever". The Journal of Immunology 1979, 122, pp. 2218-2225 (1979).

* cited by examiner

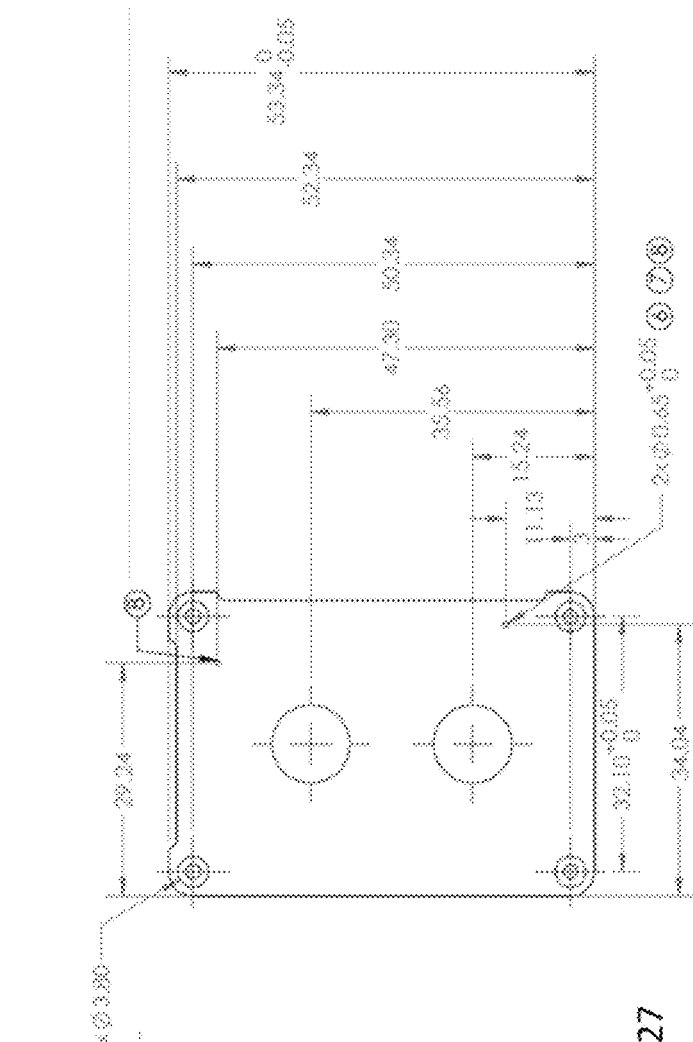
Figure 26
Figure 27
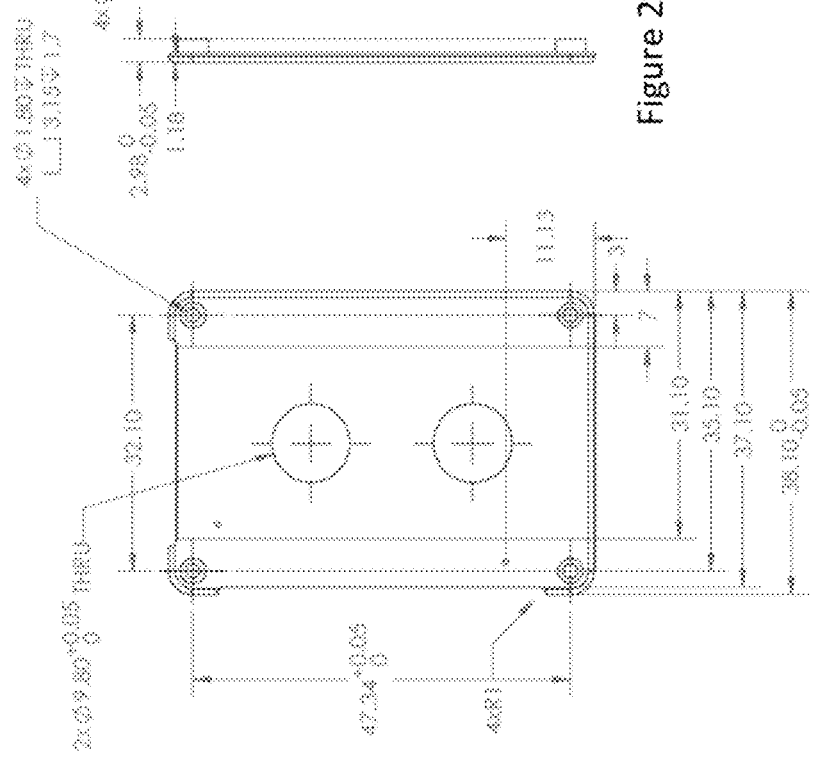
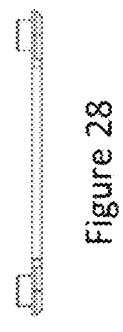
Figure 28
Figure 25

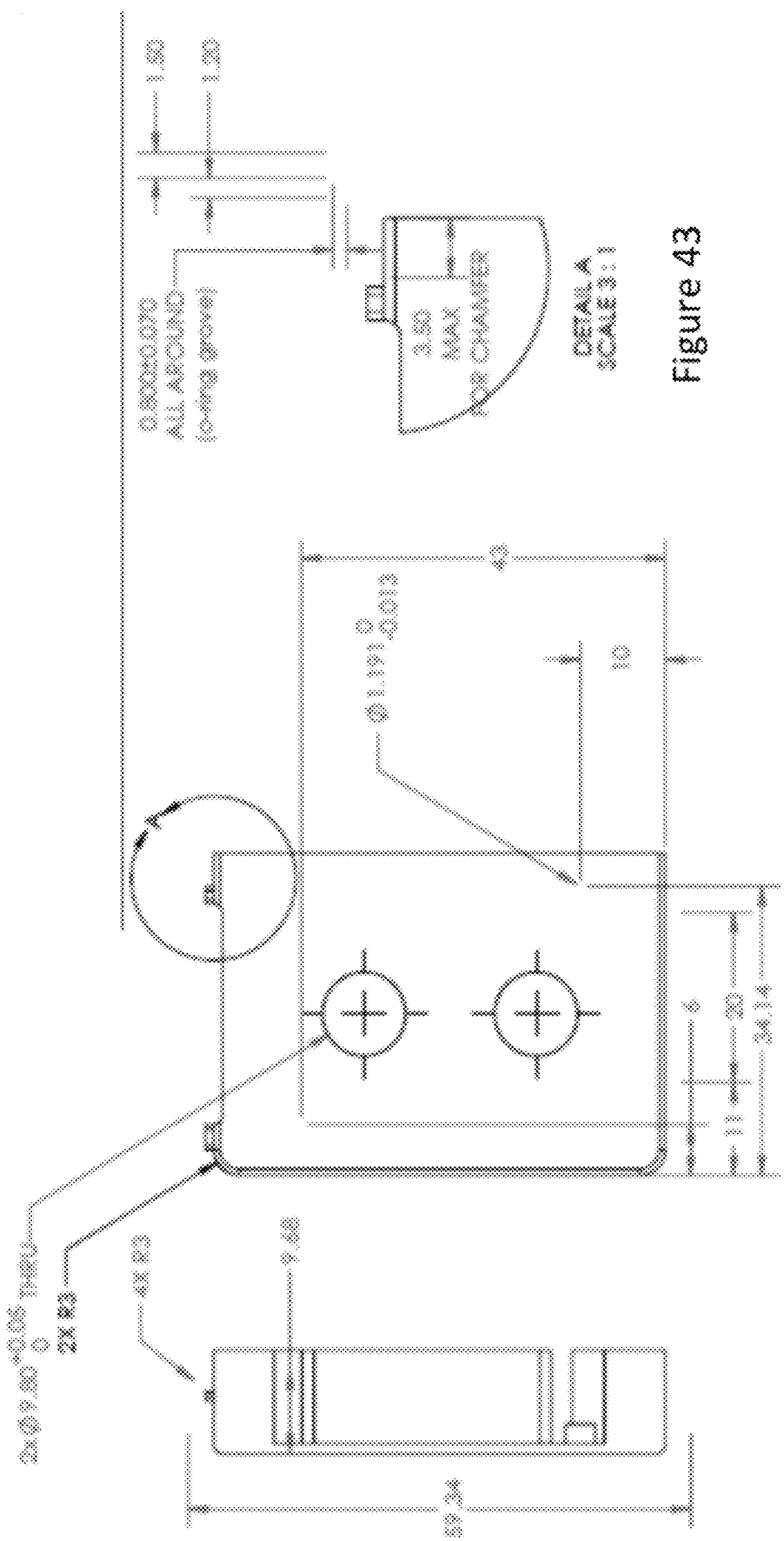

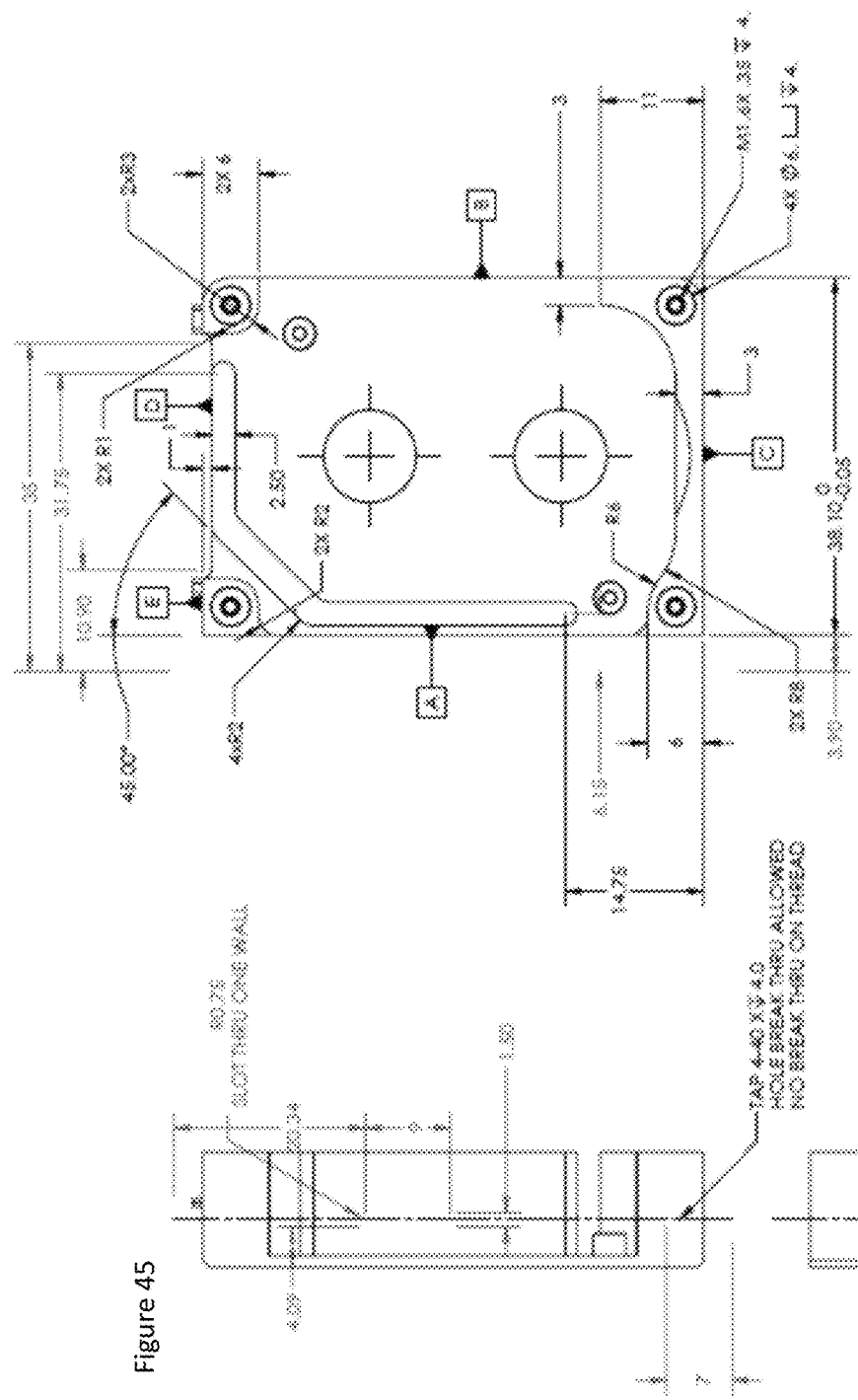

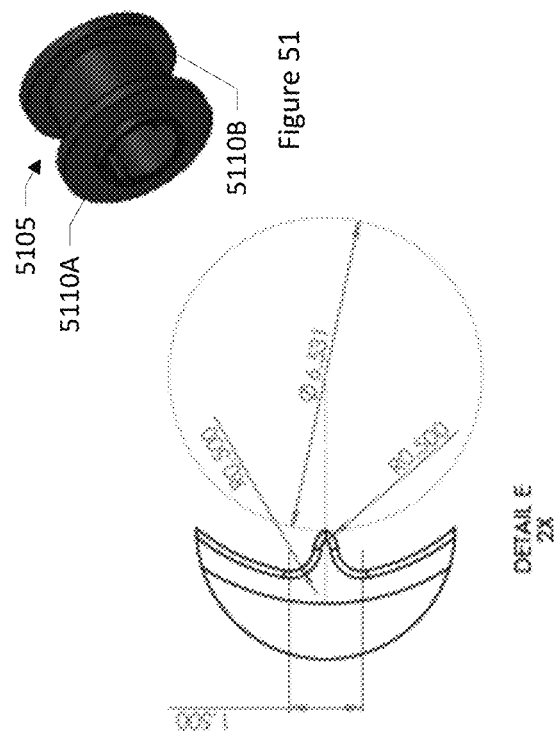
Figure 51
Figure 54
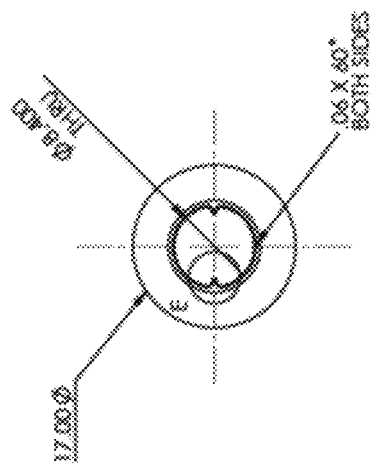
Figure 53
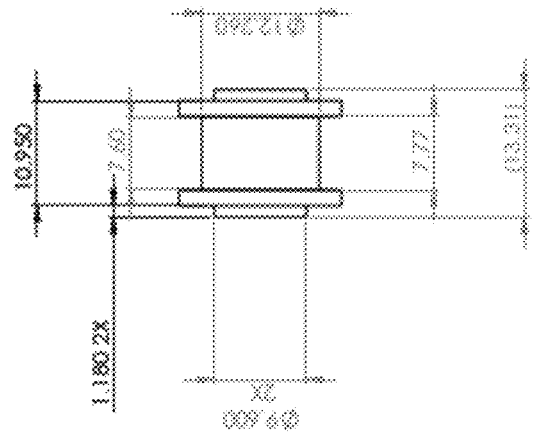
Figure 52

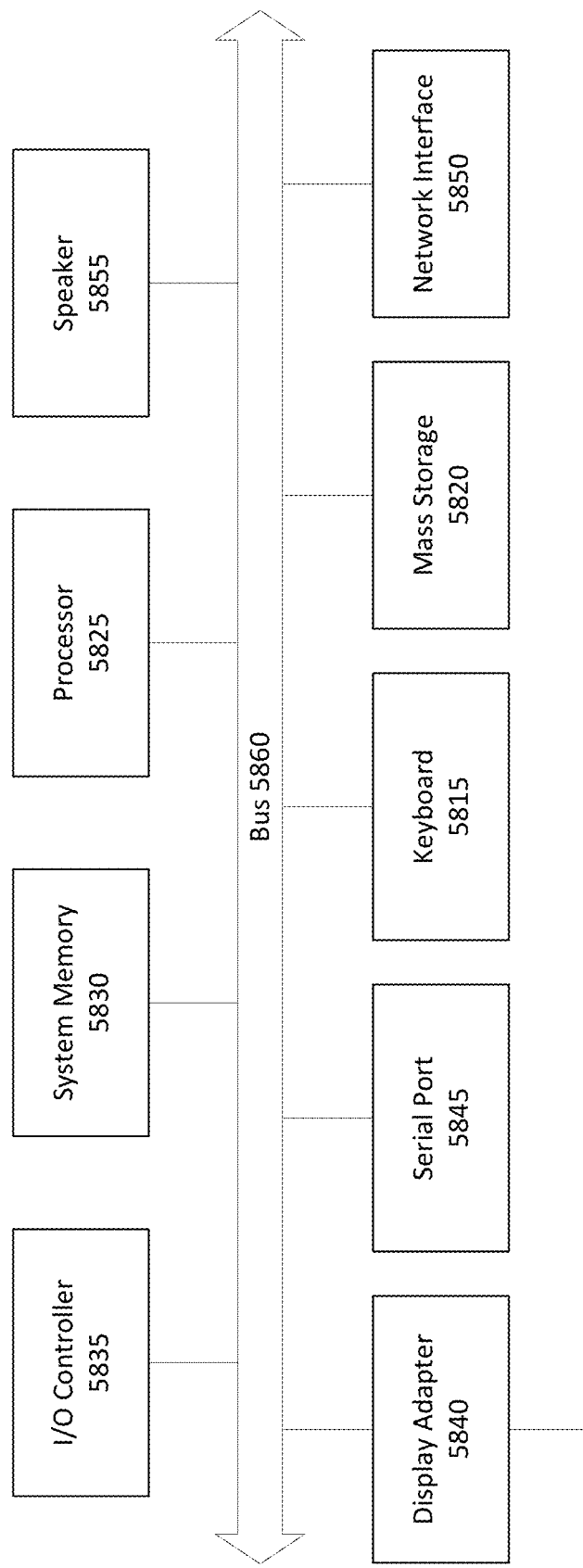

PARTICLE COLLECTION MEDIA CARTRIDGE WITH TENSIONING MECHANISM

CROSS-REFERENCE TO RELATED APPLICATIONS

This patent application claims the benefit of U.S. provisional patent application 62/458,383, filed Feb. 13, 2017, and is a continuation-in-part of U.S. patent application Ser. No. 15/667,829, filed Aug. 3, 2017, which claims the benefit of U.S. provisional patent application 62/370,604, filed Aug. 3, 2016, and is a continuation-in-part of U.S. patent application Ser. No. 15/178,170, filed Jun. 9, 2016, which claims the benefit of U.S. provisional patent applications 62/173, 280, filed Jun. 9, 2015, and 62/210,253, filed Aug. 26, 2015, and which is a continuation-in-part of U.S. patent application Ser. No. 15/061,883, filed Mar. 4, 2016, which claims the benefit of U.S. provisional patent applications 62/129, 571, filed Mar. 6, 2015, and 62/188,606, filed Jul. 3, 2015, all of which are incorporated by reference along with all other references cited in this application.

BACKGROUND

The present invention relates generally to the field of air monitoring—such as for agricultural pathogens, allergenic pollens, asbestos or silica particles that can harm lungs, man-made metallic dust that can cause shorts in electrical equipment, or other airborne particles—and more particularly, to a removable media cartridge that can be used with a particle collection device.

One example of an airborne particle for which monitoring may be desired is a mold spore. Farms and vineyards can suffer from certain types of mold as winds can carry mold spores for many miles. Depending on climatic conditions, losses for vineyards may range from about 15 percent to about 40 percent or more of the harvest. The lost in harvest results in lost revenue, profit, and jobs. There is a need to cost-effectively and rapidly detect damaging mold spores so that control and mitigation measures can be quickly developed and deployed to save a harvest.

Another example of an airborne particle for which monitoring may be desired is pollen. Many people are allergic to pollen. There remains an unmet need to provide individuals with personalized, prompt and actionable information regarding their exposure to allergens.

Yet another example of an airborne particle for which monitoring may be desired are electrostatic dust particles or fibers that can cause shorts in the massive amount of electronics that must perform at very high levels of reliability in server farms.

In other words, it is desirable to monitor indoor critical environments such as those in clean room manufacturing, compound pharma, industrial hygiene and processes (e.g., fermentation process room), and the like where there is interest in capturing and identifying particles especially those that can contaminate and be damaging to the manufacturing process. Unlike pollens or molds, the particles here can be man-made metallic or process related fibers, dust, minerals (e.g., silica and asbestos), and general debris that may become airborne.

For example, a server facility may be interested in monitoring for electrostatic dust and fibers that can cause shorts in the equipment. In the case of compound pharma it may be of interest to detect for bacteria and fungi. And a fermentation column at a winery may be interested in monitoring for certain airborne yeast that cause foul smells in bottled wine. Mold is a type of fungi which includes mushrooms, yeasts, molds, rusts, smuts, puffballs, truffles, morels, and moulds. In short, depending upon the application, it is desirable to monitor not just molds and pollens in airborne particulate.

Again there is a need for cost-effectively and rapidly detecting particles of interest. For this purpose, there is an unmet need for low-cost and effective removable media with which to capture particles of interest for remote or local automated inspection.

BRIEF SUMMARY OF THE INVENTION

In an embodiment, an apparatus for collection and detection of airborne particles includes an optical imaging system having an exposure time, a particle inspection zone, and a flexible substrate with an adhesive coating. The flexible substrate passes through the particle inspection zone. The flexible substrate alternates between an advancing state of moving through the particle inspection zone and an imaging state of not moving through the particle inspection zone. In the imaging state, the flexible substrate is so tensioned so that a portion of the flexible substrate in the particle inspection zone moves at most a small distance during the exposure time. That is, the tensioning means allows the optical imaging system to capture images of particles of interest with minimal blurring due to particle motion during exposure.

BRIEF DESCRIPTION OF THE FIGURES

FIG. 25 shows an inside view of a front panel of the cartridge.

FIG. 26 shows an outside view of the front panel.

FIG. 27 shows a side view of the front panel.

FIG. 28 shows a top view of the front panel.

FIG. 40 shows a side view of the cartridge shown in FIG. 39.

FIG. 41 shows a front view of the cartridge shown in FIG. 39.

FIG. 43 shows a detail view of the cartridge shown in FIG. 39.

FIG. 44 shows another inside back view of the cartridge shown in FIG. 39.

FIG. 45 shows a side view of the cartridge shown in FIG. 39.

FIG. 46 shows another side view of the cartridge shown in FIG. 39.

FIG. 51 shows a perspective view of a reel having a pair of flanges according to one or more embodiments.

FIG. 52 shows a side view of the reel shown in FIG. 51.

FIG. 53 shows a front view of the reel shown in FIG. 51.

FIG. 54 shows a detail view of the reel shown in FIG. 51.

FIG. 58 shows a block diagram of a computer system suitable for use with the system in accordance with one or more embodiments.

DETAILED DESCRIPTION

Figure 1:
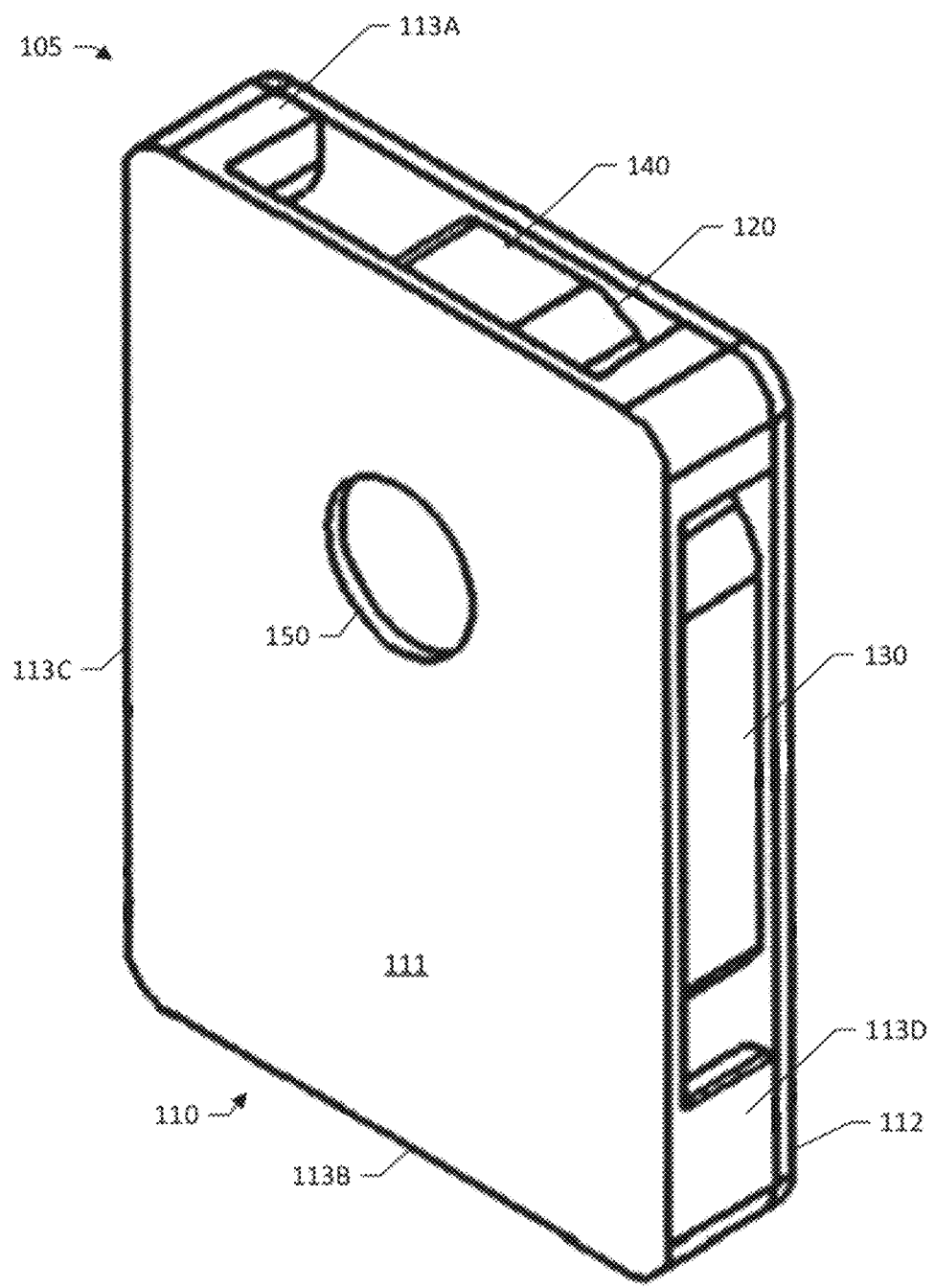
FIG. 1 shows an isometric view of a particle media cartridge that may be used with a particle monitor device.
Figure 3:
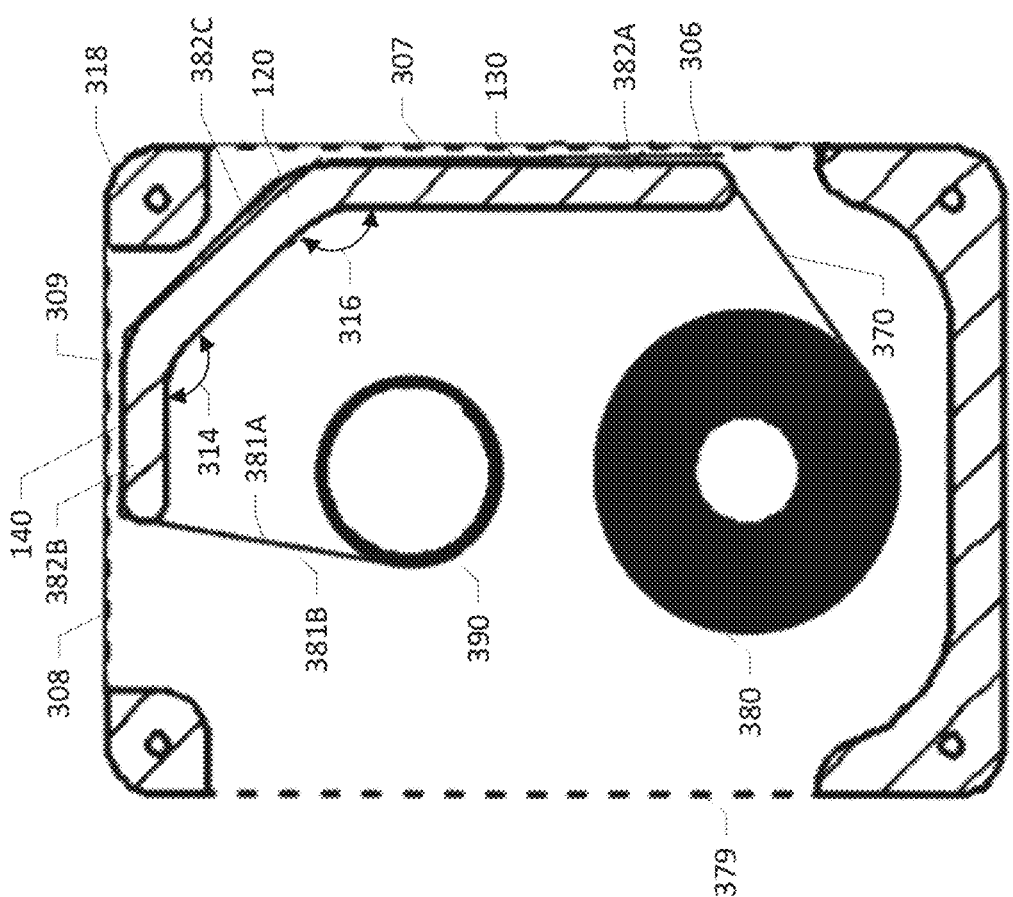
FIG. 3 shows a plan view of a cross section of the particle media cartridge including media of the cartridge shown in FIG. 1.
Figure 2:
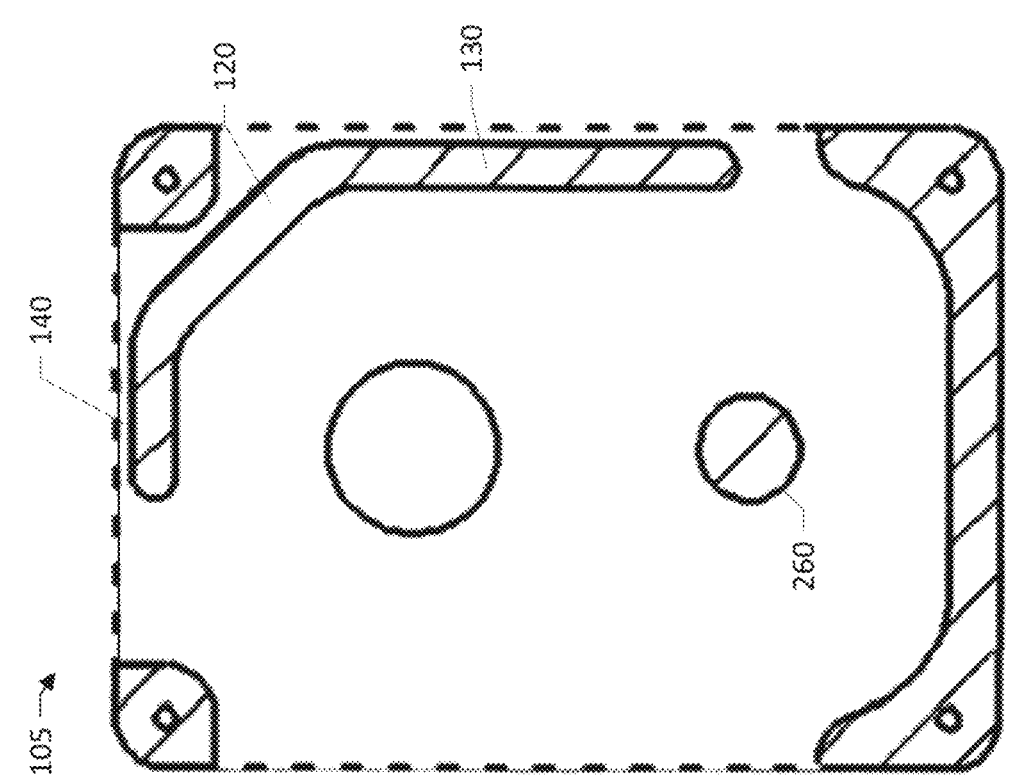
FIG. 2 shows a plan view of a cross section of the cartridge shown in FIG. 1.

FIGS. 1-3 illustrate a particle media cartridge 105 that can be used to collect particles for examination. In an embodiment, the particles are airborne particles that may include, for example, mold spores, pollen, dust, and the like. In a specific embodiment, the cartridge is used with a particle collection device having an imaging mechanism (e.g., camera sensor) that captures images of particles that have been collected within the cartridge for analysis. An example of a suitable particle collection device is described in U.S. patent application Ser. No. 15/061,883, filed Mar. 4, 2016, and Ser. No. 15/178,170, filed Jun. 9, 2016, which are incorporated by reference along with all other references cited. The particle collection device may be referred to as a monitor or airborne particle monitor.

The cartridge may be loaded or removed from the particle collection device via a particle-media-cartridge door of the collection device. The cartridge includes a media for capturing particles as well as a cartridge body 110. In this specific embodiment the media includes an adhesive coated tape. Here "tape" is understood to mean any flexible substrate serving the intended purpose including polymer films such as polyester films, metal foils, etc. The tape is flexible so that it can be wound or coiled into a set of concentric circles without breaking or cracking.

The electrical properties of the media may be described as insulating, conductive or resistive. In some embodiments, the electrical properties of the media have no effect on function. In other embodiments, the electrical properties of the media may be engineered to support electrostatic capture of particles of interest. For example, the media may be conductive, or not too highly resistive, so that it can be electrically grounded while nearby high-voltage electrodes in a particle collection zone accelerate charged particles of interest towards the media.

The media or tape upon which particles are collected may include a film that is electrostatically charged to attract and hold particles. The media can be wound into any shape. For example, in a specific embodiment, it can be placed into a square or triangle as long as the edges of each bend are not sharp causing it to break. Such shapes or others can help save space inside the monitoring device itself and thus allow for a more compact, portable, and less-intrusive monitoring device.

The cartridge body includes a tape guide structure or wall 120 that includes portions including an air-intake zone segment 130 and a particle inspection zone segment 140. The air-intake zone may be referred to as a particle intake zone.

In a specific embodiment, when the cartridge is loaded into the collection device, the cartridge is positioned inside the collection device such that the air-intake zone faces an opening or slot of the collection device. Air can then be drawn into the collection device through the slot of the collection device and towards the air-intake zone. Particles floating in the air may then be trapped by the adhesive on the tape of the cartridge. In this specific embodiment, the cartridge is also positioned or oriented inside the collection device such that the particle inspection zone is below a camera sensor of the collection device. In other words, the camera sensor of the collection device is positioned above the particle inspection zone of the cartridge. A motor of the collection device can advance a portion of the tape having the trapped particles from the air-intake zone to the particle inspection zone where the camera sensor can capture an image of the trapped particles for analysis.

In another specific embodiment, there is particle collection device that does not include a particle-media-cartridge door. In this specific embodiment, there is a cartridge (which may also be referred to as a cassette) which incorporates an air-intake directly into the cassette. In other words, in other different embodiments, the particle intake structure is directly in the cassette and its intake is directly exposed to the outside while the rest of the cassette and media are kept internal/within the unit. The intake is designed onto air-intake zone 130 of the cartridge cassette. This simplifies the assembly, reduces parts and components and requires no tools for inserting/releasing the cassette from the unit. In another specific embodiment, the door may be a sliding door, a hinged door, or a removable door, perhaps including a cartridge structure to provide reliable and reproducible alignment between the air intake slot of the door and air intake region of the cartridge.

The cartridge body 110 includes a gear-shaft hole 150 that will be discussed further below. In alternate embodiments, particularly in cases where it is desired to be able to rewind as well as advance the tape, there may be a second gear-shaft hole (not shown in FIG. 1).

FIGS. 2 and 3 show a cross-section of the cartridge body with the media (FIG. 3) and without the media (FIG. 2). The cross-section is for a plane parallel to, in the middle of, planes corresponding to front panel 111 (FIG. 1) and back panel 112 (FIG. 1). The dashed lines in FIGS. 2 and 3 represent portions of the plan-view edges of front panel 111 and back panel 112 shown in FIG. 1.

Referring now to FIG. 3, a supply reel 380 of adhesive coated tape 370 is mounted to supply-reel post 260 (FIG. 2). In the air-intake zone 130, the tape guide structure 120 fixes the location of the adhesive coated tape 370 where it collects particles in the face of air pressure from air entering the housing of the particle collection device via an air-intake slot of the particle collection device. The adhesive coated tape 370 then passes the particle inspection zone 140 and is finally collected at the uptake reel 390. A reel may be referred to as a wheel. Optionally, after use within the particle collection device, the particle-media cartridge may be removed from the device and sent to a laboratory where particles captured by media can be further studied optically or with bio-assays.

Referring now to FIG. 1, in a specific embodiment, a user-removable or replaceable particle media cartridge is provided. The cartridge includes a front panel 111, a back panel 112, opposite the front panel. Side panels including a top side panel 113A, a bottom side panel 113B, a left side panel 113C, and a right side panel 113D extend between the front and back panels. The top and bottom side panels are opposite to each other. The left and right side panels are opposite to each other. The top and bottom side panels are orthogonal to the right and left side panels. As shown for left, top and right sides, side "panels" may cover only a small portion of their respective side. The cartridge has a shape of a rectangle.

Referring now to FIG. 3, the right side panel includes a first opening or slot 307 corresponding to air intake zone 130. The top side panel includes a second opening or slot 309 corresponding to particle inspection zone 140. The left side panel includes a third opening or slot that may be referred to as an exhaust port 379.

In a specific embodiment, the second opening of the top side panel may be covered by a protective film or window. The protective film may be transparent or clear such that a portion of the tape below the protective film remains visible. The protective film can help prevent contamination of the tape, but still allow an optical imaging system to capture images of particles collected by the tape.

A length of the cartridge between the top and bottom side panels is L1, a width of the cartridge between the left and right side panels is W1, a length of the air intake zone opening is L2, a length of the particle inspection zone opening is L3, and a length of the exhaust opening is L4. In an embodiment, a ratio of L2 to L1 may be about 1:1.5, but may vary greatly such as 1:1.3, 1:1.4, 1:1.6, or 1:1.7. A ratio of L3 to W1 may be about 1:1.4, but may vary greatly such as 1:1.2, 1:1.3, 1:1.5, or 1:1.6. A ratio of L4 to L1 may be about 1:1.5, but may vary greatly such as 1:1.3, 1:1.4, 1:1.6, or 1:1.7.

A thickness of the cartridge between the front and back panels is T1. A width of the air intake zone opening is W2. A width of the particle inspection zone opening is W3. A width of the exhaust opening is W4. In an embodiment, the width of the openings W2, W3, and W4 are equal. In another embodiment, a width may be different from another width. In an embodiment, a ratio of at least one of W2, W3, or W4 to T1 is about 1:1.4, but may vary greatly such as 1:1.2, 1:1.3, 1:1.5, or 1:1.6. A shape of the intake zone, particle inspection zone, and exhaust openings may be a rectangle or other shape (e.g., oval, round, obround, or circle).

Inside the cartridge is supply reel 380, uptake reel 390, and tape guide structure 120. The supply reel includes the roll of tape. The tape includes an inside or bottom surface 381A and an outside or top surface 381B, opposite the inside surface. The tape is wound so that the inside surface faces towards a center of the roll, and the outside surface faces away from the center of the roll. The outside surface of the tape includes an adhesive. The tape may be made of a thin flexible material such as narrow strip of plastic. In an embodiment, the tape is non-magnetic or not magnetic or does not include a magnetizable coating. The tape includes an adhesive coating on the outside surface of the tape to trap particles. In some embodiments, tape may be clear, translucent, transparent, or at least partially transparent to facilitate illumination of trapped particles. That is, the tape may be made of a material that allows at least some light to pass through. In other embodiments, the tape may be black or other dark color.

The inside surface of the tape may not include the adhesive and preferably moves with minimal or low friction against tape guide 120. The inside surface may be treated with a coating that allows the inside surface of the tape to glide freely across the tape guide. For example, in an embodiment there is a roll of tape including an inside surface and an outside surface. A coating or treatment is applied to the inside surface such that a coefficient of friction of the inside surface after the treatment is less than a coefficient of friction of the inside surface before the treatment. In another specific embodiment, the tape or portions of the tape may include a magnetizable coating. Such a magnetizable coating may be used to mark and read locations along the length of the tape of interesting particles that may merit later laboratory testing such as bio-assays. In another specific embodiment, besides or in addition to magnetic coatings, one or both sides of the tape may contain special markings like those of a ruler that can also be used to read locations of particles in other laboratory equipment.

The tape guide structure is sandwiched between the front and back panels of the cartridge. The tape guide includes a first segment 382A, a second segment 382B, orthogonal to the first segment, and a third segment 382C extending between ends of the first and second segment. The first segment extends in a direction parallel to the right side panel. The first segment extends along at least a portion of the length of the front and back panels. The first segment includes a surface that faces the first opening (e.g., air intake zone) of the cartridge.

The second segment extends in a direction parallel to the top side surface. The second segment extends along at least a portion of the width of the front and back panels. The second segment includes a surface that faces the second opening (e.g., particle inspection zone). A length of the first segment may be greater than a length of the second segment. A length of the first segment may be less than a length of the second segment. A length of the first segment may be the same as a length of the second segment.

The tape extends from the supply reel, across the top surfaces of the first, second, and third segments of the tape guide structure, and terminates at the uptake reel. The uptake reel is closer to the top side of the cartridge than the supply reel. The supply reel is closer to the bottom side of the cartridge than the uptake reel. The tape is configured so that the inside surface contacts the top surfaces of the first, second, and third segments of the tape guide structure while the outside surface of the tape, which includes the adhesive, is exposed at the air intake and particle inspection zones. Thus, particles entering the air intake zone can be trapped by the adhesive and then inspected at the particle inspection zone. The air can pass from the air intake zone and out the exhaust port of the cartridge. The inside surface of the tape may be smooth or without the adhesive so that the tape can glide across the tape guide structure. The surface the tape guide structure may be treated with a coating that allows the inside surface of the tape to glide freely across the tape guide.

The first segment of the guide is positioned so that it is slightly recessed within the opening corresponding to air intake zone 130. That is, right side edges 306 of the front and back panels of the cartridge extend slightly past the first segment. A distance from the right side edges of the panels to the first segment may be at least a thickness of the tape. The recessing of the first segment helps to protect the tape from unintended contact with other objects.

Similarly, the second segment of the guide is positioned so that it is slightly recessed within the opening corresponding to particle inspection zone 140. That is, top side edges 308 of the front and back panels of the cartridge extend slightly past the second segment. A distance from the top side edges of the panels to the second segment may be at least a thickness of the tape. The recessing of the second segment helps to protect the tape from unintended contact with other objects.

In the example of the cartridge shown in FIG. 3, the first and second segments of the tape guide are on adjacent sides of the cartridge. That is, the first segment is on the right side of the cartridge and the second segment is on the top side of the cartridge. The position of the tape guide segments corresponds to the design of the particle monitor. For example, when the cartridge is inserted into the particle monitor, the second segment of the tape guide will be located directly below the optical imaging system or microscope including camera sensor and lens assembly. It should be appreciated, however, that the tape guide segments may be positioned at other locations depending upon the design of the particle monitor.

An angle 314 is between the second and third segments. An angle 316 is between the first and third segments. In an embodiment, the angles are obtuse, i.e., the angles are more than 90 degrees but less than 180 degrees. The angles and positioning of the tape guide segments help to prevent creases in the tape as the tape transitions from the supply reel, to the intake zone, below and past an upper right corner 318 of the cartridge, to the inspection zone, and to the uptake reel. The ends and corners of the tape guide may be rounded as shown in the FIG. 3 to help ensure that the tape glides smoothly over the tape guide and does not snag.

The cartridge, including the tape guide structure, may be made of plastic, nylon, metal, or other material, or combination of materials. The tape guide structure may be formed or molded as a single unit with one of the front or back panels of the cartridge. Alternatively, the tape guide structure may be formed as a unit separate from the front and back panels. When the tape guide structure is formed as a separate unit, the tape guide structure may be attached to at least one of the front or back panels using any number of a variety of techniques. Such techniques may include snap-fits, fasteners (e.g., screws), glues, and others.

Likewise, the front and back panels may be fastened together using any number of a variety of techniques. For example, the front and back panels may be snap-fitted together. The front and back panels may be glued together. In an embodiment, the front and back panels are connected using screws. In this embodiment, each corner of one of the front or back panel may include a screw boss. The boss provides a mounting structure to receive a screw. The screw passes through a hole in a corner of one of the front or back panels and is received by a screw boss located in a corresponding corner of another of the front or back panels.

The particle media cartridge shown in FIGS. 1-3 is different from a magnetic tape cassette for recording music or digital data. For example, in addition to the presence of a tacky adhesive coating, the particle media cartridge differs from a magnetic tape cassette in the following respect. In a magnetic tape cassette, proper tensioning of the tape is most important during tape motion when tape is leaving the supply reel and accumulating on the uptake reel; it is at this time that it is important that the tape velocity be well-controlled and the tape be in good contact with the read/write head. Less important is the tensioning of the magnetic tape during idle periods when music or data is not being recorded or played back.

In a specific embodiment, the situation is quite the opposite for the particle media cartridge 105. Precise control of tape velocity and tensioning is relatively less important when the adhesive-coated tape is in motion. Much more important for particle media cartridge design is proper tensioning during periods of image capture between periods of tape motion. During image capture it is desirable that the particles of interest, and hence the adhesive-coated tape holding them, remain very still. The desire to immobilize particles during image capture becomes particularly demanding for long image-capture exposure times of many seconds, such as may be desired to capture weak auto-fluorescence images during ultraviolet light exposure. Particle media cartridge design is judged by its ability to freeze tape motion during image capture while magnetic tape cartridge design is judged by its ability to smoothly move tape during magnetic recording or playback. These different desires lead to different design refinements. Described below is an advantageous refinement to particle media cartridge design that would be irrelevant or even undesired in magnetic tape cassette design.

Depending upon factors such as the motor used in the particle collection device to advance the cartridge tape, the type of tape material, and so forth, it can be difficult to achieve a proper tensioning of the tape when the motion of the tape is paused or stopped so that the tape remains properly positioned in the field of view of the camera sensor of the particle collection device. For example, depending upon the type of tape that is used in the cartridge, the tape may stretch or become slack such that it does not lie flat and properly positioned against the tape guide. As another example, the motor of the collection device may not be able to remove the slack from the tape or keep the tape properly tensioned and positioned against the tape guide.

Specifically, as tape is dispensed from its reel, the boundary layer where the tape peels off, experiences stresses and elongation that lasts until the system reaches equilibrium which can last for minutes. Tape elongations can be several millimeters in distance travel (stretched out).

In order to dispense (forward) the tape, the motor must exert a force higher than that which keeps the adhesive tape together in the reel. External, environmental factors such as temperature and humidity at the geographical location where the cartridge is used may affect the adhesion boundary layer thus changing the amount of force necessary to pull (dispense) the tape. The force needed to pull the tape forward when the surrounding temperature is cold (e.g., 40 degrees Fahrenheit) is much higher than when it is operating when the surrounding temperature is hot (e.g., 100 degrees Fahrenheit environment). Places in agriculture where the device is used can experience extreme temperature ranges of 40 degrees or more in a single day which will affect the force required for the motor to pull on the tape and change the elongation the tape experiences at the boundary layer. Even if the motor can adjust the torque, the tape will always or frequently undergo elongation that causes slack in the tape line.

In a specific embodiment, certain tapes that may be used in the cartridge have a polyester backing film that tend to want to retain their "circular" shape as these are immediately dispensed due to internal stresses. Thus, when the tape travels through the first and second segments (or air intake and inspection zones) of the tape guide of the cassette it wants to "bow" between transition points and not sit flat against the first and second segments of the tape guide. This contributes to particle drift for some time until the system reaches equilibrium which can last for minutes. Thus, some tension needs to be applied to keep the tape flat but not too much that will force the tape to advance forward and dispense.

Figure 6:
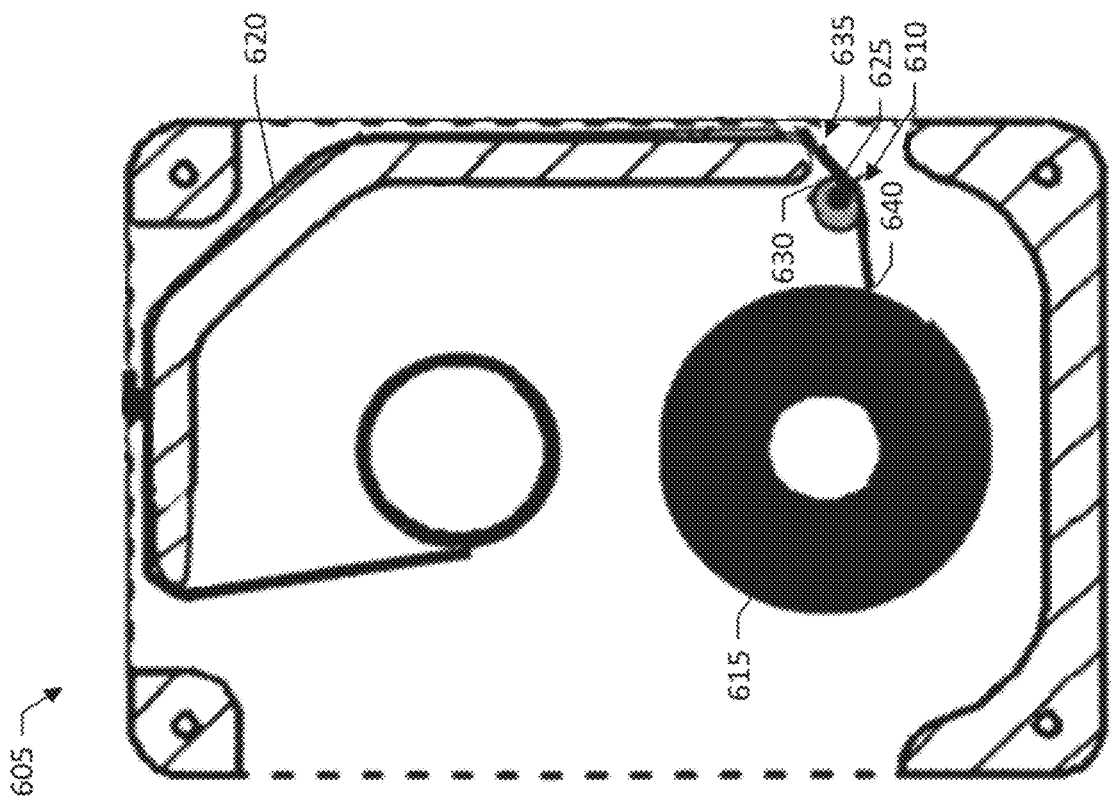

Slack is a key challenge of cartridge design. The overall design of the cassette and how the tape is to travel and transferred/moved from supply to uptake reel can increase or decrease the slack. For example, depending upon cassette design the amount of travel for the tape is small, but may suffer very tight angle bends as it travels which force it to want to deflect or bow excessively. Other design shapes such as a cassette having a typewriter ribbon cartridge shape that has a very long straight travel path between reels will tend to experience more bowing or deflection. The relatively short length of the straight portion of the tape guide 120 in the particle inspection zone 140 helps to reduce bowing where it would disrupt the focus of the optical imaging system. However, in some cases, this alone is not enough. Undesired slack and bowing can be further reduced with the aid of a tensioning mechanism such at the tensioning roller 610 (FIG. 6). The tensioning roller can be designed into the cassette that has more or less tension absorption characteristics as desired.

In other words, during image capture, positions of particles of interest may drift. Such particle position drift may occur in two directions, both out of and within the imaging system's focal plane. Disclosed herein is a media cartridge design that helps to reduce such drift. The media cartridge design, as disclosed herein, has also been observed to help keep the adhesive-coated tape centered on the take-up reel.

Figure 5:
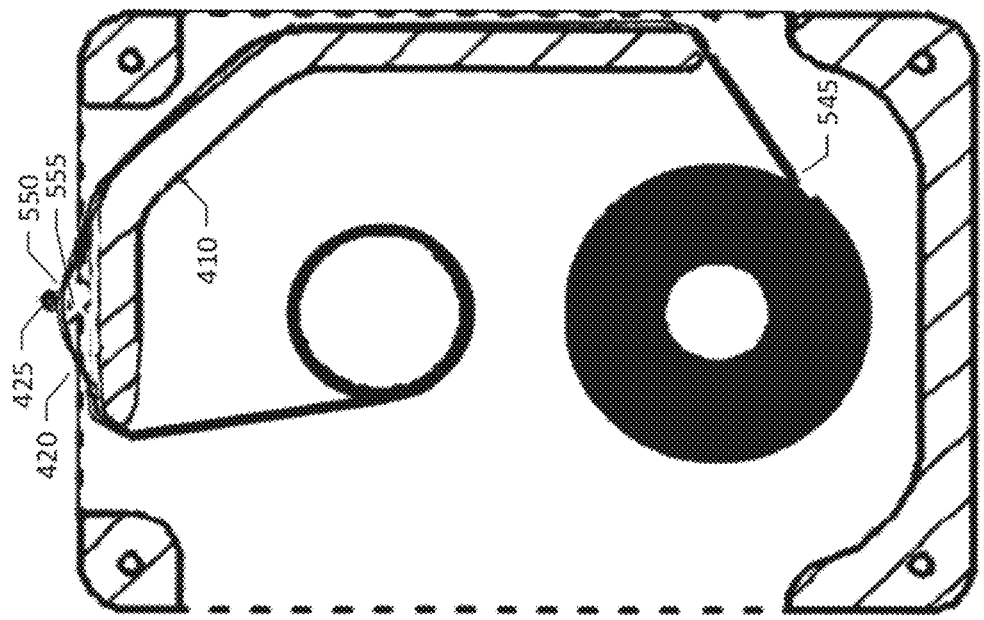
FIGS. 4 and 5 illustrate a slackening of the media cartridge tape.
Figure 4:
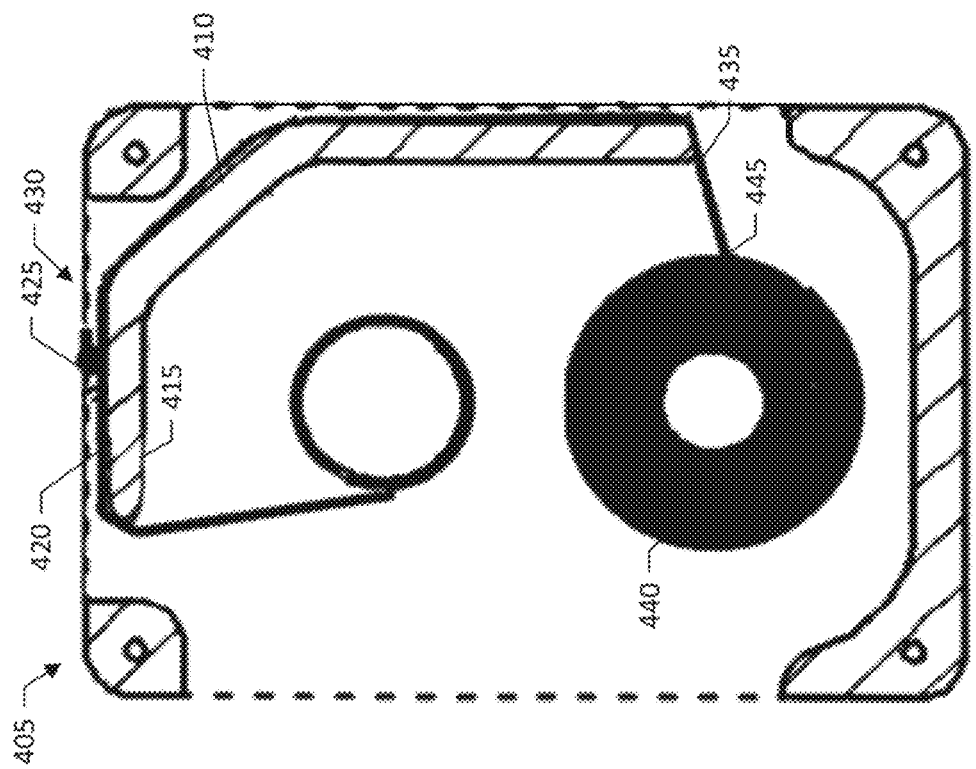

FIGS. 4 and 5 illustrate a problem that may occur due to slack in the tape. A particle media cartridge 405, as shown in FIGS. 4-5, is similar to the cartridge shown in FIGS. 1-3. The cartridge shown in FIGS. 4-5, however, includes a tape guide structure 410 having a longer particle inspection zone segment 415 as compared to the tape guide structure of the cartridge shown in FIGS. 1-3.

FIG. 4 illustrates a moment immediately after advancing the adhesive-coated tape so that a tape portion 420 with a particle of interest 425 is located in a particle inspection zone 430. At this moment, the tape is under sufficient tension to keep tape portion 420 flat against tape guide structure 410 and hence keep particle of interest 425 within the focal plane of the optical imaging system. At this moment, a tape portion 435 between a supply reel 440 and tape guide structure 410 sticks to the adhesive coating of unwound tape at point 445.

However, in some cases due to tape tension, over time, this sticking point 445 creeps to a sticking point 545 shown in FIG. 5, and in the process relaxes the tape tension. As shown in FIG. 5, with reduced tape tension, tape portion 420 forms an arc 550 above a surface of tape guide structure 410. In other words, rather than the tape making contact with or touching the surface of the tape guide, there is a gap 555 between the particle inspection zone segment of the tape guide and tape as shown in FIG. 5. This has the undesired effect of moving the particle of interest 425 out of the focal plane and hence blurring the captured image. The relaxation of tape tension has a second deleterious effect. The particle of interest not only moves out of the focal plane (vertical displacement in FIG. 4), but also moves parallel to the focal plane (displacement to the left in FIG. 5). This further blurs images and also make it more difficult to match pixel locations of objects in sequential image captures, e.g., under different illumination conditions. Particularly if a duration of many seconds is required to complete image capture for all desired illumination conditions, such drift in the position of particles of interest is undesirable.

Figure 7:
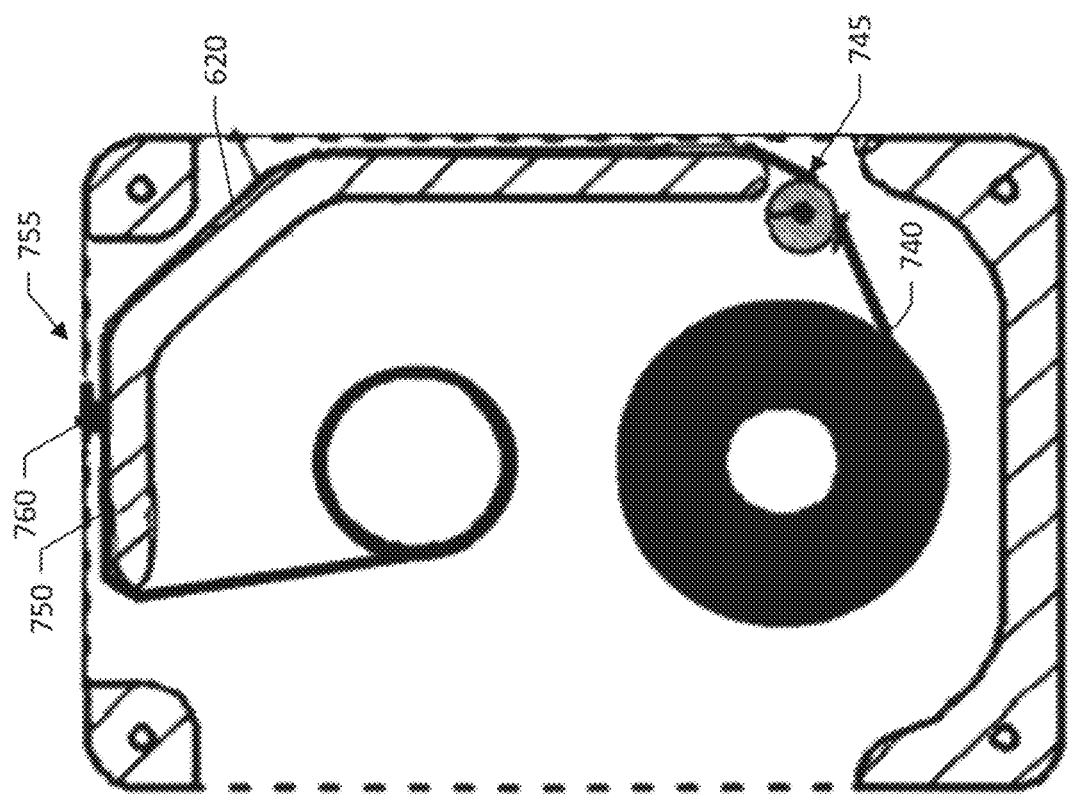
FIGS. 6 and 7 illustrate a media cartridge tape with a tensioning roller to reduce slack in the tape.

FIGS. 6 and 7 illustrates a cartridge 605 that provides a solution to the above problem of tape tension relaxation causing drift of the position of particles of interest. FIG. 6 shows a first state of cartridge 605. FIG. 7 shows a second state of the cartridge. The cartridge shown in FIGS. 6 and 7 is similar to the cartridge shown in FIGS. 1-3. In the specific embodiment shown in FIGS. 6 and 7, however, a small soft tensioning roller 610 is added between a supply reel 615 and a tape guide 620. The small soft tensioning roller is composed of a soft material such as polyurethane foam (e.g., PORON® 4790-79 SHOCK SEAL® FOAM of Rogers Corporation) and a rigid axle (e.g., metal). The soft material may instead or additionally include silicone foam, particularly if the operating temperature range is very demanding. Thus, in a specific embodiment, the roller includes a Poron material. In another specific embodiment, a material of the roller includes a silicone foam. The advantages of silicones are similar to Poron, however, silicones can perform better in hotter environments. There are many other materials that could be used having compressible and tensioning capabilities. The position of an axle 625 is fixed in holes or indents in a cartridge front panel and back panel.

Immediately after advancement of the tape media, a material 630 of the soft roller is highly compressed on the side in physical contact with tape media. The soft roller material 630 is in a first compression state due to the relatively high tension on tape portion 635 between the tape guide 620 and the supply reel 615. As the sticking point 640 between the tape portion 635 and the supply reel 615 creeps to sticking point location 740 (FIG. 7), the soft roller material expands to a second state 745 thus reducing the amount of tape tension relaxation. This keeps a tape portion 750 in a particle inspection zone 755 flat against tape guide 620 so that particle of interest 760 does not move or does not substantially move. In other words, tape portion 750, while in a paused, parked, or stopped state, may remain in contact with, or touch, the particle inspection zone segment of the tape guide because the roller expands to take up excess slack in the tape and thus urges or pulls tape portion 750 against the particle inspection zone segment of the tape guide. Field experience has demonstrated that such an addition of a small soft tensioning roller enables capture of un-blurred images, even with image capture times of many seconds.

Figure 8:
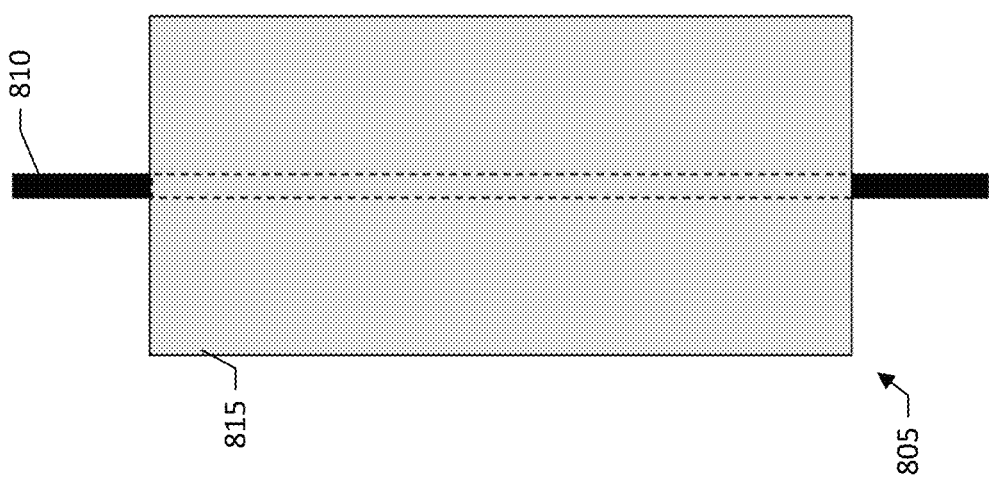
FIG. 8 illustrates a small soft tensioning roller design.

FIG. 8 shows in side view a small soft tensioning roller 805 including a rigid axle 810 and a soft roller material 815 of cylindrical shape. In an alternate design shown in FIG. 9, there is a roller 905 having a soft roller material 915 that is of a modified cylindrical shape in which the cylindrical radius varies with height with a minimum radius at half height and increasing radius moving up or down from half height. The silhouette of the modified cylindrical shape has concave vertical edges 920 that may be in the form of circular arcs of parabolic in shape. The modified cylindrical shape of FIG. 9 can provide an important advantage as described in the discussion accompanying FIG. 10.

Figure 10:
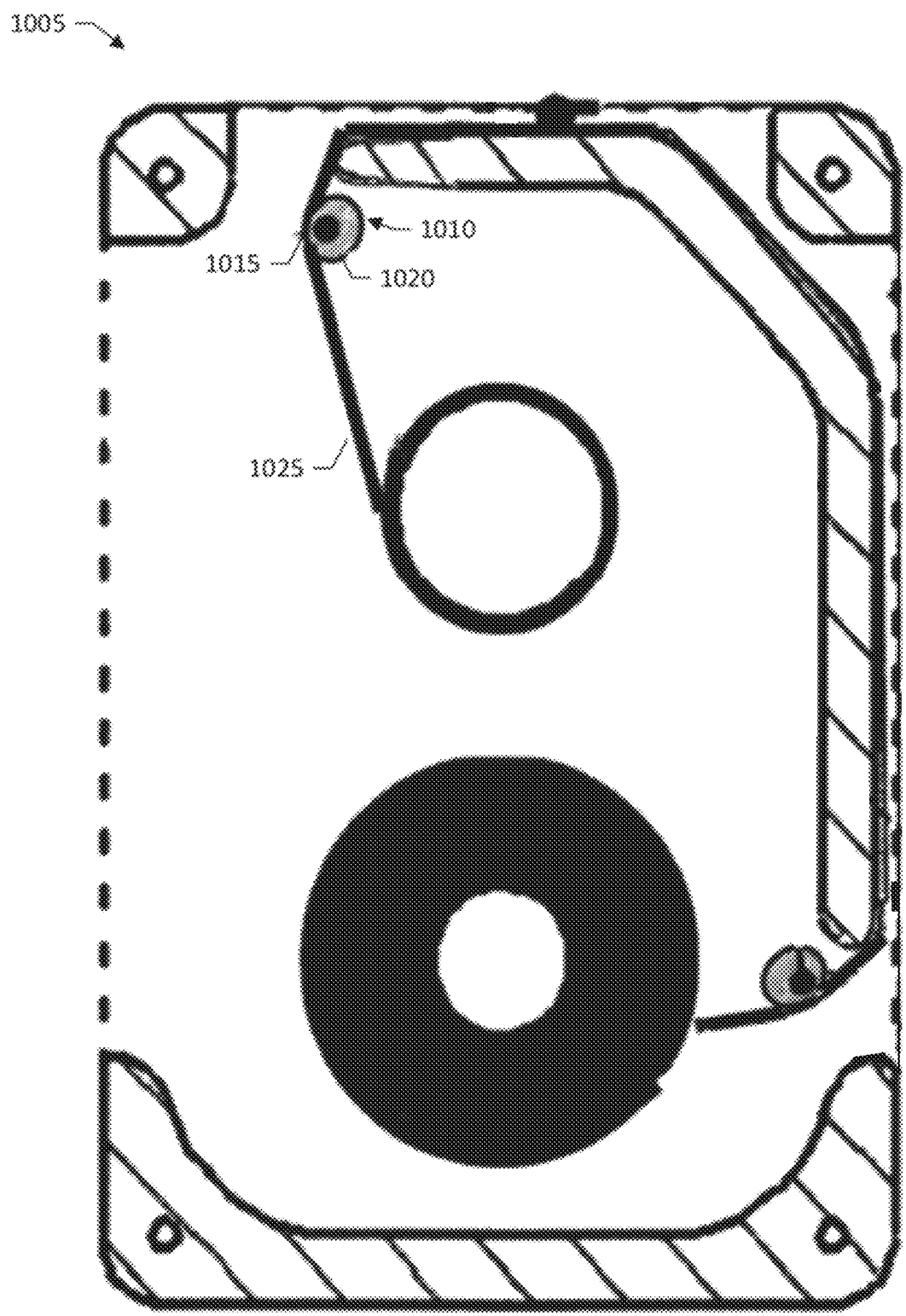
FIG. 10 illustrates another media cartridge design with a second small soft tensioning roller proximate to the uptake reel.

FIG. 10 shows a side view of a cartridge 1005 according to another specific embodiment. The cartridge shown in FIG. 10 is similar to the cartridge shown in FIGS. 6 and 7. In the specific embodiment of the cartridge shown in FIG. 10, however, there is a second small soft tensioning roller 1010 with axle 1015 and soft roller material 1020 in contact with tape portion 1025.

Figure 9:
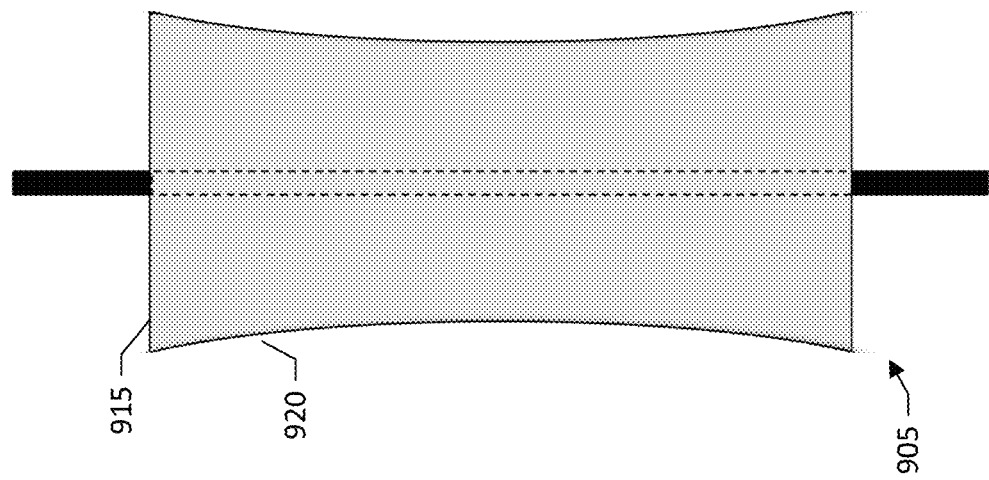
FIG. 9 illustrates another small soft tensioning roller design according to another specific embodiment.
Figure 11:
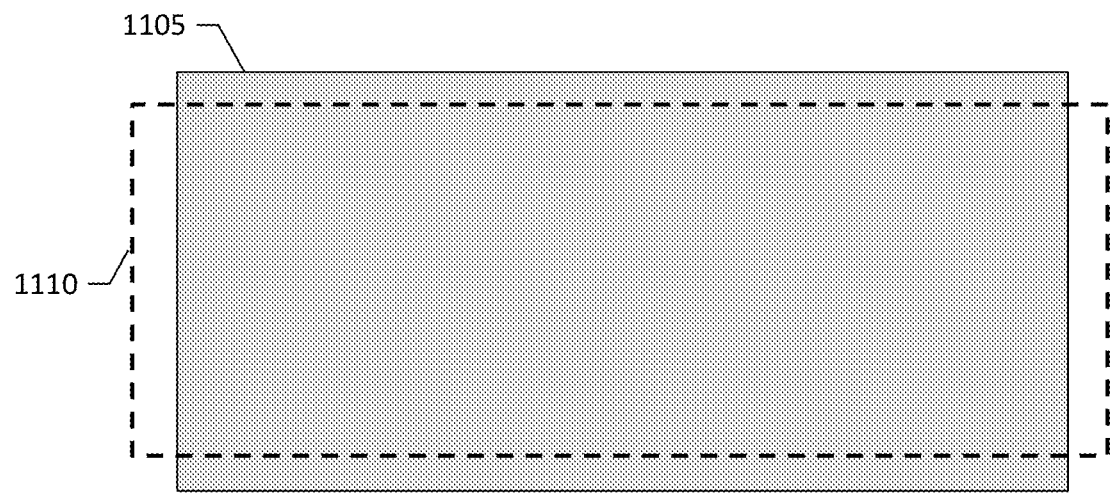
FIG. 11 illustrates in side view the desired centered location of tape media on the uptake reel.
Figure 12:
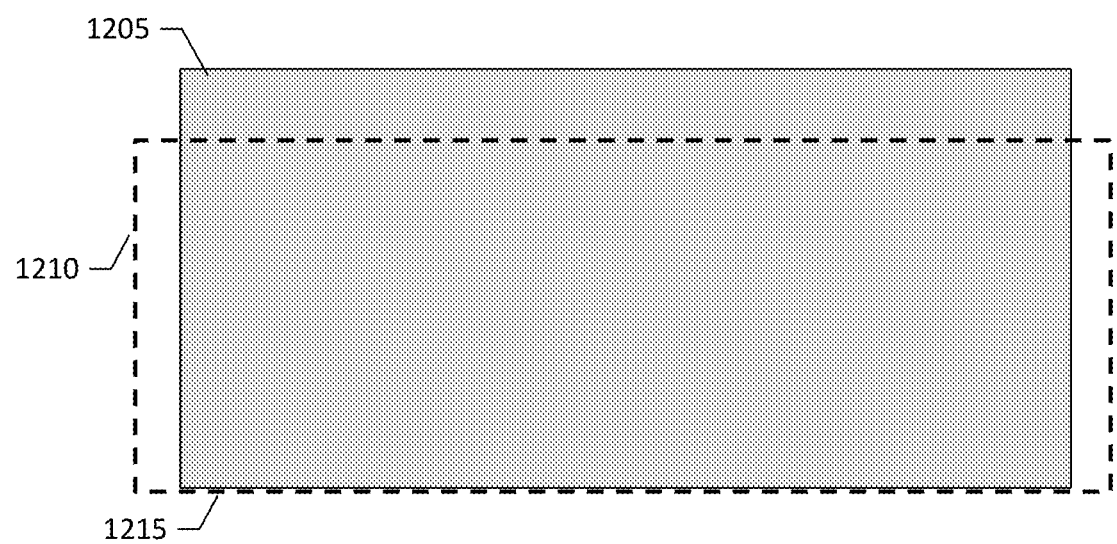
FIG. 12 illustrates an undesired un-centered location of tape media on the uptake reel.

When the soft roller material is of the shape shown in FIG. 9, it has been observed to help center the tape on an uptake reel as illustrated in FIG. 11. Without this second small soft tensioning roller, there can be an undesired tendency for used tape to move up or down on the uptake reel such as illustrated in FIG. 12. Both FIGS. 11 and 12 show uptake reels 1105, 1205, respectively, in side view. In FIG. 11, the wound used tape media 1110 is well centered in height on the uptake reel 1105; this is as desired and is what is observed to result with the cartridge design of FIG. 10.

In contrast, FIG. 12 illustrates a case where the wound used tape media 1210 is not centered on uptake reel 1205. In this undesired case, a bottom 1215 of the wound used tape media makes physical contact with the bottom panel of the cartridge resulting in considerable friction that can make it difficult or impossible to further advance the tape. The second small soft tensioning roller of modified cylindrical shape of the cartridge design of FIG. 10 helps to eliminate or reduce this friction problem by keeping the wound used tape well centered on uptake reel 1205.

In an alternate embodiment, the problem illustrated in FIG. 12 is addressed by adding flanges to the uptake reel such as uptake reel 390 (FIG. 3). (Flanges dominate iconic images of movie reels familiar to the public.) In some cases, the tape may tend to stick to the cassette (i.e., cartridge) walls. Problems associated with the sticking and can be addressed using a roller with curvature (see, e.g., FIG. 9), a wheel (or reel) design having a pair of flanges (see, e.g., FIGS. 17B and 51-54), or both. The wheel design as shown in FIGS. 17B and 51-54, for example, help keeps the tape captive inside the structure and does not allow it to touch the walls of the cassette where it may get stuck.

In a specific embodiment, a cartridge includes a first side comprising an air-intake zone; a second side comprising a particle inspection zone; a supply reel comprising a tape having an adhesive-surface; an uptake reel; a tape guide comprising first and second portions, the first portion being associated with the air-intake zone, and the second portion being associated with the particle inspection zone; and first and second rollers, the first roller comprising a foam material and being closer the supply reel than the uptake reel, the second roller comprising a concave roller surface and being closer to the uptake reel than the supply reel, wherein the tape extends from the supply reel, to the first roller, across the first and second portions of the tape guide, to the second roller, and to the uptake reel, wherein the foam material of the first roller at least partially expands to pull the tape against the second portion of the tape guide associated with the particle inspection zone, and wherein the concave surface of the second roller guides the tape onto the uptake reel.

The second roller may include a foam material. The first roller may include a concave roller surface. In an embodiment, the supply reel rotates about a first axis, the uptake reel rotates about a second axis, the first roller rotates about a third axis, the second roller rotates about a fourth axis, the first, second, third, and fourth axes are parallel to each other. The first roller is closer to a first end of the tape guide than a second end of the tape guide. The second roller is closer to the second end of the tape guide than the first end of the tape guide. The first roller is closer to the first side having the air-intake zone than the second side having the particle inspection zone. The second roller is closer to the second side having the particle inspection zone than the first side having the air-intake zone. The tape is wrapped at least partially around the first roller, second roller, or both. The tape may be wrapped around at most a portion of the first roller, second roller, or both. The first roller, second roller, or both may contact a surface of the tape opposite the adhesive surface. The first roller, second roller, or both may not contact the adhesive surface.

Figure 13:
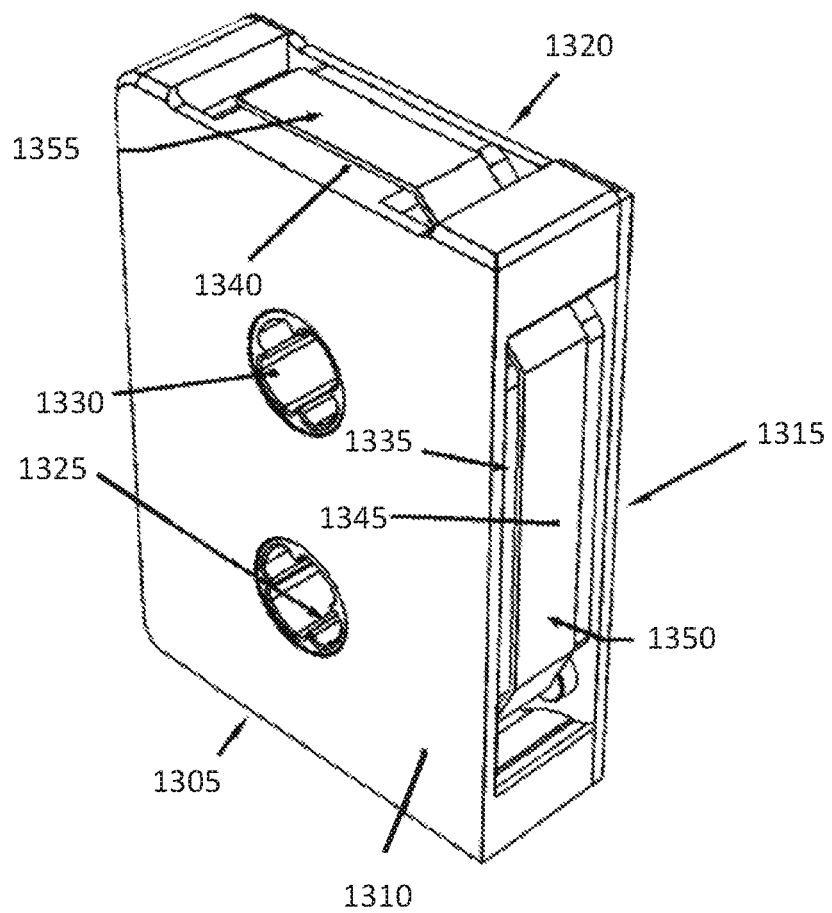
FIG. 13 shows an isometric view of a cartridge according to another specific embodiment.
Figure 14:
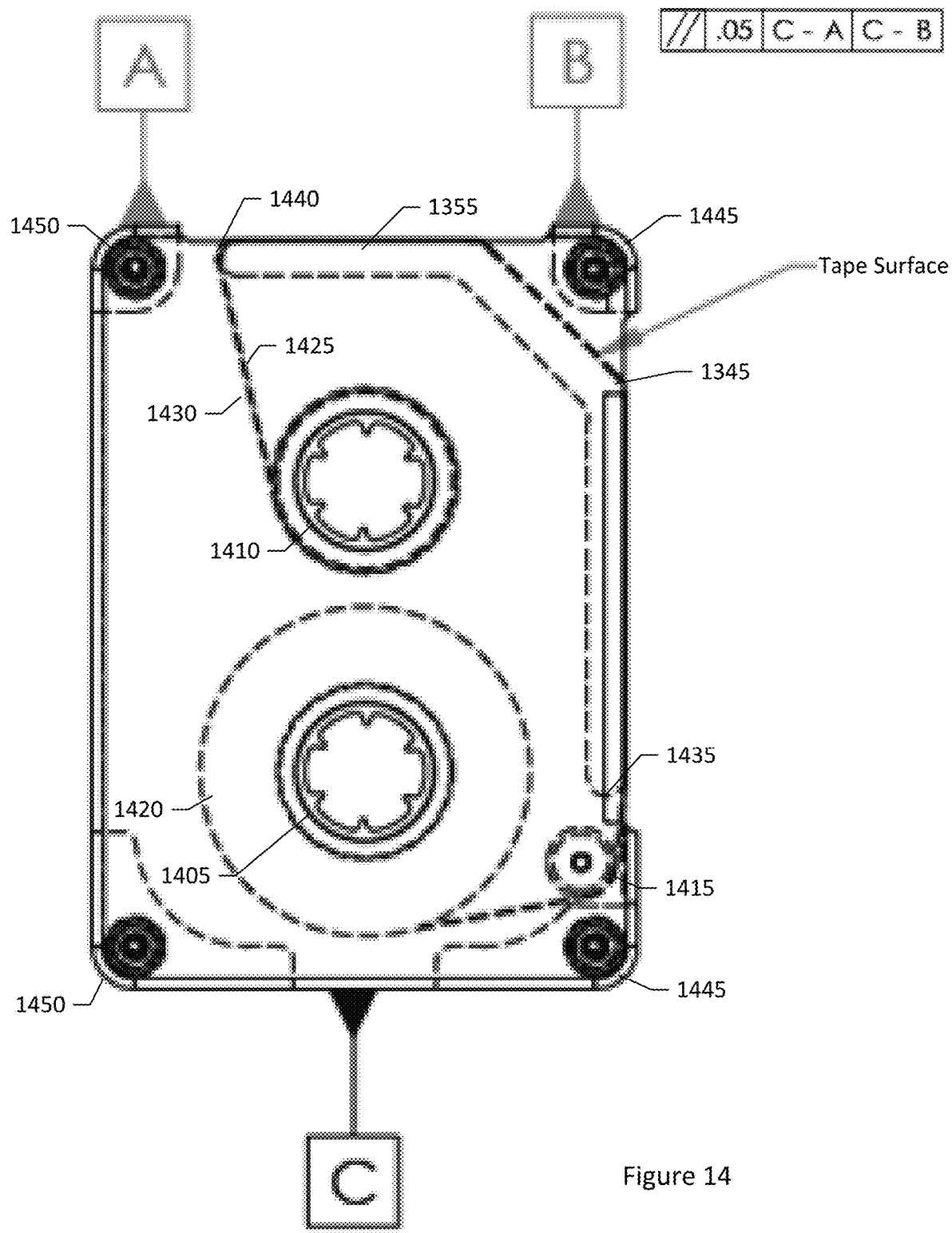
FIG. 14 shows an inside view of the cartridge.

FIGS. 13-17A show views of a cartridge 1305 according to another specific embodiment. FIG. 13 shows an isometric view of the cartridge. FIG. 14 shows an inside front view of the cartridge. FIGS. 15-17A show a set of views for assembling the cartridge.

As shown FIG. 13, the cartridge includes a front panel 1310 and right and top sides 1315, 1320, respectively, that are orthogonal to the front panel. The right side is orthogonal or adjacent to the top side. The front panel includes first and second holes 1325, 1330, respectively. The first hole forms a center of a supply reel 1405 (FIG. 14). The second hole forms a center of an uptake reel 1410 (FIG. 14). The right side includes an opening 1335 corresponding to an air intake zone. The top side includes an opening 1340 corresponding to a particle inspection zone.

There is a tape guide 1345 inside the cartridge. Portions or segments of the tape guide are visible through the cartridge openings. For example, a segment 1350 of the tape guide is visible through opening 1335. A segment 1355 of the tape guide is visible through opening 1340.

FIG. 14 shows an inside front view of the cartridge. There is supply reel 1405, uptake reel 1410, tape guide 1345, and a tensioning roller 1415. The tape guide extends along the right side of the cartridge and the top side of the cartridge.

The supply reel holds a roll of tape 1420. In other words, the tape is wound about the supply reel. The tape extends from the supply reel, over the tape guide, and terminates at the uptake reel. The tape includes inner surface 1425 and an outer surface 1430, opposite the inner surface. The inner surface faces towards centers of the supply and uptake reels. The outer surface faces away from the centers of the supply and uptake reels. The outer surface includes an adhesive. The adhesive allows for the trapping or collection of airborne particles when air is directed through the air intake zone opening and towards the tape. The inner surface of the tape does not include an adhesive. The lack of adhesive allows the tape to glide smoothly across the tape guide.

The tensioning roller is positioned between the supply reel and a first end 1435 of the tape guide. The tensioning roller is closer to the first end of the tape guide than a second end 1440 of the tape guide, opposite the first end. The tensioning roller is closer to a lower right corner 1445 of the cartridge than a lower left corner 1450, upper right corner 1445, or upper left corner 1450. In an embodiment, a first line passes longitudinally (vertically as drawn in FIG. 14) through the center of the supply reel. A second line, parallel to the first line, passes longitudinally through a center of the roller. A third line, parallel to the first and second lines, extends along an outer surface of an air intake zone segment of the tape guide. A fourth line passes laterally (horizontally as drawn in FIG. 14) through the center of the supply reel. A fifth line, parallel to the fourth line, passes laterally through the center of the roller. The second line passing through the center of the roller is between the first and third lines. The fifth line passing through the roller is below the fourth line passing through the supply reel.

The tensioning roller is positioned inside the cartridge so that it contacts the inner surface of the tape. The tensioning roller is made of a pliable material that can be resiliently compressed by the tape. In a specific embodiment, the material includes foam.

The tensioning roller helps to keep the tape flat against the tape guide—and more particularly—flat against inspection zone segment 1355 of the tape guide. For example, when an image of the particles is to be captured by the collection device camera sensor that is mounted above the particle inspection zone of the cartridge, it is desirable for the tape to remain flat and positioned against the inspection zone segment of the tape guide so that the particles will be in focus and within a field of view of the camera sensor. When the image is to be captured, the tape reels (e.g., supply reel, uptake reel, or both) are placed into a stopped, paused, or parked state. The foam material of the tensioning roller expands or at least partially expands against the inner surface of the tape and helps to take-up any excess slack in the tape so that the tape remains pressed or urged against the inspection zone segment of the tape guide. In another specific embodiment, the tensioning roller deflects or compresses or deforms to remove the slack. There can be a two-phase compression/expansion cycle. During tape advancement, the foam roller may be compressed (or in alternate embodiments of FIGS. 29-30 having hard rollers deflected), and then during the image capture period the foam material may expand or partially expand (or in alternate embodiments having hard rollers the spring moves the hard roller back from, or partially back from its position of maximum deflection).

The desirability to keep the tape on the take-up reel well centered can remain even for a particle collection device that has no camera. Furthermore, to the extent that camera-based particle monitors in the lab that are used to process cartridges from collection devices in the field present the same problems as encountered with camera-based particle monitors in the field, the foam roller serves the purpose of addressing the slackness problem in the lab. It should be appreciated that the camera-based monitor can either be in the field, or in the lab, or both. There can be particle collection in the field followed by later particle imaging in the lab.

Having the tension roller can help to keep the tape flat and straight as it coils into the uptake reel. This helps to ensure that there are no ripples of the tape. Therefore the trapped particles are protected, "sandwiched" between the adhesive layer and the backing film (polyester) of the previous winding. Any ripples in the winding can allow possible contaminants and environmental effects such as moisture/humidity to alter the nature of the particles collected while in transit between the field and the laboratory. The tension roller may be combined with a polyester film tape as provided by 3M Corporation of Maplewood, Minn. The tape can survive extreme temperatures thus preserving particles beyond just keeping moisture out. The 3M tape having the polyester backing film makes it ideal to re-use the tape without leaving any adhesive residue when winding the tape, this allows the particles to remain intact for analyzing in a lab.

During prototyping, applicant has successfully removed spent reels from a cartridge and winded these into microscopes and has also been able to rewind tape directly in the cartridge to re-scan the particles and applicant has found them to be intact and protected very well. Some tapes have been able to be re-winded at least 10 times to re-observe some particles without having any ripples and keeping the particles intact and free of residue. Field testing for over a year has shown that the cartridge design allows the tape or tape reel to be rewinded and re-examined multiple times.

In a specific embodiment, the material of the roller is Poron® 4790-79 Shockseal® foam as provided by Rogers Corporation of Rogers, Conn. A copy of the Poron® data sheet listing various properties of the Poron® material is shown as Figure A in the appendix. The material of the roller may instead or additionally include a silicone foam. It should be appreciated that other resiliently compressible materials with similar or equivalent desirable parameters to Poron® may be used in other embodiments. A material or combination of materials for the tensioning roller may be selected based on material properties such as compression force deflection, stiffness, hardness, spring coefficient, and so forth so that the desired tension for the tape can be achieved.

For example, the temperature resistance parameters of Poron® are desirable because a specific application of the cartridge includes placement outdoors. For example, in some applications, the cartridge (which may be referred to as a cassette) will sit inside the particle collection unit sometimes outdoors and undergoing extreme temperature ranges. In a specific embodiment, the nominal size of the roller height is 6.35 millimeters (mm) (0.25 inches) and diameter nominal is also 6.35 mm (0.25 inches) on outer edges and inner diameter is about 5.08 mm (0.20 inches) and has an hourglass shape.

In a specific embodiment, the height of the roller is 6.33 mm. The height may also be in the range from 6 to 7 mm, or from 4 mm to 10 mm, or even smaller or larger. In this specific embodiment, the maximum diameter of the roller is 4.750 mm. The maximum diameter may also be in the range from 4 to 5 mm, or from 2 mm to 10 mm, or even smaller or larger. In this specific embodiment, the ratio of the minimum diameter to the maximum diameter is 3.930 mm/4.750 mm=0.827. This ratio may also be in the range from 0.8 to 0.9, or from 0.6 to 1.0, or even smaller. In a specific embodiment, the softness or hardness of the foam material may correspond to a compression force deflection of about 50 kPa per ISO 6916-1 test method using 30 mm/min strain rate and with force measured at 25% deflection. The compression force deflection may also be in the range from 30 kPa to 80 kPa, or from 20 kPa to 120 kPa, or even smaller or larger.

Figure 15:
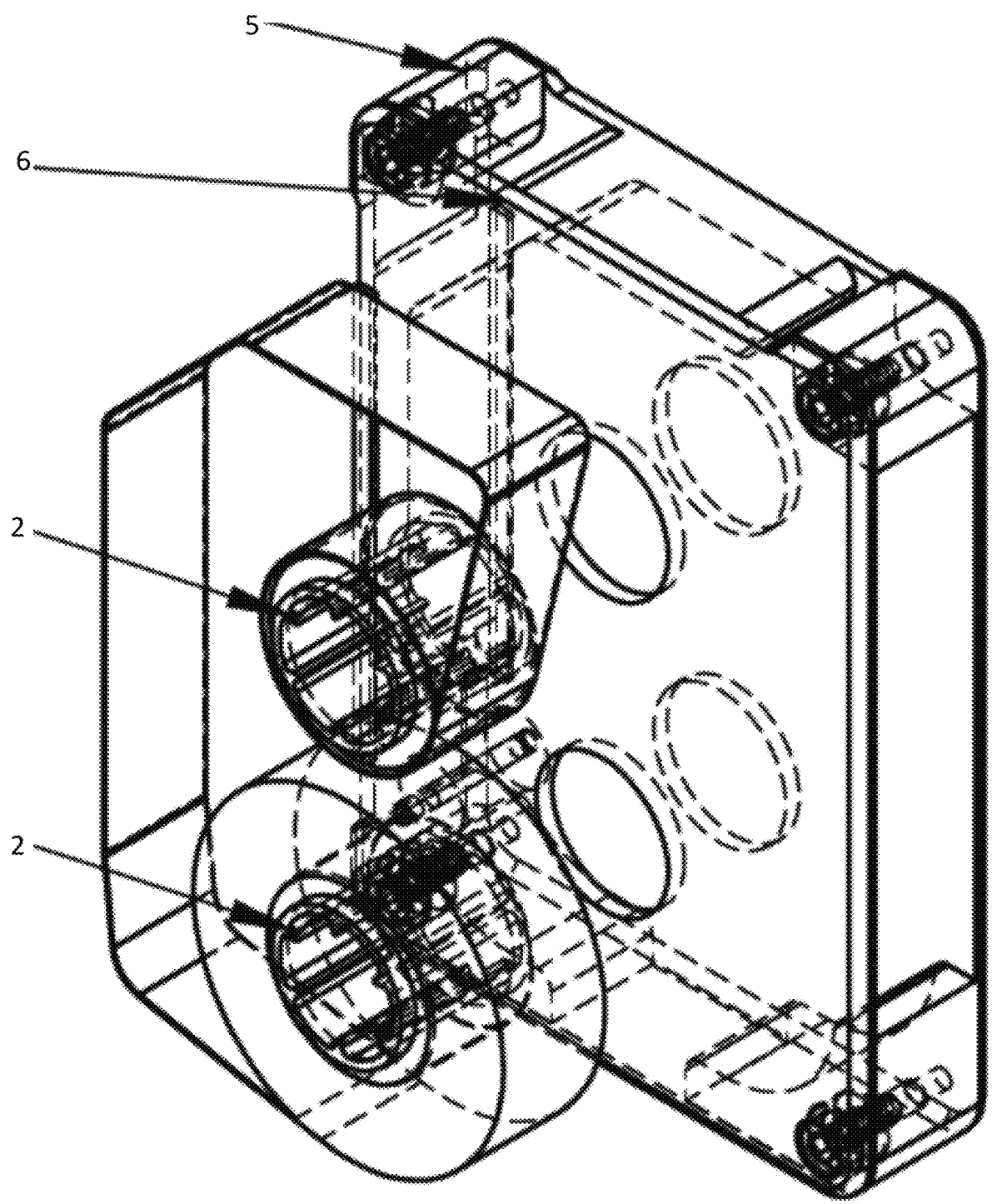
FIG. 15 shows an exploded isometric view of the inside of the cartridge.
Figure 16:
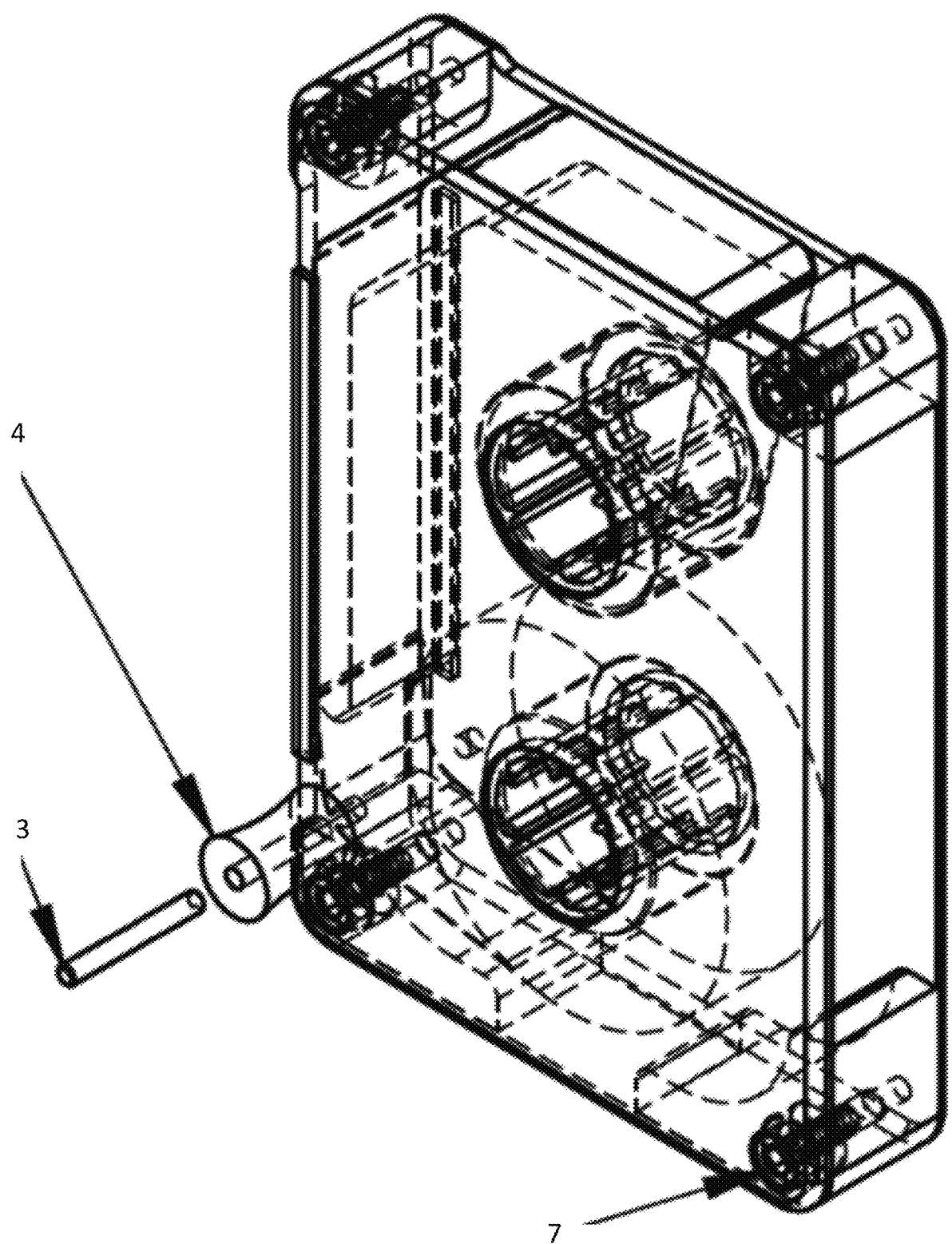
FIG. 16 shows an isometric view of the inside of the cartridge.
Figure 17A:
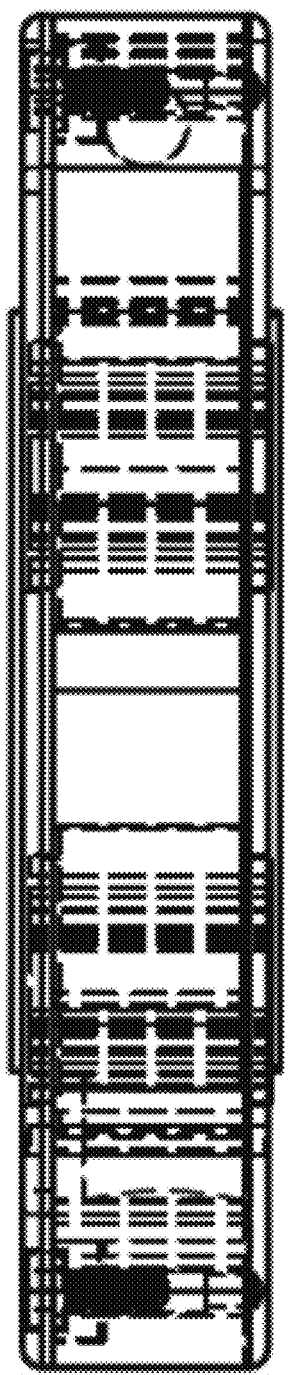
FIG. 17A shows a side view of the cartridge.

FIGS. 15-17A show a set of views and step numbers for assembling the cartridge according to a specific embodiment. In particular, FIG. 15 shows an exploded isometric view of the tape assembly being inserted into a housing of the cartridge. FIG. 16 shows an isometric view of the foam roller being inserted into the housing. FIG. 17A shows a side view of the assembled cartridge. Figure B in the appendix shows a parts list for the cartridge according to a specific embodiment.

Figure 17B:
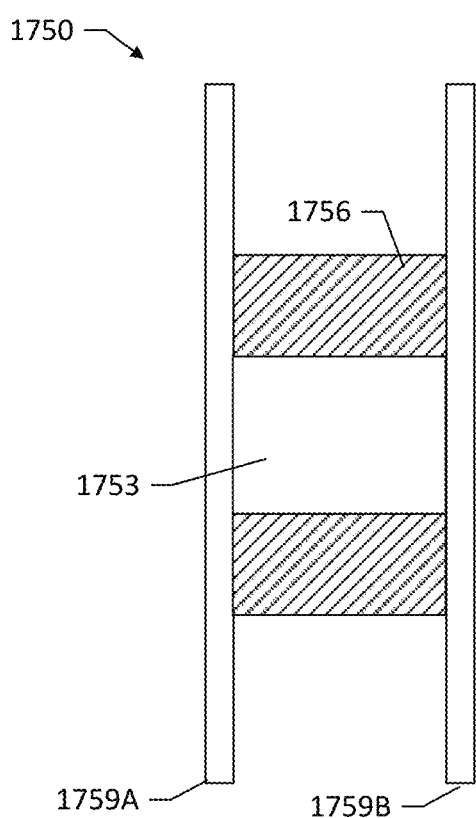
FIG. 17B shows a cross section view of a reel that may be used within the cartridge.

FIG. 17B shows a cross section of a reel or spool 1750 according to another specific embodiment. In this specific embodiment, the reel includes a spool portion 1753, adhesive coated tape 1756 (shown with a diagonal fill pattern), wound about the spool, and a set of sidewalls 1759A,B at opposite ends of the spool portion that guide and protect the tape.

Table A below shows a flow for the steps shown in FIGS. 15-17A.

TABLE A

| Step | Description |
| --- | --- |
| 1 (FIG. 15) | Take item #2 (spool with tape) and unwrap about an inch of tape. Line up tape with the second item #2 (spool without tape) and wrap tape one rotation. Take item #2 (spool with tape) and place on bottom fixture post until lined up with bottom hole of item #5 (cassette back combo). Wrap tape around tape surface on item #5 (cassette back combo) and place item #2 (spool without tape) in top fixture post and lined up with top hole of item #5 (cassette back combo). |
| 2 (FIG. 16) | Slide item #3 (dowel pin) into item #4 (foam roller) and place in hole in item #5 (cassette back combo) as indicated. Place item #6 (cassette front combo) over item #5 (cassette back combo) and secure with 4 item #7s (screws). |
| 3 (FIG. 17A) | Check dimension and geometric tolerance as indicated. |

Figure 20:
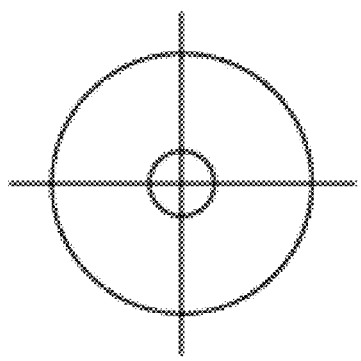
FIG. 20 shows a top view of the roller.
Figure 19:
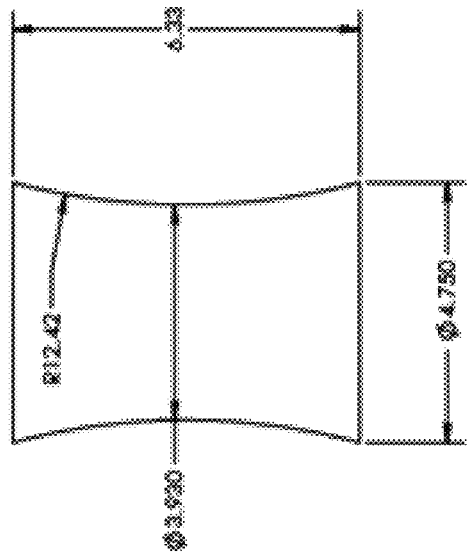
FIG. 19 shows a side view of the roller.
Figure 18:
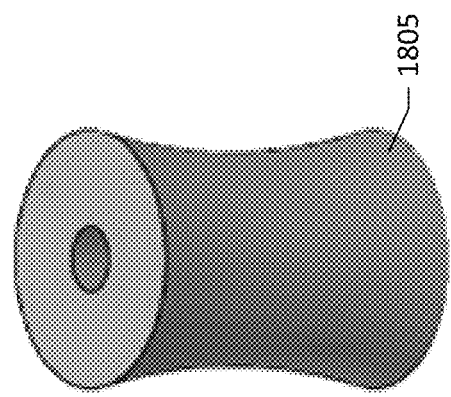
FIG. 18 shows an isometric view of a tensioning roller.

FIG. 18 shows an isometric view of a roller 1805 that may be positioned between supply reel 1405 (FIG. 14) and first end 1435 of the tape guide. There can be an optional second roller that may be positioned between uptake reel 1410 (FIG. 14) and second end 1440 of the tape guide or as show in FIG. 10. FIG. 19 shows a side view of the roller and some dimensions. FIG. 20 shows a top view of the roller.

As discussed, the second roller is optional and may not be included in some embodiments of the cartridge or cassette. In a specific embodiment, the cassette includes at least one roller between the supply reel and tape surface before the collected particles are scanned. Additional optional rollers can be used to help further guide the tape into its uptake reel and are located after particles on tape are scanned. As discussed, the second roller can be useful but not necessary in accomplishing the task of maintaining tension and keeping the tape straight. The second roller can be useful in the event the tape needs to be guided, or routed, to its final destination into the uptake reel.

Figure 24:
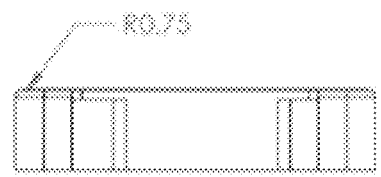
FIG. 24 shows a top view of the back panel.
Figure 21:
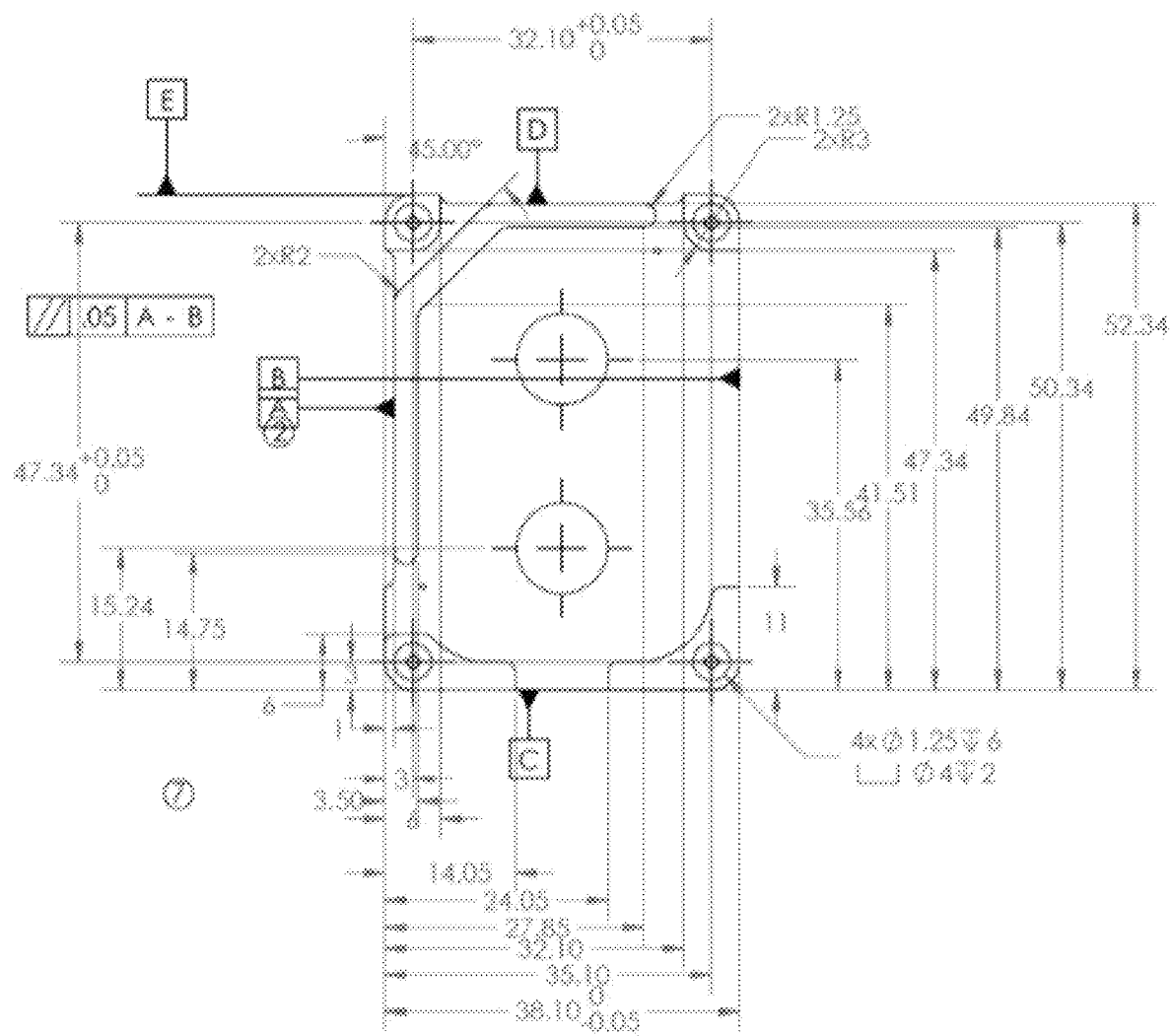
FIG. 21 shows an inside view of a back panel of a collection cartridge.
Figures 22, 23:
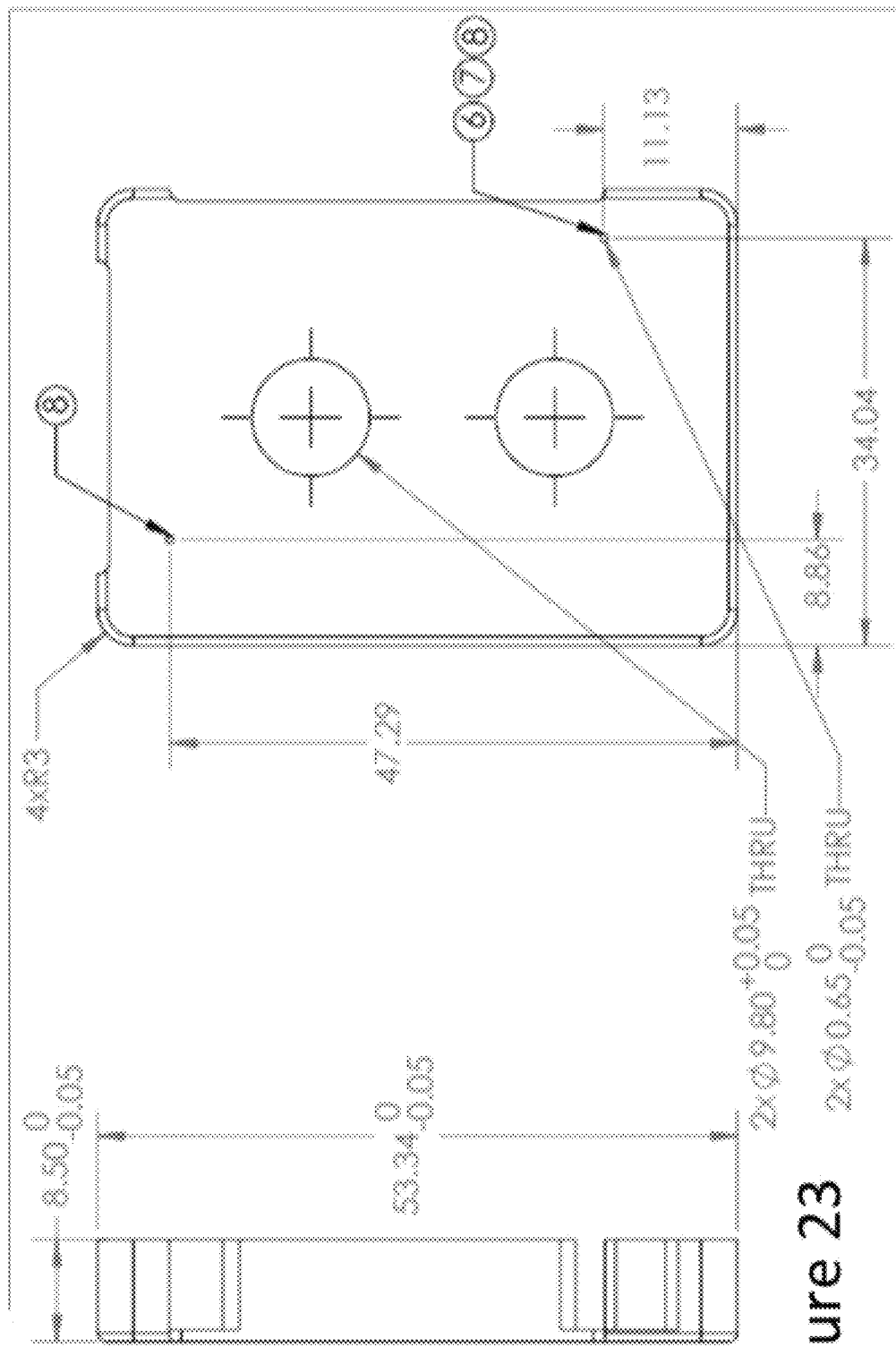
FIG. 22 shows an outside view of the back panel.
FIG. 23 shows a side view of the back panel.

FIGS. 21-24 show various views of a back panel of the cartridge including various dimensions (in millimeters) according to a specific embodiment. Specifically, FIG. 21 shows an inside view of the back panel. FIG. 22 shows an outside view of the back panel. FIG. 23 shows a side view of the back panel. FIG. 24 shows a top view of the back panel.

FIGS. 25-28 show various views of a front panel of the cartridge including various dimensions (in millimeters) according to a specific embodiment. Specifically, FIG. 25 shows an inside view of the front panel. FIG. 26 shows an outside view of the front panel. FIG. 27 shows a side view of the front panel. FIG. 28 shows a top view of the front panel.

It should be appreciated that a roller having a resiliently compressible material pressing against the tape to maintain tape tension is merely one example of a particular implementation of a tensioning mechanism. In other implementations, other similar and equivalent elements and functions may be used or substituted in place of what is shown.

Figure 29:
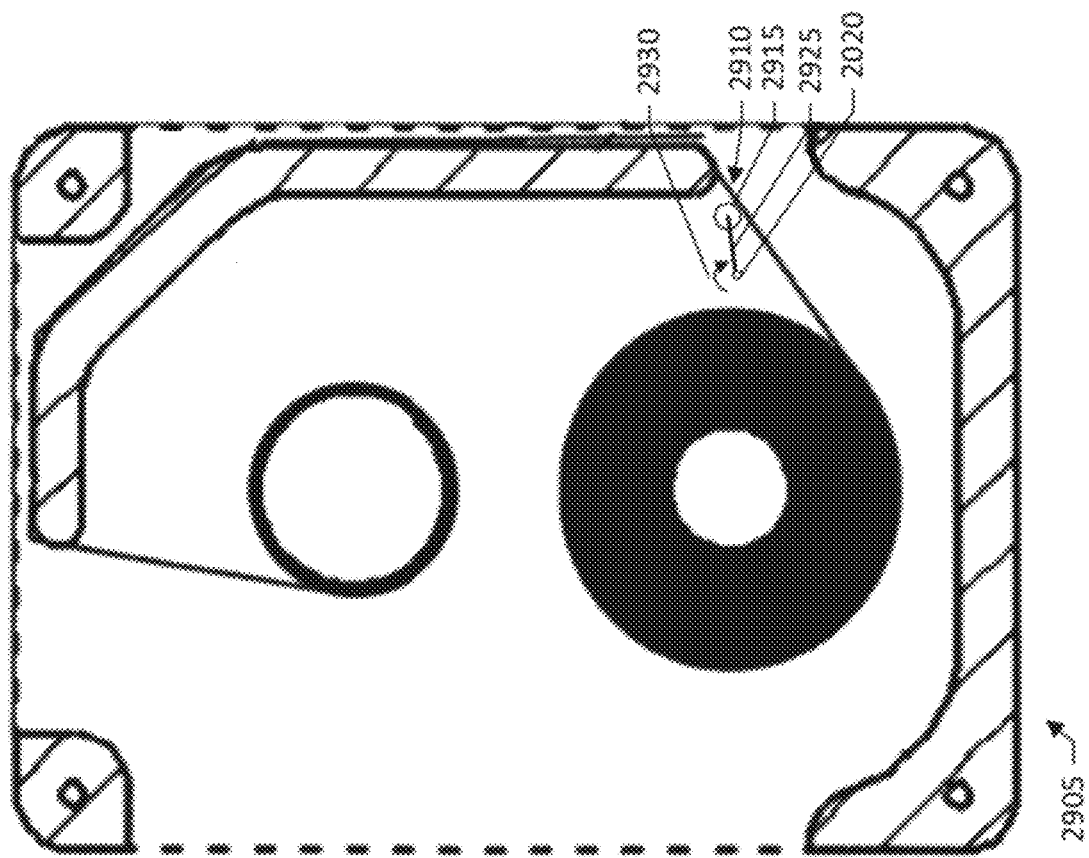
FIG. 29 shows an inside view of a cartridge having a tensioning assembly according to another specific embodiment.
Figure 31:
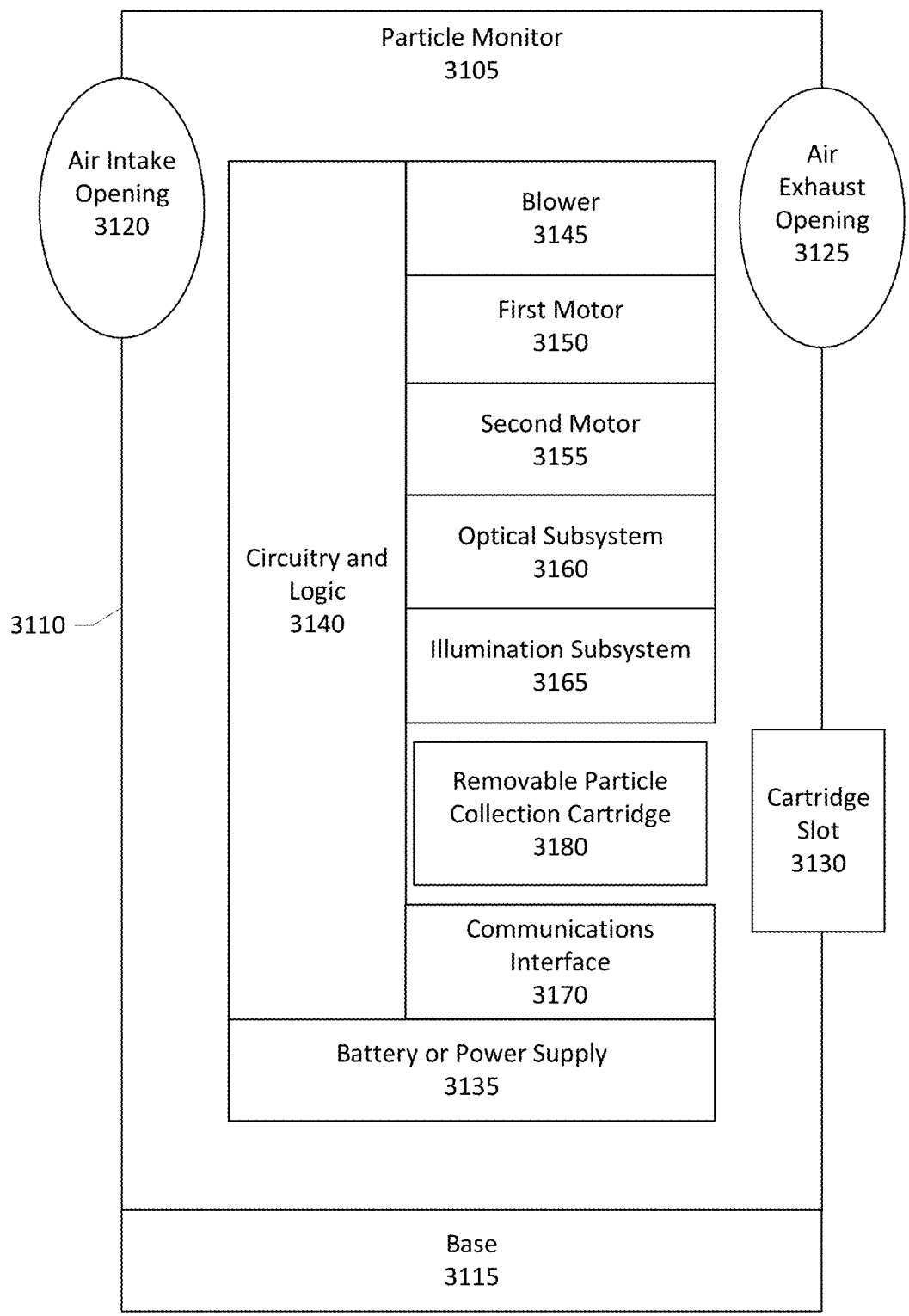
FIG. 31 shows a block diagram of an airborne particle monitor in which a cartridge may be used according to one or more embodiments.

For example, FIG. 29 shows an inside front view of a cartridge 2905 according to another specific embodiment. The cartridge shown in FIG. 29 is similar to the cartridge shown in FIGS. 1-3. The cartridge shown in FIG. 29, however, includes a tensioning assembly 2910 to take up excess slack in the tape. In this specific embodiment, the tensioning assembly includes a roller 2915, a spring 2020 (e.g., coil spring), and a rod 2925 connected between the roller and the spring. The spring via the rod urges the roller in a direction 2930 to tension the tape. In this specific embodiment, the roller may be made of a non-resiliently compressible material such hard plastic.

Figure 30:
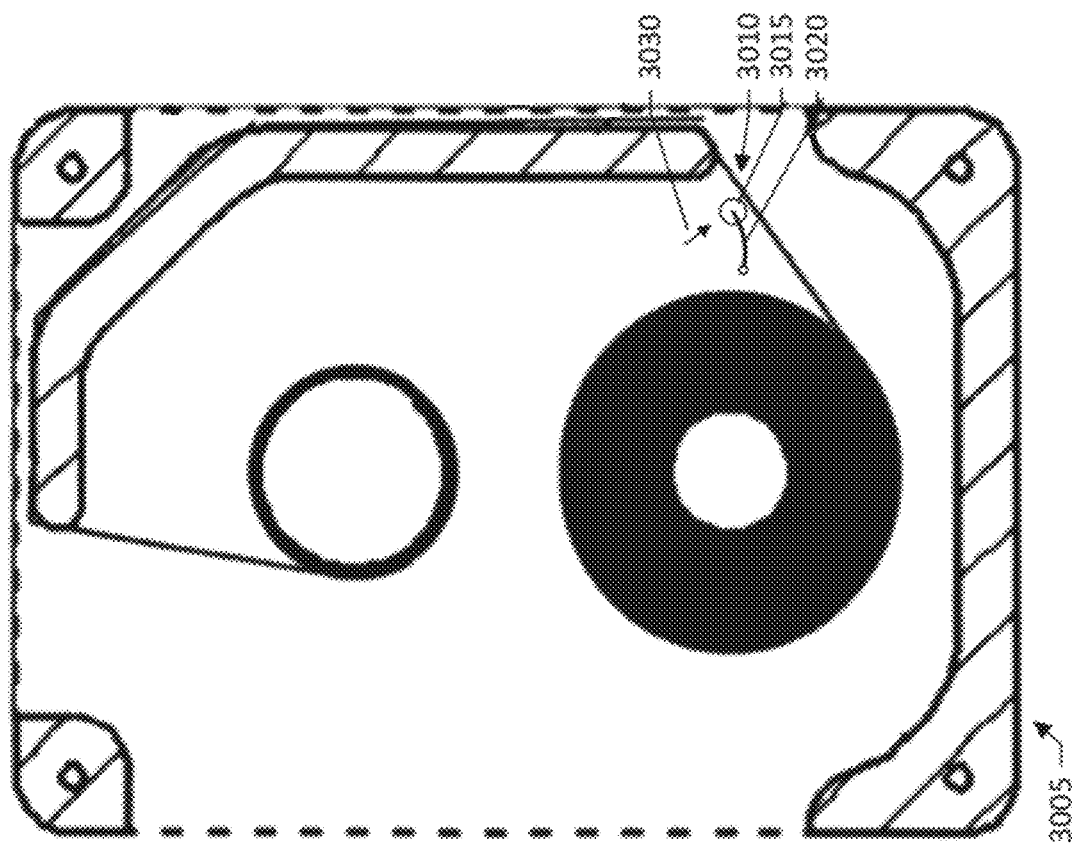
FIG. 30 shows an inside view of a cartridge having a tensioning assembly according to another specific embodiment.

FIG. 30 shows an inside front view of a cartridge 3005 according to another specific embodiment. The cartridge shown in FIG. 30 is similar to the cartridge shown in FIGS. 1-3. The cartridge shown in FIG. 30, however, includes a tensioning assembly 3010 to take up excess slack in the tape. In this specific embodiment, the tensioning assembly includes a roller 3015 and a spring 3020 (e.g., flat spring). An end of the spring may be fixed such as to the back panel. An opposite end of the spring is connected to the roller. The spring flexes and urges the roller in a direction 3030 to tension the tape. In this specific embodiment, the roller may be made of a non-resiliently compressible material such hard plastic.

As another example, in another specific embodiment, a tensioning assembly may be integrated with the supply reel, uptake reel, or both. As another example, the supply reel, uptake reel, or both may slide within a track in order to take up excess slack in the tape. As another example, a segment of the tape guide, such as the particle inspection zone segment of the tape guide may be designed to flex or an end of the tape guide segment may be hinged and connected to a spring in order to take up excess slack in the tape. As another example, the motor for the cartridge may include a tensioning mechanism that applies tension to the tape during imaging.

In a specific embodiment, the tensioning assembly or mechanism includes a substrate that can be of any shape or form and not just the shape of a cylinder. For example, the tensioning assembly or mechanism may include a sufficiently large foam ball where the flexible substrate may sit almost flat against it and provide similar tensioning results. A tensioning substrate may have a shape of a ball, sphere, or cylinder. A tensioning substrate may include a foam material. In another specific embodiment, the tensioning substrate does not include a foam material. In a specific embodiment, the tensioning substrate includes a silicone material. In a specific embodiment, a tensioning substrate may include a solid elastomeric material.

In a specific embodiment, the cartridge may be used in conjunction with a particle monitoring device. In this specific embodiment, there is a device having a cartridge that monitors for particles analyzed in the same device containing it and the cartridge can be taken for advanced analysis to a lab.

In another specific embodiment, the cartridge may be used with a particle collection device that does not include a monitoring or scanning system. In this specific embodiment, there is a particle collection device that uses the cartridge to collect particles over a period of time which is later taken to a device that scans these. One advantage over particle impactors and current exposed spore traps running over 24 hours is that the system disclosed herein allows for knowing when particles were collected in a much closer time frame, down to minutes of the day or even finer granularity as compared to other spore traps that do not allow for such fine granularity regarding when particles have been collected throughout the course of a day. For example, in a specific embodiment, a collection device into which the cartridge has been inserted may be configured to collect particle samples every hour of a day. The tape of the cartridge may be partitioned into 24 segments where each segment corresponds to a particular hour of the day. The tape may include markings such as visible markings to identify a particular segment. In this specific embodiment, with each passing hour, a corresponding segment of the tape is advanced to the air intake or particle collection zone. For example, a first segment of the tape onto which particles have been collected may correspond to a first hour of the day (e.g., 12:00 AM to 1:00 AM). A second segment of the tape onto which particles have been collected may correspond to a second hour of the day (e.g., 1:00 AM to 2:00 AM), and so forth. The cartridge may be used in both a particle collection device as well as a particle detection monitor.

In a specific embodiment, there is a cartridge for collecting particles. The cartridge comprising: a housing; a supply reel inside the housing; an uptake reel inside the housing; a tape guide, inside the housing, and extending along a first side of the housing and a second side of the housing, adjacent to the first side; a tape, the tape comprising an inner surface, and an outer surface, opposite the inner surface, the outer surface faces away from centers of the supply and uptake reels and comprises an adhesive to trap the particles, the inner surface faces towards the centers of the supply and uptake reels and does not comprise the adhesive, the tape is wound about the supply reel, extends over the tape guide, and terminates at the uptake reel; and first and second rollers, inside the housing, the first roller being closer to a first end of the tape guide than a second end of the tape guide, the second roller being closer to the second end than the first end, wherein the first and second rollers are positioned to press against the inner surface of the tape, and comprise a pliable material that resiliently deforms from contact with the tape and urges the tape to lie flat against the tape guide, and wherein the second roller comprises a concave surface to center the tape on the uptake reel.

In another specific embodiment, there is a cartridge for collecting particles comprising: a housing; a supply reel inside the housing; an uptake reel inside the housing; a tape guide, inside the housing, and extending along a first side of the housing and a second side of the housing, adjacent to the first side; a tape, the tape comprising an inner surface, and an outer surface, opposite the inner surface, the outer surface faces away from centers of the supply and uptake reels and comprises an adhesive to trap the particles, the inner surface faces towards the centers of the supply and uptake reels and does not comprise the adhesive, the tape is wound about the supply reel, extends over the tape guide, and terminates at the uptake reel; and a first roller, inside the housing, and comprising a resilient foam material, the first roller being positioned inside the housing to press against the inner surface of the tape, wherein the resilient foam material resiliently deforms from contact with the tape and at least partially expands to urge the tape to lie flat against the tape guide, and wherein the first roller is located in the cartridge so that it is in contact with the inner surface of the tape before the particles collected on the tape have been scanned or imaged by a camera sensor of a particle collection device into which the cartridge is removably loaded. For example, the first roller may be upstream with respect to the camera sensor or particle inspection zone.

In another specific embodiment, there is a second roller to guide the tape onto the uptake reel, wherein the second roller is located in the cartridge so that it is in contact with the inner surface of the tape after the particles have been scanned or imaged by the camera sensor. For example, the second roller may be downstream with respect to the camera sensor or particle inspection zone.

As a further refinement of particle collection media cartridge design, quantum-dots may be added to either the tape guide or the adhesive coated tape in order to enable fluorescent backlighting of captured particles. When a particle of interest, such as particle of interest 760 of FIG. 7, is in a particle inspection zone, such as particle inspection zone 755 of FIG. 7, the particle inspection zone may be illuminated by ultraviolet light that is not detectable by the view camera. If quantum-dots or other fluorescent material is included in the composition of the adhesive coated tape, and they fluoresce with visible wavelengths in response to UV illumination, then the particle of interest will be backlit with visible light. Alternatively such backlighting may be provided by using transparent adhesive coated tape and including quantum dots or other fluorescent material in the tape guide structure, such as tape guide structure 620 of FIG. 7.

FIG. 31 shows a block diagram of a particle monitor 3105 in which a particle collection cartridge 3180 may be used according to an embodiment. In the example shown in FIG. 31, a particle monitor 3105 includes a housing 3110 mounted to a base 3115. The housing includes an air intake opening 3120, an air exhaust opening 3125, and a cartridge slot opening 3130. There can be a door connected to the cartridge slot opening via a hinge. The door can open into the cartridge slot. Shown inside the monitor housing are a battery or power supply 3135 which is connected to circuitry and logic 3140 which in turn is connected to a blower 3145, first motor 3150, second motor 3155, optical subsystem 3160, illumination subsystem 3165, and communications interface 3170. The optical and illumination subsystems may be referred to as an optical imaging system.

Further shown in FIG. 31 is a removable particle collection cartridge 3180. The particle collection cartridge includes a reel of tape media. The tape media is wound about the reel and includes an adhesive to collect airborne particles (e.g., pollen or mold spores). The collection cartridge is removable from the collection device. That is, a user can remove the cartridge from the collection device without breaking or destroying the device. There can be an eject button that the user can press to eject the cartridge from the particle collection device. For example, when the collection cartridge is full (or as desired), the user can remove the collection cartridge from the collection device through the cartridge slot opening. The user can then install a new collection cartridge by inserting the new collection cartridge into the collection device through the cartridge slot opening. The user can then mail the removed collection cartridge—which contains the collected airborne particles—to a laboratory for a further in-depth analysis.

The design of the particle monitor and cartridge allows for a very flexible approach for collecting and analyzing particles. In particular, in another specific embodiment, the cartridge is used for surface particle sampling. Surface particle sampling may be instead of or in addition to airborne pollen or particle sampling. The cartridge facilitates a collection system or mechanism that is handheld and easily portable. A user can hold a body of the cartridge in their hand, position an opening or slot of the cartridge through which a portion of the tape is exposed, and press the slot against a surface of an object. Particles on the surface may then be transferred from the surface of the object to the exposed portion of the tape. The user can then insert the cartridge into the particle monitor for analysis of the particles that have been collected on the tape.

In a specific embodiment, a handheld portable particle monitor with removable collection cartridge is provided. In this specific embodiment, the monitor is a relatively small, lightweight, inexpensive, and compact device. The monitor is powered by a battery. This allows the monitor to be easily portable and mobile because the monitor does not have to be connected to an electrical outlet to operate. A user can take the monitor and cartridge to an environment where there might not be any electrical outlets such as to a vineyard, farm, plantation, ranch, forest, or other field environment to collect and analyze airborne particles, surface-borne particles, or both.

In an embodiment, the cartridge is a unit separate from the monitoring device. The components of the cartridge may be housed in a case that is separate or different from a case housing the components of the monitoring device. In an embodiment, the components of the cartridge (e.g., supply and uptake reels, tape, or tensioning mechanism) may be relatively inexpensive as compared to the components of the monitor. Components of the cartridge may be passive while the monitoring device may include active components (e.g., electrical components). The design of the monitor and cartridge helps to lower the overall cost of system and facilitates reuse of the monitor with different cartridges.

Particles that may be associated with diseases including agricultural diseases, plant diseases, animal diseases, and so forth can be easily collected, analyzed, and identified in the field before widespread damage occurs. The handheld particle monitor may include a handle connected to a body of the monitor so that the monitor can be carried. Instead or additionally, at a least a portion of an outside surface of the monitor body may be textured or knurled to facilitate carrying. Further, because the monitor may be used in outdoor environments, as well as indoor environments, the monitor may include seals to provide a weather-resistance or weather-proof construction. Examples of seals include O-rings, gaskets, all-weather glue, and others.

The particle collection device may include an electronic screen to display a status associated with operations of the particle collection device (e.g., "collection cartridge tape 80 percent full," "analyzing particles," "device error," "transmitting data to remote cloud server," "firmware update in progress, please wait," and so forth). There can be status lights such as LED status indicators. The particle collection device may include an input device such as a keypad through which the user can power the device on or off, configure various settings and parameters such as collection frequency (e.g., sample air every 5 minutes, every 10 minutes, every 20 minutes, or every 30 minutes), other settings, and so forth. Instead or additionally, at least some settings may be configured remotely such as via a mobile device having a mobile application paired with the particle monitor.

The blower may include a fan and is responsible for creating a vacuum in which air is pulled, sucked or otherwise induced to flow into the collection device through the air intake opening. A flow path of air is directed to the particle collection cartridge. Particles that may be floating or suspended in the air are trapped by the adhesive tape of the particle collection cartridge. The air then exits the collection device through the air exhaust opening.

The first motor operates to rotate the housing of the collection device about the base. The collection device may include an airflow sensor or airflow direction sensing unit that detects a direction of the flow of the ambient air. Based on the direction of the airflow, the first motor can rotate the collection device to orient or align the air intake opening with a direction of the flow of the ambient air. Instead or additionally, the first motor may be configured to continuously or periodically rotate to obtain good representative samples of the ambient air.

The second motor engages the uptake reel of the tape media to unwind the adhesive coated tape media from the supply reel. For example, as airborne particles such as pollen become trapped in a portion of the adhesive coated tape, the second motor can unwind the reel to expose a new portion of the adhesive coated tape upon which new airborne particles can be collected.

The second motor is further responsible for advancing the tape containing the trapped particles to the optical and illumination subsystems. One or more lighting sources of the illumination subsystem illuminate the trapped particles while a camera sensor of the optical system captures images (e.g., pictures) of the trapped particles for analysis and identification.

The communications interface is responsible for communications with, for example, the mobile device, remote cloud server, or both. The communications interface may include an antenna for wireless communication.

Figure 32:
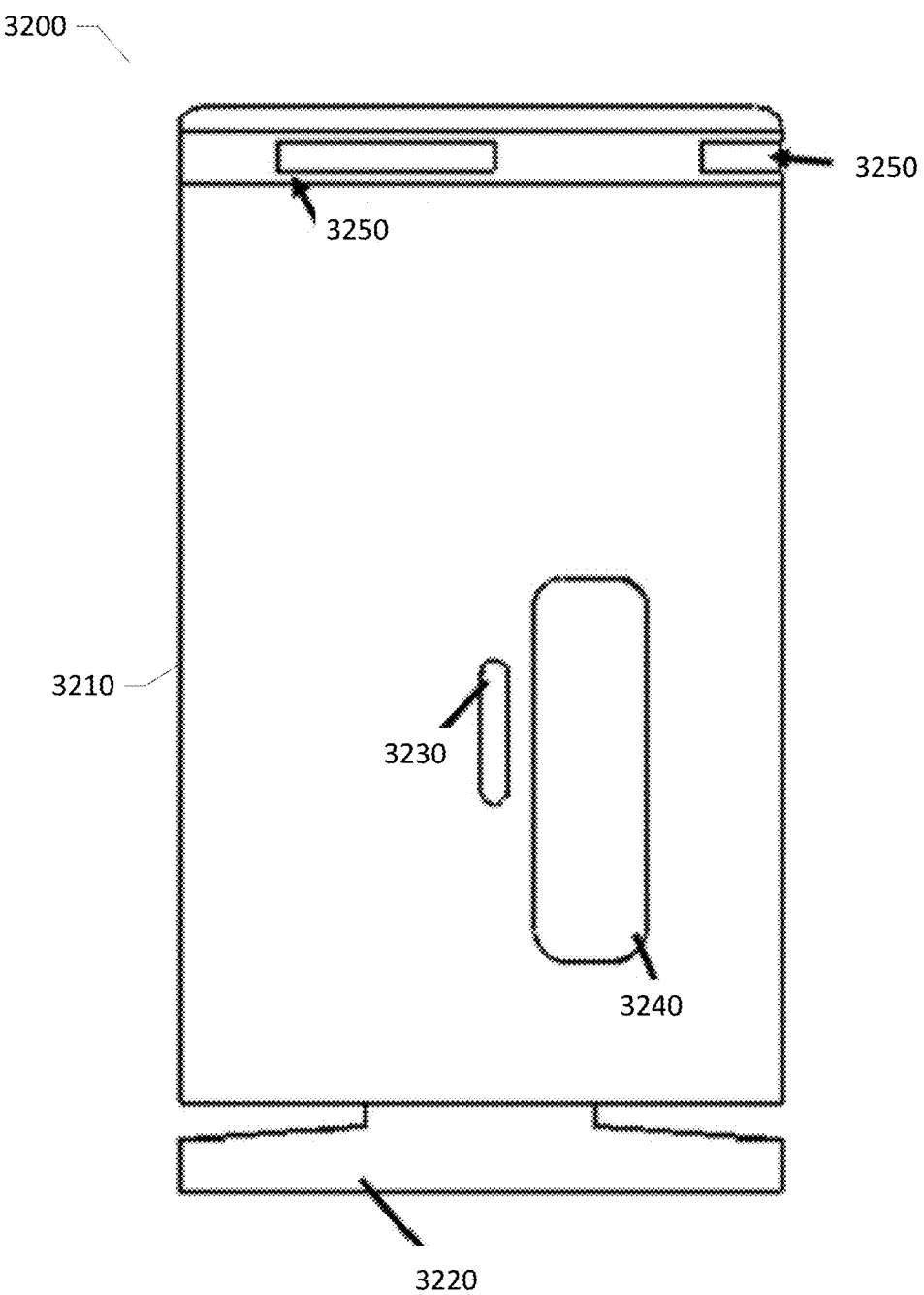
FIG. 32 shows an exterior view of an airborne particle monitor according to one or more embodiments.

FIG. 32 shows an exterior view of a particle monitoring device 3200 according to an embodiment. This monitoring device includes a cylindrical housing 3210 that contains most of the device components as well as a base 3220. Cylindrical housing 3210 contains an air-intake slot 3230 that may be a few centimeters in length and a width that varies from about 3 millimeters (mm) to about 1 mm in funnel-like fashion as it penetrates the thickness of the cylindrical housing 3210. The length of the air-intake slot may range from about 3 centimeters (cm) to about 10 centimeters. This includes, for example, 4, 5, 6, 7, 8, 9, or more than 10 centimeters. The length may be less than 3 centimeters.

The cylindrical housing 3210 also contains a particle-media-cartridge door 3240 that may be opened in order to insert or remove particle media cartridges. The air-intake slot is adjacent or next to the cartridge door. A shape of the cartridge door includes a rectangle, perhaps with rounded corners. The cartridge door is oriented vertically with respect to a central axis passing through the particle collection device. The door may be positioned closer to the base of the monitor than the top of the monitor.

As shown in the example of FIG. 32, in an embodiment, the cartridge door includes a top door edge, a bottom door edge, opposite the top door edge, and left and right door edges extending between the top and bottom door edges. The bottom door edge is closer to the base than the top door edge and the bottom and top door edges are parallel to each other. The left and right door edges are opposite and parallel to each other.

The air-intake slot includes a top intake edge, a bottom intake edge, opposite the top intake edge, and left and right intake edges extending between the top and bottom intake edges. The bottom intake edge is closer to the base than the top intake edge and the bottom and top intake edges are parallel to each other. The left and right intake edges are opposite and parallel to each other.

In an embodiment, the air-intake slot is located relatively close to the cartridge door. This helps to allow particles in the air entering through the air-intake slot to be collected on the media cartridge.

The cylindrical housing 3210 and its contents may rotate about its cylindrical axis with respect to the base in order to orient the air-intake slot 3230 in a desired direction. In some cases, it may be desired to systematically vary the orientation of the air-intake slot 3230 in order to average over all directions. Alternatively, the particle collection device 3200 may orient itself so that the air-intake slot 3230 faces upwind to any breeze or other flow of ambient air. In this latter case, it is advantageous for the particle collection device 3200 to include wind or airflow sensors. Visible in FIG. 32 are two of four wind-detector recesses 3250 in which may be mounted airflow sensors in such a way that they are both exposed to ambient airflow and mechanically protected from accidental impact or contact. In a specific embodiment, a wind-detector recess includes a cantilever deflection detector. Wind detectors of many types, including hot-wire airflow detectors, cantilever deflection detectors, or both may be placed in the wind-detector recesses 3250.

The generally cylindrical elongated shape of the housing helps to reduce interference with other external objects (e.g., grape-vine branches) when the collection device rotates to sample airborne particles such as pollen, mold spores, or both from different directions. In this specific embodiment, a cross-sectional shape of the housing includes a circle. In other specific embodiments, a cross-sectional shape of the housing may include a square, rectangle, oval, triangle, or any other shape.

Figure 33:
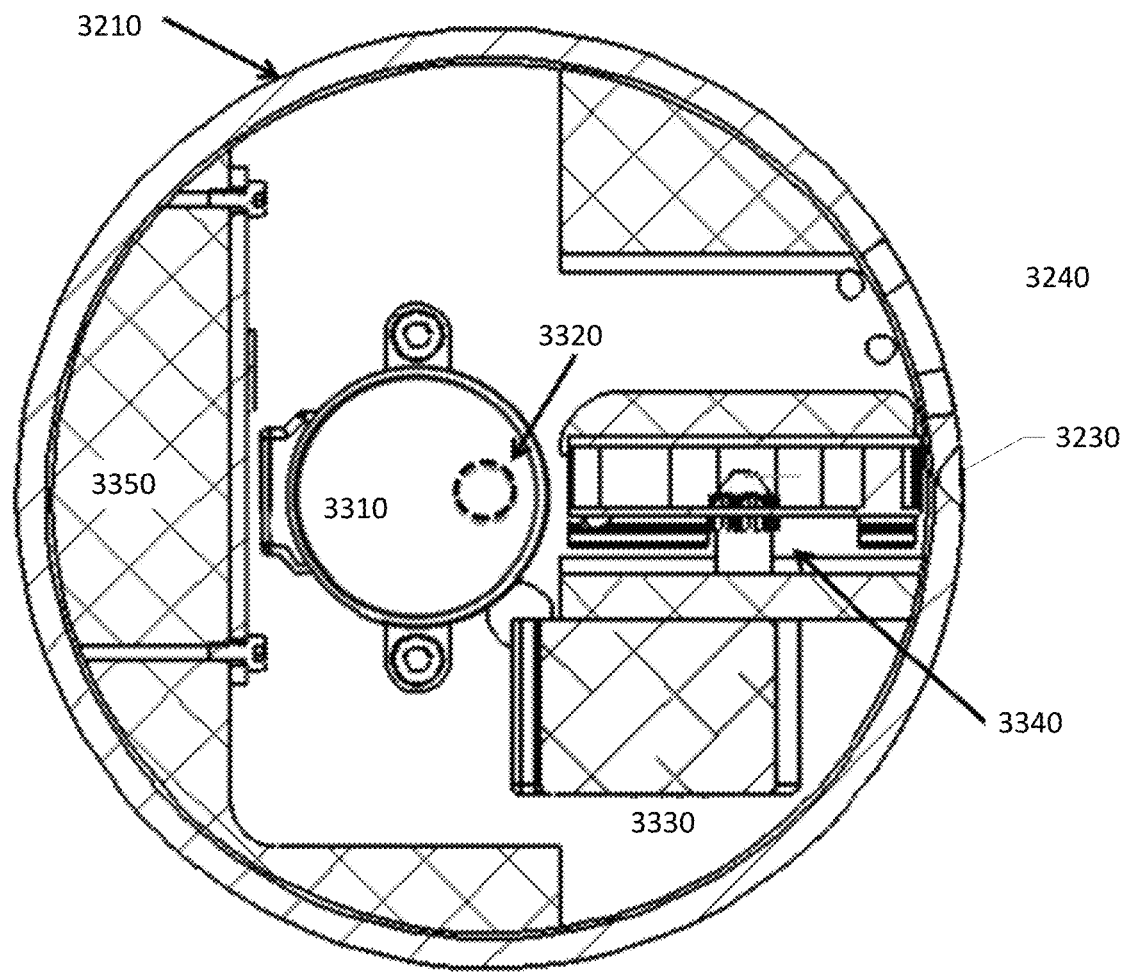
FIG. 33 shows a plan-view of the particle monitor shown in FIG. 32 including motors according to one or more embodiments.

FIG. 33 shows a plan-view of selected items of the particle collection device 3200 shown in FIG. 32. The device includes two electric motors. Orientation motor 3310 rotates the cylindrical housing 3210 and its contents about its vertical axis and relative to the base 3220 (FIG. 32). While the orientation motor 3310 is not centered with respect to the axis of the cylindrical housing 3210, the orientation motor's gear shaft 3320 is centered. The uptake-reel gear shaft 3340 of the cartridge-reel motor 3330 extends horizontally and controls the rotation of the uptake-reel of the cartridge. Many of the contents contained within the cylindrical housing 3210, including motors 3310 and 3330, are mechanically supported by the internal mounting structure 3350. For example, internal components of the monitoring device such as a printed circuit board, motors, and so forth may be attached to the internal mounting structure using various fasteners, welding, adhesives, or combinations of these. Examples of fasteners include nuts, bolts, screws, and washers. Adhesives include epoxy or glue. Examples of welding include plastic welding. The internal mounting structure 3350 may be formed of a sculpted volume of plastic. The mounting structure may be formed using injection molding.

Figure 34:
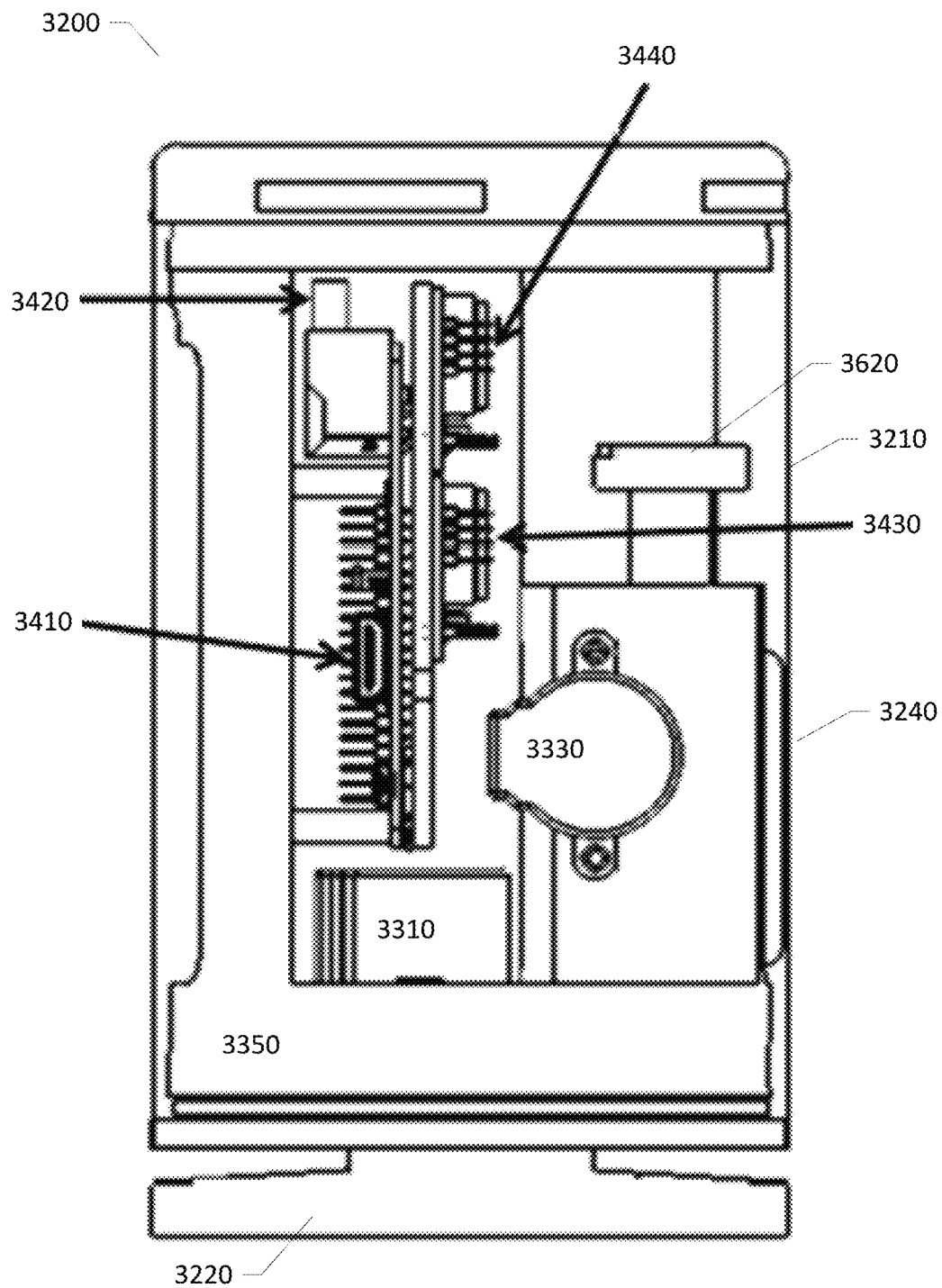
FIG. 34 shows a vertical cross-section of the particle monitor shown in FIG. 32 illustrating the placement of electronic boards according to one or more embodiments.

FIG. 34 shows a vertical cross section of particle monitor device 3200 according to a specific embodiment. In this specific embodiment, the particle collection device includes three electronic boards. There is a motherboard 3410, an orientation-motor circuit board 3430, and a cartridge reel motor circuit board 3440.

Motherboard 3410 contains many electronic components including a microprocessor (e.g., Raspberry Pi) and a wifi antenna 3420. Alternatively Bluetooth or any other wireless protocol may instead or additionally be used. In a specific embodiment, cylindrical housing 3210 is constructed from a non-conductive material such as plastic rather than a metal for effective wireless communication. In another specific embodiment, the cylindrical housing may be constructed from metal for durability. In this specific embodiment, an antenna may be placed on or embedded within an outside surface of the cylindrical housing. In another specific embodiment, the cylindrical housing may be constructed from a combination of materials (e.g., metal and plastic).

Additional circuit boards (not shown) may be included. Also not shown in FIG. 34 for purposes of clarity are numerous wires interconnecting various components such as wires between the motors and their corresponding circuit boards.

The motors are located closer to a bottom of the particle monitor than a top of the particle monitor. In an embodiment, orientation motor 1110 is located near the bottom so as to be close to base 3220. Cartridge reel motor 1130 also is located nearer to the bottom than the top of the particle monitor as the particle-media cartridge is placed below the optical system. While the motors may be light weight, in the case that the motors are relatively heavy, locating the motors towards the bottom of the particle monitor helps to lower the center of gravity and provide stability so that the monitor is unlikely to tip over. Likewise, a power supply such as a battery may be located closer to the bottom of the monitor than the top of the monitor.

In an embodiment, the motors are light-weight. For example, a motor may weigh about 113-142 grams (or 4-5 ounces) only. In this embodiment, one benefit of placing the motors on the bottom is because the base of the system may be on a surface and when coupled with a ball bearing it enables for easy rotation. The battery is likely to add more weight near the bottom which would be advantageous.

Specifically, with respect to a vertical positioning, the orientation motor is between the bottom of the monitor and the motherboard. The cartridge reel motor is between the orientation motor and the camera sensor. The camera sensor, being relatively light, is positioned closer to the top of the monitor than the bottom of the monitor. The camera sensor is between the cartridge reel motor and the top of the particle monitor. With respect to a horizontal positioning, the cartridge reel motor is between the motherboard and the cartridge door.

Figure 35:
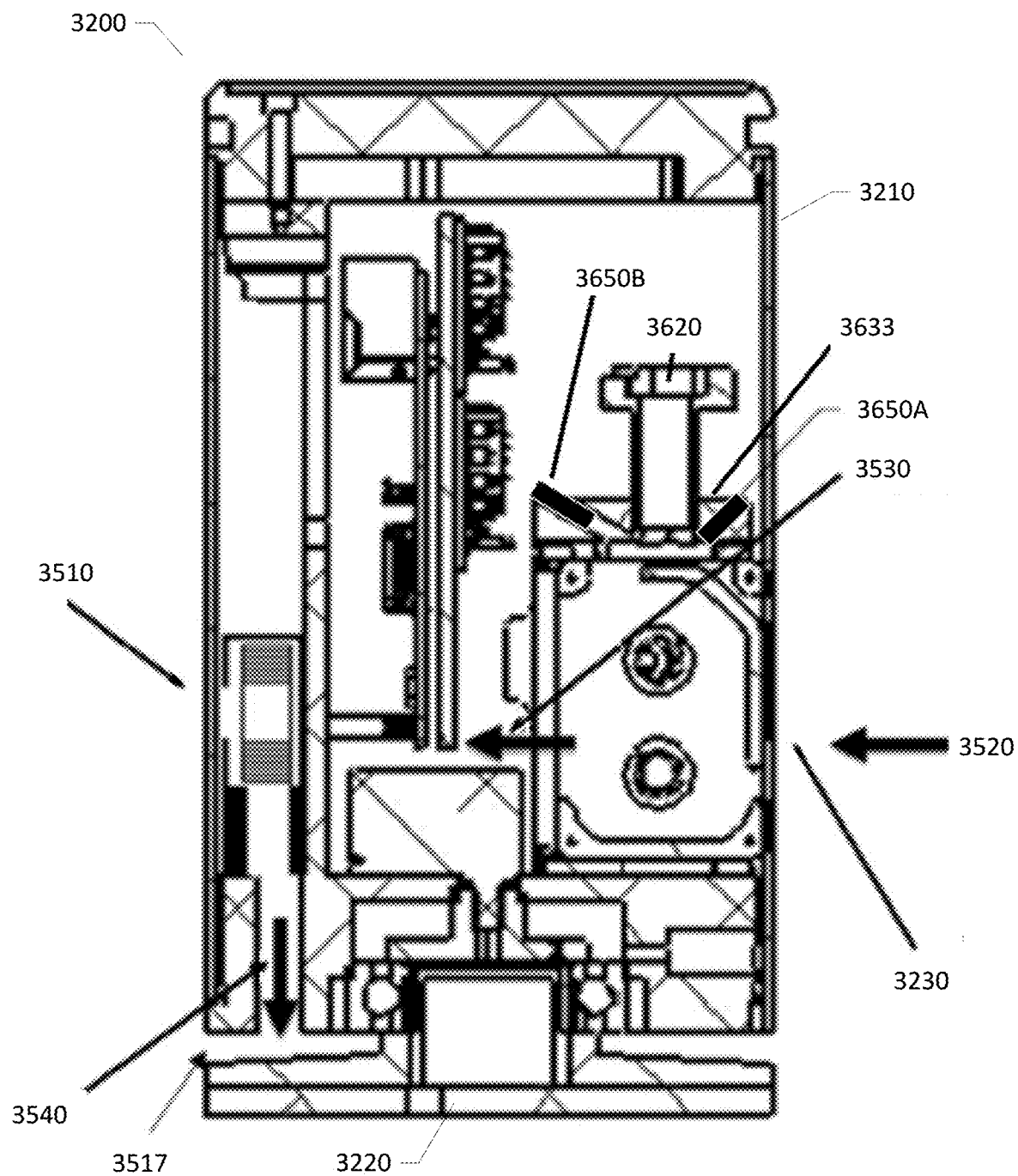
FIG. 35 shows some detail of the particle monitor shown in FIG. 32 with optics and particle media cartridge, as well as illustration of air flow according to one or more embodiments.

FIG. 35 illustrates how sampled ambient air flows through the monitor device 3200. Sampled ambient air 3520 enters through the air-intake slot 3230 and immediately encounters the air-intake zone 130 (see, e.g., FIG. 3) of the particle-media cartridge. Here the adhesive-coated tape 370 (see, e.g., FIG. 3) captures many of the particles within the sampled ambient air 3520. Device-interior air 3530 then exits out the backside 379 of the particle-media cartridge body (see, e.g., FIG. 3); for this purpose and as seen in, for example, FIGS. 3, 6, 7, 10, and elsewhere, the back side of the cartridge is open rather than closed. Finally exhaust air 3540 (FIG. 35) leaves the device. This airflow is driven by blower 3510 which pushes out exhaust air 3540 and pulls or sucks in sampled ambient air 3520. The blower is opposite the air intake slot and above the exhaust. A gap 3517 between a bottom of the housing and a top of the base allows the exhaust air to escape.

Air intake slot 3230 is opposite the blower and is configured to direct a flow path of ambient air created by the blower towards or over the first opening of the cartridge or air intake zone. For example, there can be channel, duct, conduit, tube, or passageway that directs the flow path of the air from the air intake zone. Particles, such as mold spores, pollen, or both, in the air are trapped by the adhesive on the tape. Preferably, the airflow in the air intake zone is turbulent in order to maximize or increase the chances that particles in the sampled air will be separated from the air and adhered to the capturing medium. When desired, cartridge reel motor 3330 (FIG. 33) advances the tape containing the trapped particles to the second opening of the cartridge or inspection zone. The camera sensor can then capture images of the particles trapped within the adhesive tape.

Figure 36:
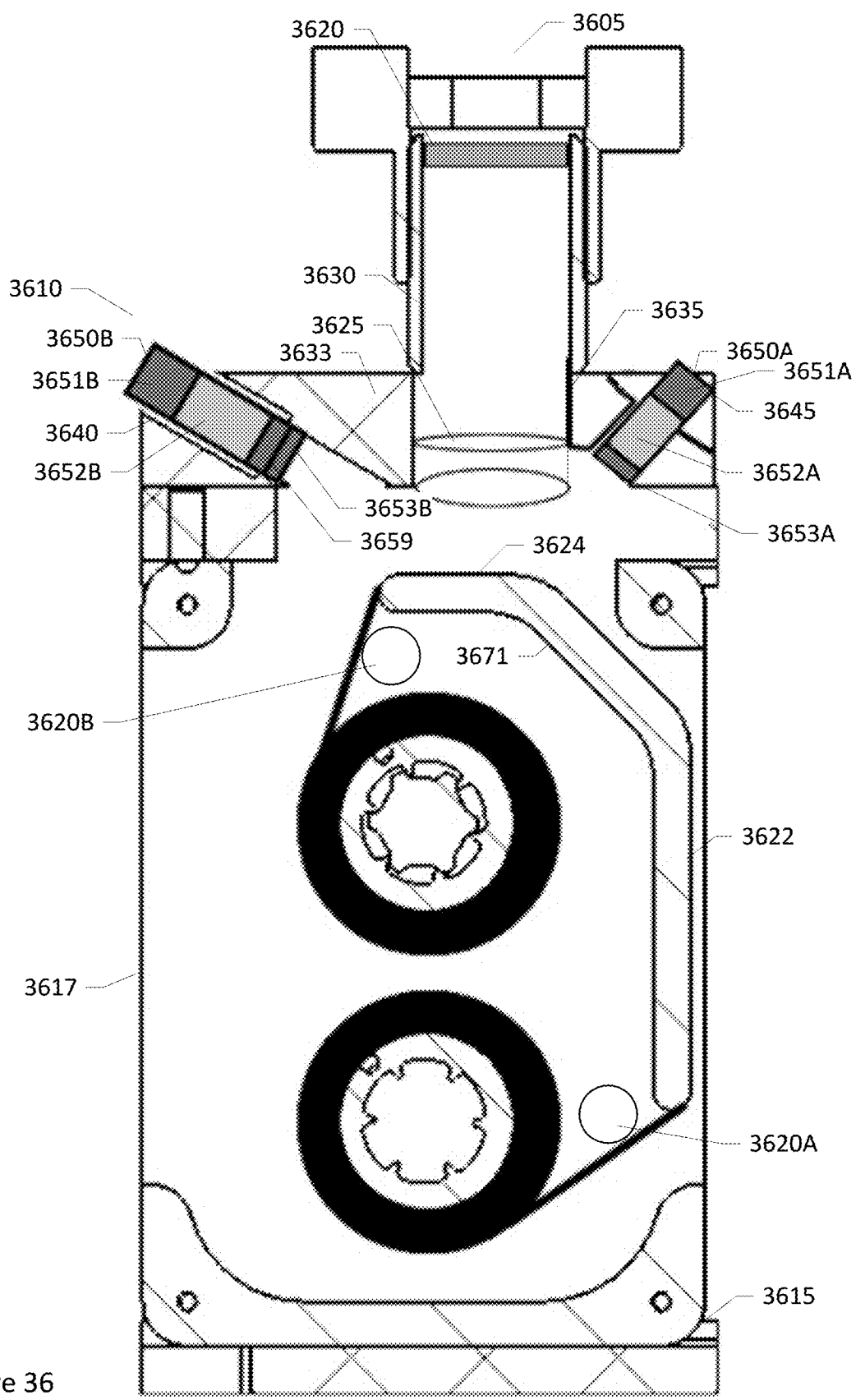
FIG. 36 shows a side view of an inside portion of the particle monitor shown in FIG. 32 according to one or more embodiments.

FIG. 36 shows a side view of an inside portion of monitor device 3200. The monitor device includes an optical subsystem 3605, illumination subsystem 3610, cartridge well 3615, platform 3633, and a particle-media cartridge 3617. In this specific embodiment, the cartridge includes first and second rollers 3620A, B, respectively. FIG. 36 illustrates a loaded particle-media cartridge in the cartridge well along with an optical subsystem for particle inspection.

During a collection period, particles entering the monitor are trapped within air intake zone 3622 by the adhesive of the tape. The tape or, more specifically, a portion of the tape having the trapped particles, is then advanced to particle inspection zone 3624 for inspection.

The optical subsystem includes a camera sensor 3620, lens assembly 3625, and tube 3630. The lens assembly is positioned at a bottom end of the tube and the camera sensor is positioned at a top end of the tube, opposite the bottom end of the tube. The cartridge well receives and holds the particle-media cartridge in a vertical position.

Contributing to the cost-effectiveness of the particle-monitoring device is the use of a camera sensor 3620 contained within a mass-produced and highly-integrated camera sensor chip package such as the SONY IMX line of camera sensors and the Omni Vision OV line of camera sensors as provided by Sony Corporation of Tokyo, Japan and OmniVision Technologies Inc. of Santa Clara, Calif., respectively. Such highly integrated packages avoid the cost and mechanical bulk of many associated electronic circuits.

Figure 37:
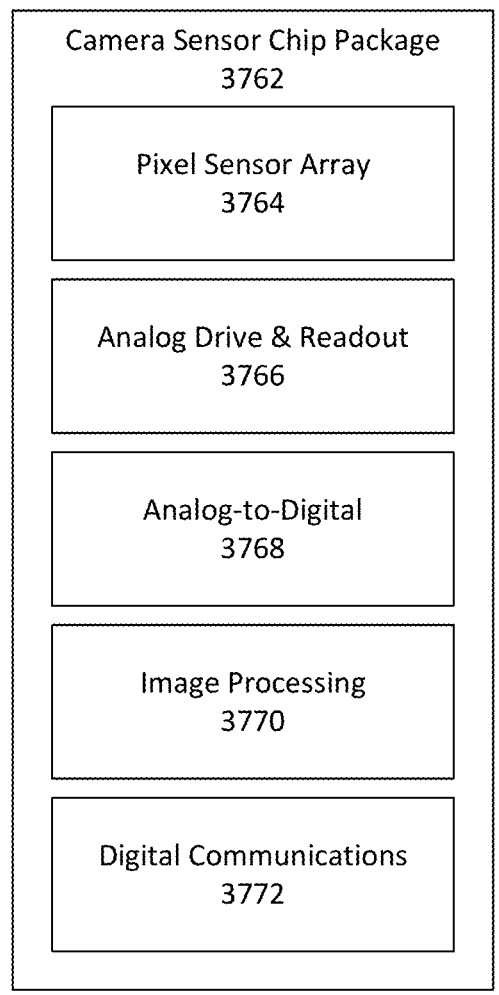
FIG. 37 shows a block diagram of a highly integrated camera sensor chip package according to one or more embodiments.

As illustrated by the block diagram of FIG. 37, in a specific embodiment, a highly integrated camera sensor package 3762 includes within a single chip package not only the light-sensing pixel sensor array 3764, but also analog drive and readout circuitry 3766, analog-to-digital conversion circuitry 3768, digital image processing circuitry 3770, digital communications circuitry 3772 to transfer digital images to a host processor, as well as many other circuits not shown in FIG. 37 such as power regulation circuitry, timing circuits, and so forth. With all these supporting circuits contained with the highly integrated camera sensor package 3762, the number of electronic components in the bill of materials for a particle-monitoring device is significantly reduced, thus reducing cost and enabling a more compact mechanical design.

Referring back now to FIG. 36, platform 3633 is positioned above the cartridge well. The platform can be between the cartridge well and illumination and optical subsystems. The platform includes a first hole 3635, a second hole 3645, and a third hole 3640. The bottom end of the tube of the optical subsystem extends into the first hole which opens to face particle inspection zone 3624 of the particle media-cartridge. In other words, when the particle media-cartridge is inserted into the particle monitor, the particle inspection zone of the cartridge aligns with the first hole. The camera sensor is directly above the lens assembly which is directly above the particle inspection zone. The arrangement allows the camera sensor to capture images of particles that have been trapped by the adhesive coated tape.

In other words, in the example shown in FIG. 36, the platform is above the cartridge well that receives the collection cartridge. The camera sensor is positioned within the particle monitor device to be above or over the second opening or particle inspection zone of the cartridge. The camera sensor is closer to a top of the particle monitor than the cartridge.

Positioning the camera sensor above the particle inspection zone helps to reduce the probability of particles falling onto the camera lens and obscuring the images. For example, in some cases, particles remaining in the sampled air and not adhering to the tape may settle on the lens, the bond between the adhesive coated tape and collected airborne particles may be weak, the adhesive coated tape may include a large collection or mound of particles and particles at the top of the mound may not be secured to the adhesive coated tape, and so forth. The collection cartridge and camera sensor may be aligned such that a line passing through the supply and uptake reels passes through or near the particle inspection zone and lens to the camera sensor. In another embodiment, the tape is transparent and the image capture is from the backside of the tape (the non-adhesive side). This prevents particles from entering the lens as well since they hit the tape surface and the camera optics and imaging system is located behind the tape surface.

The second hole 3645 houses a first illumination or light source 3650A. Light from a first light emitting element 3651A is directed within a guide or optical shaft 3652A to a diffuser 3653A. The third hole 3640 houses a second illumination or light source 3650B. Light from a second light emitting element 3651B is directed within a guide or optical shaft 3652B to a quantum dot film 3659 to a diffuser 3653B. The diffusers, quantum dot film, or both may be optional and not included in some embodiments.

The illumination sources illuminate the particle inspection zone so that the camera sensor can capture images of the trapped particles when illuminated by the illumination sources. Images may be captured while one or more illumination sources are active, after one or more illumination sources have been activated and deactivated, before one or more illumination sources have been activated, or combinations of these.

The illumination light may be visible light, UV light, or infrared light, or a combination thereof. As discussed, different types of particles can have different light absorption characteristics. For morphology analysis, visible light, or even one color of visible light can be sufficient. It is also an option to perform morphology analysis based on UV fluorescence images. In other words, UV fluorescence images may be used for morphology analysis. Thus, a UV light source may be used to identify a shape and outline of the particle and to also probe its fluorescent properties or characteristics. As a result, in an embodiment a visible or white light source may be omitted from a particle monitor.

In some cases, a morphology analysis will not be sufficient to make a conclusive identification as there can be particles of different types but which have the same or similar geometric features. Color information becomes particularly interesting when it provides even a crude level of biochemical analysis without the delays and cost of wet-laboratory techniques. The differences in light absorption characteristics of different particles can be exploited to identify particles or discriminate between particles.

For example, pollen grains tend to have a yellowish color, so color as perceived by the human eye, or an RGB camera sensor under white light illumination is of value to check if a candidate pollen grain is indeed yellowish. Illuminating with white light and capturing the resulting image provides a useful indication of the colors of the particles that have been captured. Grass pollens tend to have bio-molecule chlorophyll-a and hence a pollen grain with visible light absorption peaks of chlorophyll-a is likely to be a grass pollen.

Fluorescence under UV illumination is a marker of bio-molecules that can be used to distinguish between organic and inorganic particles. Biochemical information can be provided by UV fluorescence. Fluorescence is a property some molecules have in which they absorb light of one color and emit light of a different color (e.g., different wavelength). While UV light might not be detected by the camera sensor, the resulting fluoresced or emitted light from the particle may be detected by the camera sensor. As another example, illumination in near infra-red (near enough in wavelength to visible light to be detected by the camera sensor) may provide useful information in regards to identifying particles or discriminating between particles.

As discussed, in a specific embodiment, first roller 3620A includes a soft resilient or springy material. During imaging, the first roller helps to tension at least a portion of the tape (or flexible substrate) within the particle inspection zone by pulling the tape against a tape guide 3671 and holding the tape steady.

In a specific embodiment, there is an apparatus for the collection and detection of airborne particles comprising an optical imaging system having an exposure time and a particle inspection zone. The optical imaging system may include a camera sensor, a lens system and a focal plane within the particle inspection zone. The apparatus also includes a flexible substrate with an adhesive coating with which to capture particles and then move them to the particle inspection zone. Between image captures, the flexible substrate may be advanced to bring different particles within view of the optical imaging system; at such times the flexible substrate may be described as being in an "advancing state".

In this specific embodiment, when the optical imaging system is capturing an image, the flexible substrate is an "imaging state" in which the flexible substrate portion within the particle inspection zone is sufficiently still to allow capture of images that are not overly blurred. It is desired that any blurring of the image due to undesired motion of the flexible substrate during image capture be small compared to the size of particles imaged. More specifically, given the size of particles of interest, any undesired motion during image capture is preferably less than 5 microns, more preferably less than 1 micron, and even more preferably less than 0.5 microns.

Associated with image capture is an exposure time. To capture images of scattered visible light, exposure times of a small fraction of a second are often sufficient. However, due to the weakness of fluorescence signals, longer exposure times are needed to capture fluorescence images under UV illumination, particularly if the UV light source is a low-cost UV LED. An exposure time of one second or longer may be needed to capture a good UV fluorescence image. To avoid blurring in UV fluorescence images, it is desirable that in the imaging state, the flexible-membrane portion within the particle inspection zone move at most a small distance (e.g., less than 5, 1 or 0.5 microns) over an exposure time of one second or more. Such a desired lack of significant motion of the flexible substrate or membrane during the exposure time may be achieved with the flexible substrate tensioning means (e.g., tensioning roller) described in this application.

In other words, in a specific embodiment, due to UV illumination with low-cost LEDs, and the weak fluorescence signal, a monitoring device according to one or more embodiments, has a long exposure time compared to other optical systems.

Figure 38:
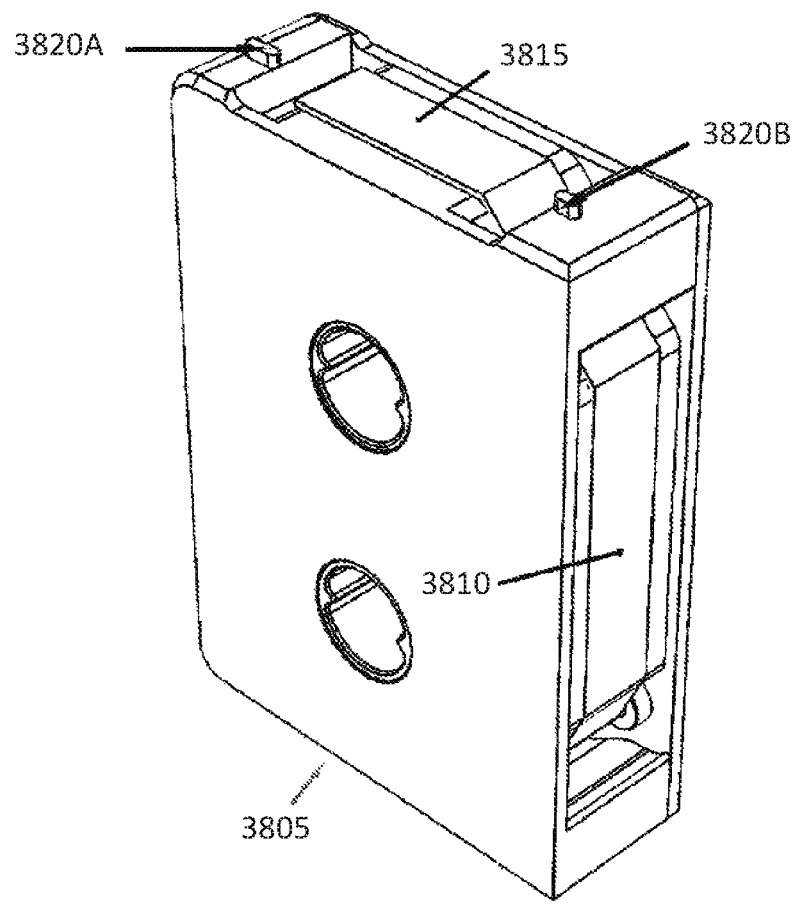
FIG. 38 shows a perspective view of a cartridge having a keying feature according to one or more embodiments.

FIG. 38 shows a cartridge (or cassette) 3805 according to another specific embodiment. The cartridge shown in FIG. 38 is similar to cartridges shown elsewhere in this application (e.g., FIG. 10). For example, the cartridge includes a right side 3810 having an air-intake zone, and a top side 3815 having a particle inspection zone.

In the embodiment, shown in FIG. 38, however, the cartridge include a keying feature including a first keying nub 3820A and a second keying nub 3820B. The keying feature helps to ensure the cartridge (or cassette) can only be inserted into the cartridge well of the particle monitor in one or more specific orientations. In this specific embodiment, the cartridge well includes a complementary groove, recess, channel, or other receptacle to receive the keying nubs.

That is, the keying feature helps to ensure that the user inserts the cartridge correctly into the housing of the monitor. The keying feature or corresponding key and grooves help to enable proper directional insertion of the cartridge into the apparatus or device monitor. The keying feature helps to prevent damage from inserting the cartridge incorrectly. A cartridge that is inserted incorrectly may damage the cartridge, monitor, or both. For example, tape housed in the cartridge may stick to back side of module. The "key" or keying nubs may be in any location. In a specific embodiment, the keying nubs are positioned at the top side of the cartridge body. This particular location is very economical for use in one or more embodiments of the particle monitor.

As shown in the example of FIG. 38, the first keying nub is at an end of the particle inspection zone, and the second keying nub is at an opposite end of the particle inspection zone. The first keying nub may be closer to a left side of the cartridge than a right side of the cartridge. The second keying nub may be closer to a right side of the cartridge than the left side of the cartridge. The keying nubs protrude from an outside surface of the top side of the cartridge. An inside surface of the cartridge well includes a complementary recess that is shaped to receive the corresponding keying nubs. When the cartridge is at the correct orientation, the keying nubs mate with the recess and the cartridge can slide into the monitor.

In this specific embodiment, the keying feature includes a keying nub on the cartridge and a complementary recess within the cartridge well of the monitor. In another specific embodiment, the keying nub and recess may be swapped. For example, one or more keying nubs may protrude from an inside surface of the cartridge well of the monitor while the cartridge may have the corresponding recess or groove.

Figure 42:
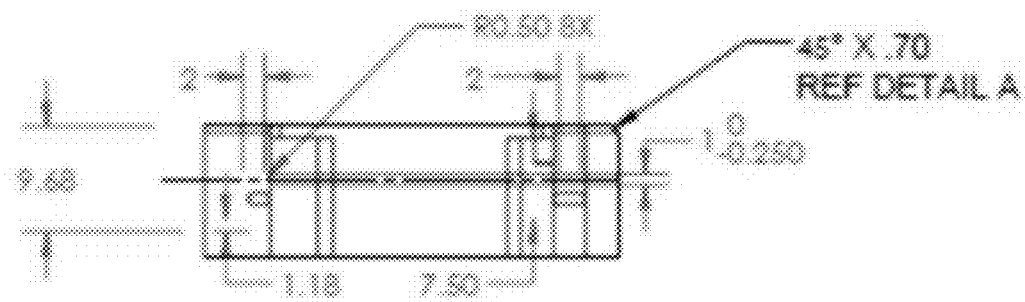
FIG. 42 shows a top view of the cartridge shown in FIG. 39.
Figure 39:
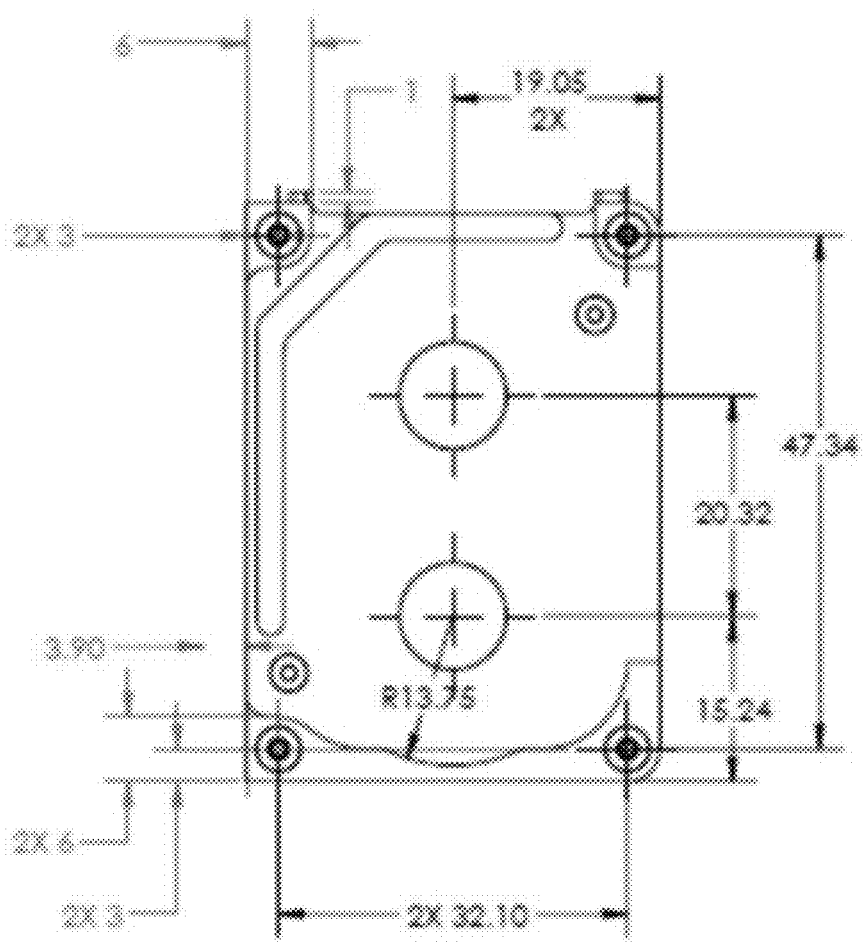
FIG. 39 shows an inside back view of a cartridge having a keying feature according to one or more embodiments.
Figure 49:
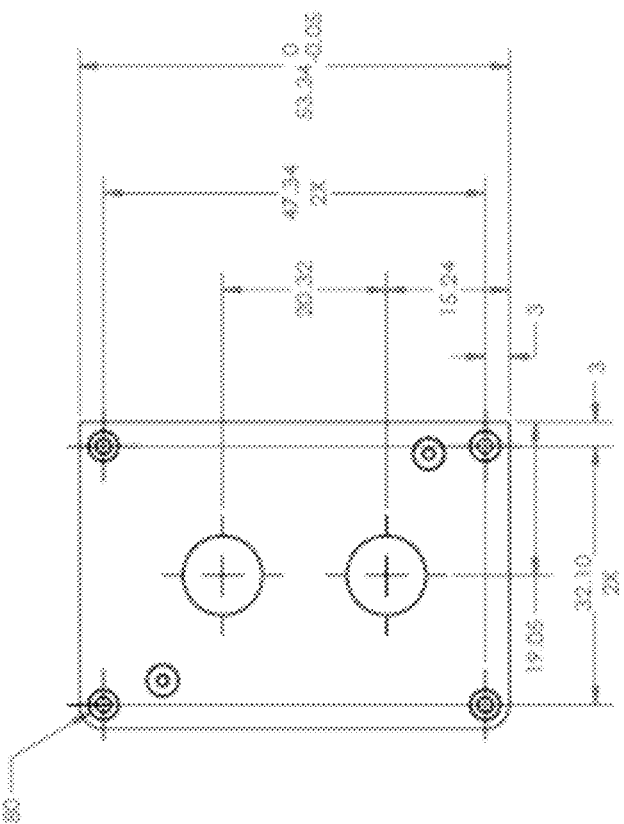
FIG. 49 shows another view of a panel of the cartridge shown in FIG. 39.
Figure 48:
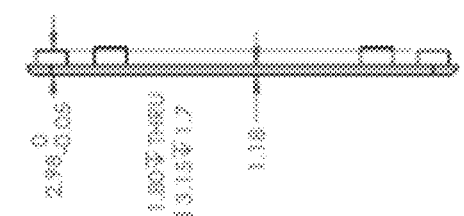
FIG. 48 shows a side view of the panel shown in FIG. 39.
Figure 50:
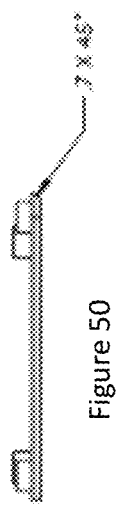
FIG. 50 shows another view of a panel of the cartridge shown in FIG. 39.
Figure 47:
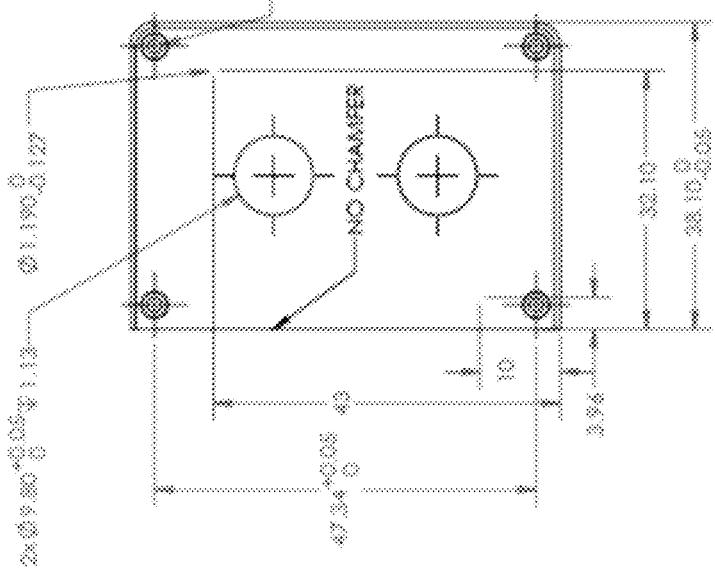
FIG. 47 shows a front view of a panel of the cartridge shown in FIG. 39.

FIGS. 39-50 show various views of a cartridge having a keying feature and various dimensions (in millimeters)

according to a specific embodiment. A material of the cartridge may include a thermoplastic such as Delrin®. FIG. 39 shows an inside back view of the cartridge. FIG. 40 shows a side view of the cartridge. FIG. 41 shows a front view of the cartridge. FIG. 42 shows a top view of the cartridge. FIG. 43 shows a detail view of the cartridge. FIG. 44 shows another inside back view of the cartridge. FIG. 45 shows a side view of the cartridge. FIG. 46 shows another side view of the cartridge. FIG. 47 shows a front view of a panel of the cartridge. FIG. 48 shows a side view of the panel. FIG. 49 shows another view of a panel of the cartridge. FIG. 50 shows another view of a panel of the cartridge.

FIGS. 51-54 show various views of a reel (or wheel) 5105 of the cartridge and various dimensions (in millimeters) according to a specific embodiment. The reel includes a pair of flanges 5110A, 5110B on opposite sides of the tape and having a diameter such that the outer edges or rims of the flanges extend above the coiled tape. A material of the reel may include a thermoplastic such as Delrin®. FIG. 51 shows a perspective view of the reel. FIG. 52 shows a side view of the reel. FIG. 53 shows a front view of the reel. FIG. 54 shows a detail view of the reel.

In a specific embodiment, the reel design shown in FIGS. 51-54 is used for the uptake reel. In another specific embodiment, the reel design shown in FIGS. 51-54 is used for the supply reel. In another specific embodiment, the reel design shown in FIGS. 51-54 may be used for both the uptake and supply reels in a cartridge (or cassette).

The reel design shown in FIGS. 51-54 (and FIG. 17B) facilitates the operation of the tape. In a specific embodiment, an initial supply of tape is obtained. In this specific embodiment, the tape is provided in a width of 1-inch and is cut down to 0.25-inches. Thus, four pieces out of a 1-inch section of tape is produced for use in a cartridge. When the tape is cut, the edges along the cut on the tape expose some of the adhesive. Without the flanges of the wheel, as the cartridge is used in the devices if the adhesive touches the sides (inner wall of the cartridge or cassette) the adhesive begins to stick and eventually the tape may get stuck on the side wall of the cassette.

Further, due to tolerances and manufacturing processes used, there may be misalignments of the wheel, cassette, and tape which can allow the tape to touch the side of the cassette inner wall regardless of being cut or not that the adhesive may start to rub on the cassette wall and accumulate.

An uptake wheel, for example, having the reel design as shown in FIGS. 51-54 (and FIG. 17B) helps to allow the entire reel rotate with the tape and eliminates or reduced the chances of the adhesive touching the cassette walls where it may get stuck. This design helps to lower the cost of manufacturing processes as it compensates for potential misalignment.

Figure 55:
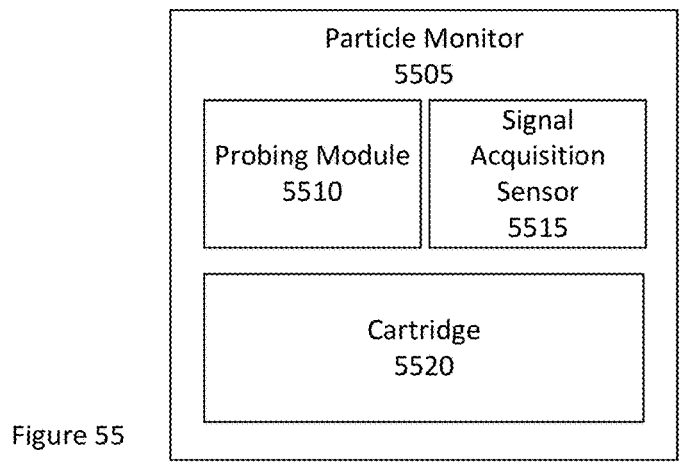
FIG. 55 shows a block diagram of a particle monitor according to one or more embodiments.

FIG. 55 shows a block diagram of a particle monitor 5505 according to another specific embodiment. In this specific embodiment, the particular monitor may include a probing module 5510 and signal acquisition sensor 5515. The probing module may or may not include a light source. The signal acquisition sensor may or may not include a light detector.

In a specific embodiment, the particle monitor does not include a camera sensor. The probing module may generate sound (e.g., sonar), a magnetic field, vibrations, or combinations of these which may be directed towards a cartridge or cassette 5520 upon which particles have been collected. The signal acquisition sensor may then detect the resulting signal returned by the particles in order to identify the particles.

In this specific embodiment, data other than data from a camera sensor is collected. In this specific embodiment, particles are collected on a tape media and a camera module is not used to identify or analyzed the collected particles. In this specific embodiment, the cartridge can be used not with a camera, but instead a scatter light collector which measures voltage or current generated by the sensor from a particle that comes across the light.

In a specific embodiment, particles may be distinguished from electromagnetic signatures not requiring a camera, but including use of a tensioning roller or mechanism in the cartridge to keep particles from moving while data is extracted and collected from each of the particles. According to one or more other embodiments, data other than light signatures using a camera are collected, such as magnetic field information, sound or vibratory information, sonar-like data composition, which may provide unique identifiers for these particles, etc. In a specific embodiment, there is an apparatus that instead of an optical imaging system, includes a signal acquisition sensor, where the signal comes from sound or magnetic field, or detects a range of vibrating waves, etc.

Figure 56:
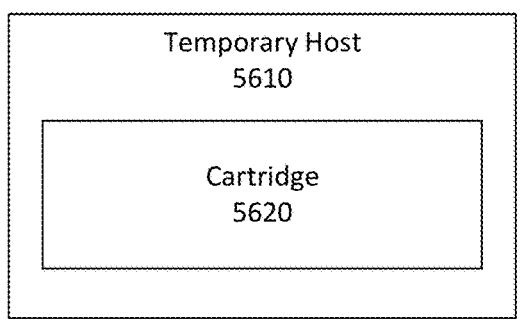
FIG. 56 shows a block diagram of a cartridge placed into a temporary host according to one or more embodiments.

FIG. 56 shows a block diagram of another specific embodiment in which a cartridge 5620 may be used. In the example shown in FIG. 56, the cartridge has been placed with a temporary host 5610. In a specific embodiment, the cartridge resides inside a temporary host, for example an autonomous vehicle, air or land based drone or a stationary module where the cartridge intake is exposed to air and tape advanced accordingly to collect particles. The host may or may not include a sensor module to identify and analyze the particles collected within the cartridge.

Figure 57:
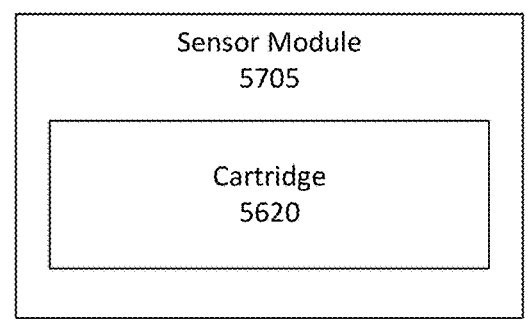
FIG. 57 shows a block diagram of the cartridge shown in FIG. 56 being analyzed by a sensor module according to one or more embodiments.

FIG. 57 shows a block diagram of the cartridge shown in FIG. 56 having been removed from the temporary host and placed inside a sensor module 5705. In other words, the cartridge from the temporary host may eventually be removed and put through a sensor module at a later time to then extract particle information. In this specific embodiment, the sensor module is a device that is separate from the temporary host. The sensor module may be housed in a housing that is separate or different from a housing that houses the temporary host.

Figures C-R in the appendix shows various views of one or more particle collection cartridges according to one or more embodiments.

In a specific embodiment, a cartridge for collecting particles includes: a housing; a supply reel inside the housing; an uptake reel inside the housing; a tape guide, inside the housing, and extending along a first side of the housing and a second side of the housing, adjacent to the first side; a tape, the tape comprising an inner surface, and an outer surface, opposite the inner surface, the outer surface faces away from centers of the supply and uptake reels and comprises an adhesive to trap the particles, the inner surface faces towards the centers of the supply and uptake reels and does not comprise the adhesive, the tape is wound about the supply reel, extends over the tape guide, and terminates at the uptake reel; and a first roller, inside the housing, and comprising a resilient foam material, the first roller being positioned inside the housing to press against the inner surface of the tape, wherein the resilient foam material resiliently deforms from contact with the tape and at least partially expands to urge the tape to lie flat against the tape guide, and wherein the first roller is located in the cartridge so that it is in contact with the inner surface of the tape before the particles collected on the tape have been scanned or imaged by a camera sensor of a particle collection device into which the cartridge is removably loaded.

The cartridge may include a second roller to guide the tape onto the uptake reel, wherein the second roller is located in the cartridge so that it is in contact with the inner surface of the tape after the particles have been scanned or imaged by the camera sensor. The first roller may include a concave surface.

In another specific embodiment, a cartridge for collecting particles includes: a housing; a supply reel inside the housing; an uptake reel inside the housing; a tape guide, inside the housing, and extending along a first side of the housing and a second side of the housing, adjacent to the first side; a tape, the tape comprising an inner surface, and an outer surface, opposite the inner surface, the outer surface faces away from centers of the supply and uptake reels and comprises an adhesive to trap the particles, the inner surface faces towards the centers of the supply and uptake reels and does not comprise the adhesive, the tape is wound about the supply reel, extends over the tape guide, and terminates at the uptake reel; and a first roller, inside the housing, and comprising a resilient foam material, the first roller being positioned inside the housing to press against the inner surface of the tape, wherein the resilient foam material resiliently deforms from contact with the tape and at least partially expands to urge the tape to lie flat against the tape guide.

In an embodiment, the first roller, a second roller within the cartridge, or both cause the tape to be flat and straight as it coils into the uptake reel without rippling thereby protecting the trapped particles by sandwiching the trapped particles between the adhesive and a backing of a previous winding of the tape.

In an embodiment, the tape is capable of operating within a temperature range having at least a 40 degree Fahrenheit temperature difference between a lower limit of the temperature range and an upper limit of the temperature range. In an embodiment, the tape comprises a polyester backing film.

In another specific embodiment, there is an apparatus for the collection and detection of airborne particles comprising an optical imaging system having an exposure time and a particle inspection zone, the apparatus also comprising a flexible substrate with an adhesive coating that passes through the particle inspection zone, where the flexible substrate alternates between a advancing state of moving through the particle inspection zone and an imaging state of not moving through the particle inspection zone, and the flexible substrate is tensioned so that in the imaging state the flexible membrane is so tensioned so that the flexible substrate portion in the particle inspection zone moves only a small distance during the exposure time.

In an embodiment, the exposure time is one second or greater. In an embodiment, the small distance is smaller than the diameter of the airborne particles being detected. In an embodiment, the small distance is less than one micron.

In a specific embodiment, an apparatus for collection and detection of airborne particles includes: an optical imaging system having an exposure time; a particle inspection zone; and a flexible substrate with an adhesive coating, wherein the flexible substrate passes through the particle inspection zone, wherein the flexible substrate alternates between an advancing state of moving through the particle inspection zone and an imaging state of not moving through the particle inspection zone, and wherein in the imaging state the flexible substrate is so tensioned such that a portion of the flexible substrate in the particle inspection zone moves at most a small distance during the exposure time.

In an embodiment, the flexible substrate is housed in a cartridge, separate from the optical imaging system, the cartridge comprising: supply and uptake reels within the cartridge, at least one of the uptake or supply reels comprising a pair of flanges; a tape guide comprising a first portion associated with a particle intake zone, and a second portion associated with the particle inspection zone; one or more keying nubs protruding from an outside surface of the cartridge and configured to mate with a complementary groove; and a roller, wherein the flexible substrate extends from the supply reel, across the tape guide, and to the uptake reel, and wherein the roller pulls the flexible substrate flat against the second portion of the tape guide associated with the particle inspection zone during the imaging state.

In an embodiment, the roller comprises a foam material in contact with the flexible substrate. The roller may include a solid elastomeric material. In an embodiment, the roller includes a silicone material. In an embodiment, the roller comprises a concave surface. In an embodiment, the roller is closer to the supply reel than the uptake reel. In embodiment, the roller is a first roller and the cartridge comprises a second roller, wherein the second roller is closer to the uptake reel than the supply reel and guides the flexible substrate onto the uptake reel.

In a specific embodiment, a particle collection cartridge includes: a housing comprising a first side, and a second side, the first side comprising a particle intake region, and the second side comprising a particle inspection region; supply and uptake reels within the housing; a tape guide comprising a first portion associated with the particle intake region, and a second portion associated with the particle inspection region; a tape, wound about the supply reel, extending across the tape guide, and terminating at the uptake reel, the tape comprising an adhesive surface to collect particles entering the particle intake region; and a roller, wherein the roller pulls the tape flat against the second portion of the tape guide associated with the particle inspection region.

In an embodiment, the roller comprises a resilient foam material in contact with a surface of the tape opposite the adhesive surface. In an embodiment, the roller comprises a silicone material in contact with a surface of the tape opposite the adhesive surface.

In an embodiment, the roller is closer to the supply reel than the uptake reel. In an embodiment, the roller is a first roller and the particle collection cartridge comprises a second roller, wherein the second roller is closer to the uptake reel than the supply reel and guides the tape onto the uptake reel.

In an embodiment, the roller comprises a concave surface. In an embodiment, the first and second sides are adjacent to each other. In an embodiment, the tape is visible through the particle intake region of the first side, and the particle inspection region of the second side. In an embodiment, the particle collection cartridge includes one or more keying nubs protruding from an outside surface of the housing and configured to be received within a complementary groove. In an embodiment, at least one of the uptake reel, or supply reel comprises a pair of flanges.

In another specific embodiment, a system includes: an airborne particle monitor comprising: an optical imaging system having an exposure time; a motor; and a particle inspection zone; and a cartridge, removable from the airborne particle monitor, and comprising: supply and uptake reels, the motor engaging at least one of the supply or uptake reels when the cartridge is inserted into the airborne particle monitor; a flexible substrate with an adhesive coating and extending from the supply reel, passing through the particle inspection zone, and terminating at the uptake reel; and a roller to tension the flexible substrate, wherein the motor provides an advancing state of moving the flexible substrate through the particle inspection zone, and an imaging state of not moving the flexible substrate through the particle inspection zone, and wherein during the imaging state the roller tensions the flexible substrate such that a portion of the flexible substrate within the particle inspection zone will move at most a small distance during the exposure time.

In an embodiment, the exposure time is at least one second. In an embodiment, the small distance is less than a diameter of airborne particles, trapped by the flexible substrate, that are being imaged by the optical imaging system. In an embodiment, the small distance is less than one micron. The cartridge may include one or more keying nubs protruding from an outside surface of the cartridge and configured to be received within a complementary groove.

In an embodiment, a cartridge for collecting particles includes a housing, tape supply reel, tape uptake reel, and tape guide. The tape outer surface faces away from centers of the supply and uptake reels and includes an adhesive. The tape inner surface faces towards the centers of the supply and uptake reels and does not include the adhesive. The tape extends over the guide. The cartridge further includes a roller that includes a resilient foam material. The roller is positioned to press against the inner surface of the tape. The foam material deforms from contact with the tape and urges the tape to lie flat against the guide. The roller is located in the cartridge so that it is in contact with the tape inner surface before the particles collected on the tape have been scanned by a camera sensor of a collection device into which the cartridge is loaded.

The collection device can be an airborne biological particle monitoring device that collects particles floating in air. In an embodiment, the monitor includes a camera sensor, and an illumination source.

In another embodiment, the cartridge resides inside a temporary host, for example an autonomous vehicle, air or land based drone or a stationary module where the cartridge intake is exposed to air and tape advanced accordingly to collect particles. The cartridge is eventually removed and put through a sensor module at a later time to then extract particle information. For example, an airborne drone carrying a cartridge may fly around many acres of agricultural land sampling airborne particulates over a dense grid of locations and then return to a docking/charging station next to a lab where personnel remove the cartridge and analyze the particles it contains.

In an embodiment, a media cartridge is provided for a particle collection device. The cartridge may be referred to as an adhesive-coated-tape cartridge for use in an airborne particle monitor. In an embodiment, the media cartridge includes a small soft roller close to the supply reel of the cartridge. A second soft roller may also be placed close to the take-up reel of the cartridge. Such soft rollers help to suppress position drift of particles during image capture. In an embodiment, one or both small soft rollers are not cylindrical in shape, but rather a modified cylindrical shape with a smaller diameter at half height and increasing diameter moving away from half-height; for example, the silhouette of the modified cylindrical shape may have approximately parabolic shaped vertical edges. The small soft roller may include a rigid axle surrounded by a soft compressible material.

The collection media may include tape including a layer of adhesive, and a backing material upon which the layer of adhesive is placed, and where quantum dots are within the layer of adhesive. The collection media may include tape including a layer of adhesive, and a backing material upon which the layer of adhesive is placed, and where the quantum dots are within the backing material.

In another specific embodiment, there is a system comprising: an airborne particle monitor comprising: a probing module; a signal acquisition sensor; and a particle inspection zone; and a cartridge, removable from the airborne particle monitor, and comprising: supply and uptake reels; a flexible substrate to collect airborne particles entering the airborne particle monitor, the flexible substrate extending from the supply reel, passing through the particle inspection zone, and terminating at the uptake reel; and a tensioning substrate to tension the flexible substrate and prevent the flexible substrate from moving while particles collected onto the flexible substrate are examined.

In an embodiment, the probing module comprises a light source and the signal acquisition sensor comprises a scatter light collector which measures one or more of voltage or current based on a particle collected onto the flexible substrate that comes across light resulting from the light source. In an embodiment, the signal acquisition sensor collects data other than light signatures, the collected data comprising at least one of magnetic field information, sound information, vibratory information, or sonar-like data composition. In an embodiment, the cartridge comprises one or more keying nubs protruding from an outside surface of the cartridge and configured to be received within a complementary groove of the airborne particle monitor. In an embodiment, the flexible substrate comprises a film that is electrostatically charged to attract and hold at least a subset of the airborne particles entering the airborne particle monitor. In an embodiment, a material of the tensioning substrate comprises at least one of a foam material, a silicone material, or a solid elastomeric material. In an embodiment, a shape of tensioning substrate comprises at least one of a cylinder or a ball.

FIG. 58 shows a system block diagram of a computer system 5805 used to execute the software of the present system described herein. The computer system includes a monitor 5807, keyboard 5815, and mass storage devices 5820. Computer system 5805 further includes subsystems such as central processor 5825, system memory 5830, input/output (I/O) controller 5835, display adapter 5840, serial or universal serial bus (USB) port 5845, network interface 5850, and speaker 5855. The system may also be used with computer systems with additional or fewer subsystems. For example, a computer system could include more than one processor 5825 (i.e., a multiprocessor system) or a system may include a cache memory.

Arrows such as 5860 represent the system bus architecture of computer system 5805. However, these arrows are illustrative of any interconnection scheme serving to link the subsystems. For example, speaker 5855 could be connected to the other subsystems through a port or have an internal direct connection to central processor 5825. The processor may include multiple processors or a multicore processor, which may permit parallel processing of information. Computer system 5805 shown in FIG. 58 is but an example of a computer system suitable for use with the present system.

Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. An apparatus for collection and detection of airborne particles comprising:
    an optical imaging system having an exposure time;
    a particle inspection zone; and
    a flexible substrate with an adhesive coating,
    wherein the flexible substrate passes through the particle inspection zone,
    wherein the flexible substrate alternates between an advancing state of moving through the particle inspection zone and an imaging state of not moving through the particle inspection zone,
    wherein in the imaging state the flexible substrate is so tensioned such that a portion of the flexible substrate in the particle inspection zone moves at most a small distance during the exposure time, and
    wherein the small distance is smaller than a diameter of the airborne particles being detected.

2. An apparatus for collection and detection of airborne particles comprising:
    an optical imaging system having an exposure time;
    a particle inspection zone; and
    a flexible substrate with an adhesive coating,
    wherein the flexible substrate passes through the particle inspection zone,
    wherein the flexible substrate alternates between an advancing state of moving through the particle inspection zone and an imaging state of not moving through the particle inspection zone,
    wherein in the imaging state the flexible substrate is so tensioned such that a portion of the flexible substrate in the particle inspection zone moves at most a small distance during the exposure time, and
    wherein the small distance is less than one micron.

3. An apparatus for collection and detection of airborne particles comprising:
    an optical imaging system having an exposure time;
    a particle inspection zone; and
    a flexible substrate with an adhesive coating,
    wherein the flexible substrate passes through the particle inspection zone,
    wherein the flexible substrate alternates between an advancing state of moving through the particle inspection zone and an imaging state of not moving through the particle inspection zone,
    wherein in the imaging state the flexible substrate is so tensioned such that a portion of the flexible substrate in the particle inspection zone moves at most a small distance during the exposure time, and
    wherein the flexible substrate is housed in a cartridge, separate from the optical imaging system, the cartridge comprising:
    supply and uptake reels within the cartridge, at least one of the uptake or supply reels comprising a pair of flanges;
    a tape guide comprising a first portion associated with a particle intake zone, and a second portion associated with the particle inspection zone;
    one or more keying nubs protruding from an outside surface of the cartridge and configured to mate with a complementary groove; and
    a roller, wherein the flexible substrate extends from the supply reel, across the tape guide, and to the uptake reel, and wherein the roller pulls the flexible substrate flat against the second portion of the tape guide associated with the particle inspection zone during the imaging state.

4. The apparatus of claim 3 wherein the roller comprises a foam material in contact with the flexible substrate.

5. The apparatus of claim 3 wherein the roller comprises a solid elastomeric material.

6. The apparatus of claim 3 wherein the roller comprises a silicone material.

7. The apparatus of claim 3 wherein the roller comprises a concave surface.

8. The apparatus of claim 3 wherein the roller is closer to the supply reel than the uptake reel.

9. The apparatus of claim 3 wherein the roller is a first roller and the cartridge comprises a second roller, wherein the second roller is closer to the uptake reel than the supply reel and guides the flexible substrate onto the uptake reel.

10. A particle collection cartridge comprising:
    a housing comprising a first side, and a second side, the first side comprising a particle intake region, and the second side comprising a particle inspection region;

supply and uptake reels within the housing;

a tape guide comprising a first portion associated with the particle intake region, and a second portion associated with the particle inspection region;

a tape, wound about the supply reel, extending across the tape guide, and terminating at the uptake reel, the tape comprising an adhesive surface to collect particles entering the particle intake region; and a roller, wherein the roller pulls the tape flat against the second portion of the tape guide associated with the particle inspection region.

11. The particle collection cartridge of claim 10 wherein the roller comprises a resilient foam material in contact with a surface of the tape opposite the adhesive surface.

12. The particle collection cartridge of claim 10 wherein the roller comprises a silicone material in contact with a surface of the tape opposite the adhesive surface.

13. The particle collection cartridge of claim 10 wherein the roller is closer to the supply reel than the uptake reel.

14. The particle collection cartridge of claim 10 wherein the roller is a first roller and the particle collection cartridge comprises a second roller, wherein the second roller is closer to the uptake reel than the supply reel and guides the tape onto the uptake reel.

15. The particle collection cartridge of claim 10 wherein the roller comprises a concave surface.

16. The particle collection cartridge of claim 10 wherein the first and second sides are adjacent to each other.

17. The particle collection cartridge of claim 10 wherein the tape is visible through the particle intake region of the first side, and the particle inspection region of the second side.

18. The particle collection cartridge of claim 10 comprising one or more keying nubs protruding from an outside surface of the housing and configured to be received within a complementary groove.

19. The particle collection cartridge of claim 10 wherein at least one of the uptake reel, or supply reel comprises a pair of flanges.

20. A system comprising:

an airborne particle monitor comprising:
an optical imaging system having an exposure time;
a motor; and
a particle inspection zone; and a cartridge, removable from the airborne particle monitor, and comprising:
supply and uptake reels, the motor engaging at least one of the supply or uptake reels when the cartridge is inserted into the airborne particle monitor;
a flexible substrate with an adhesive coating and extending from the supply reel, passing through the particle inspection zone, and terminating at the uptake reel; and
a roller to tension the flexible substrate, wherein the motor provides an advancing state of moving the flexible substrate through the particle inspection zone, and an imaging state of not moving the flexible substrate through the particle inspection zone, and
wherein during the imaging state the roller tensions the flexible substrate such that a portion of the flexible substrate within the particle inspection zone will move at most a small distance during the exposure time.

21. The system of claim 20 wherein the exposure time is at least one second.

22. The system of claim 20 wherein the small distance is less than a diameter of airborne particles, trapped by the flexible substrate, that are being imaged by the optical imaging system.

23. The system of claim 20 wherein the small distance is less than one micron.

24. The system of claim 20 wherein the cartridge comprises one or more keying nubs protruding from an outside surface of the cartridge and configured to be received within a complementary groove.

* * * * *